US012730295B2

(12) United States Patent
Pratt et al.

(10) Patent No.: US 12,730,295 B2
(45) Date of Patent: Sep. 8, 2026

(54) METHODS AND SYSTEMS FOR VOLUMETRIC IMAGING

(71) Applicant: STELLAROMICS, INC., Boston, MA (US)

(72) Inventors: Mark Pratt, Boston, MA (US); Riley Shamloufard, Boston, MA (US); Ye Fu, Boston, MA (US)

(73) Assignee: Stellaromics, Inc., Boston, MA (US)

( * ) Notice: Subject to any disclaimer, the term of this patent is extended or adjusted under 35 U.S.C. 154(b) by 0 days.

(21) Appl. No.: 19/270,278

(22) Filed: Jul. 15, 2025

(65) Prior Publication Data

US 2025/0341711 A1 Nov. 6, 2025

Related U.S. Application Data

(63) Continuation of application No. PCT/US2025/018783, filed on Mar. 6, 2025.

(Continued)

(51) Int. Cl.
*G02B 21/00* (2006.01)
*G01N 21/64* (2006.01)

(Continued)

(52) U.S. Cl.
CPC ......... *G02B 21/22* (2013.01); *G01N 21/6458* (2013.01); *G01N 21/6486* (2013.01);

(Continued)

(58) Field of Classification Search
CPC ................ G02B 21/00; G02B 21/0004; G02B 21/0008; G02B 21/0012; G02B 21/0016; G02B 21/002; G02B 21/0021; G02B 21/0028; G02B 21/0032; G02B 21/0036; G02B 21/0052; G02B 21/006; G02B 21/0064; G02B 21/0072; G02B 21/008; G02B 21/0088; G02B 21/02; G02B 21/06; G02B 21/24; G02B 21/241; G02B 21/242;

(Continued)

(56) References Cited

U.S. PATENT DOCUMENTS 3,687,808 A 8/1972 Merigan, Jr. et al.
4,318,846 A 3/1982 Khanna et al.

(Continued)

FOREIGN PATENT DOCUMENTS

CN 104662165 A 5/2015
CN 110933725 A 3/2020

(Continued)

OTHER PUBLICATIONS

Abbott, Jeffrey. et al. A nanoelectrode array for obtaining intracellular recordings from thousands of connected neurons. Nature biomedical engineering 4(2):232-241 (2020).

(Continued)

*Primary Examiner* — Thong Q Nguyen
(74) *Attorney, Agent, or Firm* — WILSON SONSINI GOODRICH & ROSATI

(57) ABSTRACT

The present disclosure provides a methods and systems for analyzing one or more samples. The method may comprise using a plurality of sensors to substantially continuously integrate through a plurality of object planes of the sample. The integration can then generate a volumetric measurement of the sample.

20 Claims, 14 Drawing Sheets

Related U.S. Application Data

(60) Provisional application No. 63/745,212, filed on Jan. 14, 2025, provisional application No. 63/562,543, filed on Mar. 7, 2024.

(51) Int. Cl.
*G02B 21/16* (2006.01)
*G02B 21/22* (2006.01)
*G02B 21/36* (2006.01)

(52) U.S. Cl.
CPC ..... *G02B 21/0032* (2013.01); *G02B 21/0076* (2013.01); *G02B 21/0084* (2013.01); *G02B 21/16* (2013.01); *G02B 21/367* (2013.01)

(58) Field of Classification Search
CPC .... G02B 21/244; G02B 21/248; G02B 21/26; G02B 21/36; G02B 21/361; G02B 21/362; G02B 21/365
USPC .................................................. 359/368–398
See application file for complete search history.

(56) References Cited

U.S. PATENT DOCUMENTS 4,663,161 A 5/1987 Mannino et al.
4,757,141 A 7/1988 Fung et al.
4,797,368 A 1/1989 Carter et al.
4,849,336 A 7/1989 Miyoshi et al.
4,871,488 A 10/1989 Mannino et al.
4,945,050 A 7/1990 Sanford et al.
4,946,778 A 8/1990 Ladner et al.
5,034,506 A 7/1991 Summerton et al.
5,036,006 A 7/1991 Sanford et al.
5,066,580 A 11/1991 Lee
5,067,805 A 11/1991 Corle et al.
5,091,519 A 2/1992 Cruickshank
5,100,792 A 3/1992 Sanford et al.
5,135,855 A 8/1992 Moss et al.
5,139,941 A 8/1992 Muzyczka et al.
5,151,507 A 9/1992 Hobbs, Jr. et al.
5,173,414 A 12/1992 Lebkowski et al.
5,179,022 A 1/1993 Sanford et al.
5,188,934 A 2/1993 Menchen et al.
5,198,537 A 3/1993 Huber et al.
5,219,740 A 6/1993 Miller et al.
5,344,757 A 9/1994 Hoeltke et al.
5,354,657 A 10/1994 Holtke et al.
5,366,860 A 11/1994 Bergot et al.
5,371,015 A 12/1994 Sanford et al.
5,387,742 A 2/1995 Cordell
5,399,346 A 3/1995 Anderson et al.
5,478,744 A 12/1995 Sanford et al.
5,489,677 A 2/1996 Sanghvi et al.
5,535,052 A 7/1996 Jorgens
5,538,871 A 7/1996 Nuovo et al.
5,539,082 A 7/1996 Nielsen et al.
5,580,859 A 12/1996 Felgner et al.
5,589,466 A 12/1996 Felgner et al.
5,602,240 A 2/1997 De Mesmaeker et al.
5,612,818 A 3/1997 Kumagai et al.
5,619,371 A 4/1997 Pontius
5,676,950 A 10/1997 Small, Jr. et al.
5,688,648 A 11/1997 Mathies et al.
5,702,888 A 12/1997 Holtke et al.
5,714,331 A 2/1998 Buchardt et al.
5,719,262 A 2/1998 Buchardt et al.
5,789,245 A 8/1998 Dubensky, Jr. et al.
5,831,005 A 11/1998 Zuckerman et al.
5,843,723 A 12/1998 Dubensky, Jr. et al.
5,847,162 A 12/1998 Lee et al.
5,990,479 A 11/1999 Weiss et al.
6,054,274 A 4/2000 Sampson et al.
6,094,300 A 7/2000 Kashima et al.
6,207,392 B1 3/2001 Weiss et al.
6,235,502 B1 5/2001 Weissman et al.
6,251,303 B1 6/2001 Bawendi et al.
6,291,187 B1 9/2001 Kingsmore et al.
6,300,093 B1 10/2001 Kindsvogel et al.
6,316,229 B1 11/2001 Lizardi et al.
6,319,426 B1 11/2001 Bawendi et al.
6,322,901 B1 11/2001 Bawendi et al.
6,323,009 B1 11/2001 Lasken et al.
6,344,329 B1 2/2002 Lizardi
6,368,801 B1 4/2002 Faruqi
6,423,551 B1 7/2002 Weiss et al.
6,426,513 B1 7/2002 Bawendi et al.
6,444,143 B2 9/2002 Bawendi et al.
6,444,661 B1 9/2002 Barton et al.
6,558,928 B1 5/2003 Landegren
6,566,118 B1 5/2003 Atkinson et al.
6,576,291 B2 6/2003 Bawendi et al.
6,596,535 B1 7/2003 Carter
6,649,811 B2 11/2003 Pasinetti
6,989,264 B2 1/2006 Atkinson et al.
6,995,006 B2 2/2006 Atkinson et al.
7,335,898 B2 2/2008 Donders et al.
7,399,845 B2 7/2008 Seth et al.
7,479,630 B2 1/2009 Bandura et al.
7,569,686 B1 8/2009 Bhat et al.
7,632,679 B2 12/2009 Jessell et al.
8,497,069 B2 7/2013 Hutchison et al.
8,834,546 B2 9/2014 Deisseroth et al.
9,175,095 B2 11/2015 Deisseroth et al.
9,279,973 B2 3/2016 Takaya
9,359,449 B2 6/2016 Deisseroth et al.
9,365,628 B2 6/2016 Deisseroth et al.
9,376,717 B2 6/2016 Gao et al.
9,423,601 B2 8/2016 Toda et al.
9,458,208 B2 10/2016 Deisseroth et al.
9,791,409 B2 10/2017 Gordon et al.
9,969,783 B2 5/2018 Deisseroth et al.
10,000,796 B2 6/2018 Samusik et al.
10,006,082 B2 6/2018 Samusik et al.
10,052,383 B2 8/2018 Deisseroth et al.
10,138,509 B2 11/2018 Church et al.
10,196,431 B2 2/2019 Deisseroth et al.
10,220,092 B2 3/2019 Deisseroth et al.
10,227,639 B2 3/2019 Levner et al.
10,266,888 B2 4/2019 Daugharthy et al.
10,323,272 B1 6/2019 Rabbani et al.
10,364,457 B2 7/2019 Wassie et al.
10,478,499 B2 11/2019 Deisseroth et al.
10,494,662 B2 12/2019 Church et al.
10,568,307 B2 2/2020 Deisseroth et al.
10,568,516 B2 2/2020 Yang et al.
10,583,309 B2 3/2020 Deisseroth et al.
RE47,983 E 5/2020 Gao et al.
10,787,701 B2 9/2020 Chee
10,829,814 B2 11/2020 Fan et al.
10,982,268 B2 4/2021 Chee
11,008,608 B2 5/2021 Samusik et al.
11,021,737 B2 6/2021 Church et al.
11,067,567 B2 7/2021 Chee
11,078,520 B2 8/2021 Church et al.
11,085,072 B2 8/2021 Church et al.
11,098,303 B2 8/2021 Zhuang et al.
11,111,521 B2 9/2021 Church et al.
11,118,220 B2 9/2021 Daugharthy et al.
11,156,603 B2 10/2021 Chee
11,168,350 B2 11/2021 Nolan et al.
11,187,581 B2 11/2021 Kokota et al.
11,293,051 B2 4/2022 Church et al.
11,293,052 B2 4/2022 Church et al.
11,293,054 B2 4/2022 Levner et al.
11,299,767 B2 4/2022 Church et al.
11,299,770 B2 4/2022 Samusik et al.
11,371,086 B2 6/2022 Chee
11,377,689 B2 7/2022 Beechem et al.
11,408,094 B2 8/2022 Fu et al.
11,447,807 B2 9/2022 Church et al.
RE49,304 E 11/2022 Gao et al.
11,542,543 B2 1/2023 Chee
11,542,554 B2 1/2023 Daugharthy et al.

(56) References Cited

U.S. PATENT DOCUMENTS 11,549,136 B2 1/2023 Church et al.
11,566,276 B2 1/2023 Church et al.
11,566,277 B2 1/2023 Church et al.
11,639,518 B2 5/2023 Church et al.
11,649,485 B2 5/2023 Yin et al.
11,656,447 B2 5/2023 Tsia et al.
11,976,318 B2 5/2024 Church et al.
12,060,603 B2 8/2024 Bava
12,157,124 B2 12/2024 Cox et al.
12,188,085 B2 1/2025 Bava
12,359,253 B2 7/2025 Wang et al.
12,510,744 B1 12/2025 Pratt et al.
2002/0045045 A1 4/2002 Adams et al.
2003/0017264 A1 1/2003 Treadway et al.
2003/0092624 A1 5/2003 Wang et al.
2005/0112639 A1 5/2005 Wang et al.
2005/0239184 A1 10/2005 Ohara et al.
2006/0141501 A1 6/2006 Friend et al.
2008/0124735 A1 5/2008 Schuster et al.
2009/0011943 A1 1/2009 Drmanac et al.
2009/0093403 A1 4/2009 Zhang et al.
2009/0262183 A1 10/2009 Hayashi et al.
2010/0055733 A1 3/2010 Lutolf et al.
2010/0120129 A1 5/2010 Amshey et al.
2011/0256183 A1 10/2011 Frank et al.
2012/0003657 A1 1/2012 Myllykangas et al.
2012/0049087 A1* 3/2012 Choi .................. G01N 21/4795 250/459.1
2013/0045872 A1 2/2013 Zhou et al.
2013/0178372 A1 7/2013 Geiss et al.
2013/0266512 A1 10/2013 Fox et al.
2013/0338038 A1 12/2013 DuBridge et al.
2014/0162892 A1 6/2014 Mir
2014/0170654 A1 6/2014 Landegren et al.
2015/0144490 A1 5/2015 Deisseroth et al.
2015/0377886 A1 12/2015 Ciceri et al.
2016/0080632 A1 3/2016 Iwase et al.
2016/0129437 A1 5/2016 Kayyem et al.
2016/0169923 A1 6/2016 Holmes et al.
2016/0252715 A1 9/2016 Nakano et al.
2016/0258003 A1 9/2016 Celedon et al.
2016/0377524 A1 12/2016 Martin et al.
2017/0068086 A1 3/2017 Tomer et al.
2017/0145510 A1 5/2017 Oliphant et al.
2017/0211133 A1 7/2017 Landegren et al.
2018/0094320 A1 4/2018 Li
2018/0119219 A1 5/2018 Chen et al.
2018/0208975 A1 7/2018 Peterson et al.
2018/0216161 A1 8/2018 Chen et al.
2018/0267283 A1 9/2018 Matsumoto
2018/0340221 A1 11/2018 Davis et al.
2019/0002971 A1 1/2019 Koslover et al.
2019/0055594 A1 2/2019 Samusik et al.
2019/0085383 A1 3/2019 Church et al.
2019/0093156 A1 3/2019 Bava et al.
2019/0110281 A1 4/2019 Zhou et al.
2019/0154679 A1 5/2019 Doyle et al.
2019/0179127 A1 6/2019 Mertz et al.
2019/0284603 A1 9/2019 Shema-Yaacoby et al.
2019/0300944 A1 10/2019 Chee
2020/0140935 A1 5/2020 Chee
2020/0199667 A1 6/2020 Erickstad et al.
2020/0277663 A1 9/2020 Ramachandran Iyer et al.
2020/0341259 A1 10/2020 Chan et al.
2021/0130810 A1 5/2021 Schwartz et al.
2021/0164039 A1 6/2021 Wang et al.
2021/0238662 A1 8/2021 Bava et al.
2021/0238665 A1 8/2021 Samusik et al.
2021/0238674 A1 8/2021 Bava
2021/0262018 A1 8/2021 Bava et al.
2021/0293693 A1 9/2021 Bharadwaj et al.
2021/0340621 A1 11/2021 Daugharthy et al.
2021/0388424 A1 12/2021 Bava
2022/0015638 A1* 1/2022 Zeng .................. G02B 21/0048
2022/0016624 A1 1/2022 Daugharthy et al.
2022/0083832 A1 3/2022 Shah
2022/0084628 A1 3/2022 Shah
2022/0228196 A1 7/2022 Church et al.
2022/0251642 A1 8/2022 Church et al.
2022/0290228 A1 9/2022 Hauling et al.
2022/0309092 A1 9/2022 Daugharthy et al.
2022/0316004 A1 10/2022 Miller et al.
2022/0364160 A1 11/2022 Nolan et al.
2022/0372570 A1 11/2022 Costa
2022/0380838 A1 12/2022 Kühnemund et al.
2022/0403458 A1 12/2022 Bava
2023/0012607 A1 1/2023 Kühnemund et al.
2023/0013775 A1 1/2023 Chen et al.
2023/0026886 A1 1/2023 Chen
2023/0034039 A1 2/2023 Shahjamali
2023/0037182 A1 2/2023 Bava et al.
2023/0037670 A1* 2/2023 Jang ..................... G02B 21/361
2023/0061542 A1 3/2023 Kühnemund
2023/0077364 A1 3/2023 Patterson et al.
2023/0081232 A1 3/2023 Weisenfeld et al.
2023/0109070 A1 4/2023 Richman et al.
2023/0115903 A1 4/2023 Hernández Neuta et al.
2023/0126825 A1 4/2023 Nagendran et al.
2023/0143569 A1 5/2023 Ramachandran Iyer et al.
2023/0161810 A1 5/2023 Daugharthy et al.
2023/0227894 A1 7/2023 Nilsson et al.
2023/0238078 A1 7/2023 Gonzalez Lozano et al.
2023/0242974 A1 8/2023 Costa et al.
2023/0279480 A1 9/2023 Kühnemund
2023/0279484 A1 9/2023 Daugharthy et al.
2023/0314327 A1 10/2023 Hoffman
2023/0314328 A1 10/2023 Costa
2023/0323437 A1 10/2023 Chen et al.
2023/0324421 A1 10/2023 Zhang et al.
2023/0351619 A1 11/2023 Tentori et al.
2024/0019353 A1 1/2024 Wang et al.
2024/0033743 A1 2/2024 Tentori et al.
2024/0132938 A1 4/2024 Kühnemund
2024/0144704 A1 5/2024 Wang et al.
2024/0150816 A1 5/2024 Feng et al.
2024/0151937 A1 5/2024 Hoffman
2024/0167081 A1 5/2024 Bava et al.
2024/0167956 A1 5/2024 Hoffman et al.
2024/0168273 A1 5/2024 Monkowski et al.
2024/0171723 A1 5/2024 Shutov et al.
2024/0171833 A1 5/2024 Hoffman et al.
2024/0177348 A1 5/2024 Shutov et al.
2024/0209346 A1 6/2024 Shastry
2024/0233415 A1 7/2024 Hoffman
2024/0240235 A1 7/2024 Church et al.
2024/0248038 A1 7/2024 Deisseroth et al.
2024/0254545 A1 8/2024 Wang et al.
2024/0254553 A1 8/2024 Deisseroth et al.
2024/0254554 A1 8/2024 Deisseroth et al.
2024/0257912 A1 8/2024 Deisseroth et al.
2024/0263228 A1 8/2024 Deisseroth et al.
2024/0287582 A1 8/2024 Church et al.
2024/0294973 A1 9/2024 Wang et al.
2024/0301468 A1 9/2024 Church et al.
2024/0305314 A1 9/2024 Hoffman et al.
2024/0369471 A1 11/2024 Hoffman et al.
2024/0376530 A1 11/2024 Wang et al.
2024/0428880 A1 12/2024 Marks et al.
2025/0002996 A1 1/2025 Bava
2025/0012786 A1 1/2025 Skrynnyk et al.
2025/0052979 A1 2/2025 Miller et al.
2025/0059590 A1 2/2025 Church et al.
2025/0061732 A1 2/2025 Li et al.
2026/0029636 A1 1/2026 Pratt et al.

FOREIGN PATENT DOCUMENTS

EP 2270205 A2 1/2011
EP 2794928 B1 2/2019
EP 2971184 B1 4/2019
EP 3578666 A1 12/2019
EP 4045887 A1 8/2022
EP 3425063 B1 6/2023
EP 4108782 B1 6/2023

(56) References Cited

FOREIGN PATENT DOCUMENTS

| | | | |
|---|---|---|---|
| EP | 4337787 | A1 | 3/2024 |
| EP | 3822362 | B1 | 5/2024 |
| EP | 4445196 | A1 | 10/2024 |
| EP | 4513431 | A2 | 2/2025 |
| JP | 2005511058 | A | 4/2005 |
| JP | 2009518009 | A | 5/2009 |
| JP | 2017207481 | A | 11/2017 |
| JP | 7706446 | B2 | 7/2025 |
| JP | 2025143377 | A | 10/2025 |
| KR | 20080091125 | A | 10/2008 |
| KR | 20140068264 | A | 6/2014 |
| WO | WO-9839352 | A1 | 9/1998 |
| WO | WO-9914226 | A2 | 3/1999 |
| WO | WO-2001061037 | A1 | 8/2001 |
| WO | WO-2005033340 | A2 | 4/2005 |
| WO | WO-2010062775 | A2 | 6/2010 |
| WO | WO-2012005595 | A2 | 1/2012 |
| WO | WO-2012110899 | A2 | 8/2012 |
| WO | WO-2012160083 | A1 | 11/2012 |
| WO | WO-2013173774 | A2 | 11/2013 |
| WO | WO-2014030066 | A2 | 2/2014 |
| WO | WO-2015200139 | A1 | 12/2015 |
| WO | WO-2017019481 | A1 | 2/2017 |
| WO | WO-2017096248 | A1 | 6/2017 |
| WO | WO-2017147483 | A1 | 8/2017 |
| WO | WO-2017149550 | A1 | 9/2017 |
| WO | WO-2018033528 | A1 | 2/2018 |
| WO | WO-2018136856 | A1 | 7/2018 |
| WO | WO-2019016048 | A1 | 1/2019 |
| WO | WO-2019199579 | A1 | 10/2019 |
| WO | WO-2019222284 | A1 | 11/2019 |
| WO | WO-2020030162 | A1 | 2/2020 |
| WO | WO-2020148769 | A1 | 7/2020 |
| WO | WO-2020160044 | A1 | 8/2020 |
| WO | WO-2020176788 | A1 | 9/2020 |
| WO | WO-2020214885 | A1 | 10/2020 |
| WO | WO-2020240025 | A1 | 12/2020 |
| WO | WO-2021076770 | A1 | 4/2021 |
| WO | WO-2021167984 | A1 | 8/2021 |
| WO | WO-2021168326 | A1 | 8/2021 |
| WO | WO-2022060889 | A2 | 3/2022 |
| WO | WO-2022093940 | A1 | 5/2022 |
| WO | WO-2022178274 | A1 | 8/2022 |
| WO | WO-2022216824 | A1 | 10/2022 |
| WO | WO-2022236011 | A1 | 11/2022 |
| WO | WO-2022241227 | A1 | 11/2022 |
| WO | WO-2022246269 | A1 | 11/2022 |
| WO | WO-2022246279 | A1 | 11/2022 |
| WO | WO-2022251586 | A1 | 12/2022 |
| WO | WO-2022256324 | A1 | 12/2022 |
| WO | WO-2022261255 | A1 | 12/2022 |
| WO | WO-2022261481 | A2 | 12/2022 |
| WO | WO-2023283442 | A1 | 1/2023 |
| WO | WO-2023288225 | A1 | 1/2023 |
| WO | WO-2023009988 | A1 | 2/2023 |
| WO | WO-2023023484 | A1 | 2/2023 |
| WO | WO-2023107734 | A1 | 6/2023 |
| WO | WO-2023129898 | A2 | 7/2023 |
| WO | WO-2023141476 | A1 | 7/2023 |
| WO | WO-2023172915 | A1 | 9/2023 |
| WO | WO-2023192302 | A1 | 10/2023 |
| WO | WO-2023220300 | A1 | 11/2023 |
| WO | WO-2024097770 | A2 | 5/2024 |
| WO | WO-2024102736 | A1 | 5/2024 |
| WO | WO-2024103007 | A1 | 5/2024 |
| WO | WO-2024107727 | A1 | 5/2024 |
| WO | WO-2024112533 | A2 | 5/2024 |
| WO | WO-2024145216 | A1 | 7/2024 |
| WO | WO-2025014758 | A1 | 1/2025 |
| WO | WO-2025014828 | A1 | 1/2025 |
| WO | WO-2025038914 | A1 | 2/2025 |
| WO | WO-2025136916 | A1 | 6/2025 |
| WO | WO-2025189030 | A1 | 9/2025 |

OTHER PUBLICATIONS

Achim, Kaia. et al. High-throughput spatial mapping of single-cell RNA-seq data to tissue of origin. Nature biotechnology 33(5):503-509 (2015).

Arganda-Carreras, Ignacio. et al. Trainable Weka Segmentation: a machine learning tool for microscopy pixel classification. Bioinformatics 33(15):2424-2426 (2017).

Bagasra, Omar. Protocols for the in situ PCR-amplification and detection of mRNA and DNA sequences. Nature Protocols 2(11):2782-2795 (2007).

Baner, Johan. et al. Signal amplification of padlock probes by rolling circle replication. Nucleic acids research 26(22):5073-5078 (1998).

Becht, Etienne. et al. Dimensionality reduction for visualizing single-cell data using UMAP. Nature biotechnology 37(1):38-44 (2019).

Bleton, Heloise. et al. Cognitive Tasks and Cerebral Blood Flow Through Anterior Cerebral Arteries: a Study via Functional Transcranial Doppler Ultrasound Recordings. BMC Medical Imaging 16:1-12 (2016).

Boersma, Sanne. et al. Multi-color single-molecule imaging uncovers extensive heterogeneity in mRNA decoding. Cell 178(2):458-472, e1-e19 (2019).

Burke, Kelly S. et al. A Fluorescence in situ hybridization method to quantify mRNA translation by visualizing ribosome-mRNA interactions in single cells. ACS central science 3(5):425-433 (2017).

Buxbaum, Adina R. et al. In the right place at the right time: visualizing and understanding mRNA localization. Nature reviews Molecular cell biology 16(2):95-109 (2015).

Cao, Junyue. et al. The single-cell transcriptional landscape of mammalian organogenesis. Nature 566(7745):496-502 (2019).

Chen, Fei. et al. Nanoscale imaging of RNA with expansion microscopy. Nature methods 13(8):679-684 (2016).

Chen, Fei. et al. Optical imaging. Expansion microscopy. Science 347(6221):543-548 (2015).

Chen, Kok Hao. et al. Spatially resolved, highly multiplexed RNA profiling in single cells. Science 348(6233):aaa6090, 1-14 (2015).

Chen, Xiaoyin. et al. Efficient in situ barcode sequencing using padlock probe-based BaristaSeq. Nucleic acids research 46(4):e22, 1-10 (2018).

Chen, Xiaoyin. et al. High-Throughput Mapping of Long-Range Neuronal Projection Using In Situ Sequencing. Cell 179(3):772-786 (2019).

Clausson, Carl-Magnus. et al. Compaction of rolling circle amplification products increases signal integrity and signal-to-noise ratio. Scientific reports 5:12317, 1-10 (2015).

Codeluppi, Simone. et al. Spatial organization of the somatosensory cortex revealed by osmFISH. Nature methods 15(11):932-935 (2018).

Co-pending U.S. Appl. No. 18/682,160, inventors Xiao; Wang et al., filed Feb. 8, 2024.

Crosetto, Nicola. et al. Spatially resolved transcriptomics and beyond. Nature Reviews Genetics 16(1):57-66 (2015).

Deng, Ruijie. et al. DNA-Sequence-Encoded Rolling Circle Amplicon for Single-Cell RNA Imaging. Chem 4(6):1373-1386 (2018).

Eng, Chee-Huat Linus. et al. Transcriptome-scale super-resolved imaging in tissues by RNA seqFISH+. Nature 568(7751):235-239 (2019).

Faruqi, Fawad A. et al. High-throughput genotyping of single nucleotide polymorphisms with rolling circle amplification. BMC genomics 2:4, 1-10 (2001).

Fazal, Furqan M. et al. Atlas of subcellular RNA localization revealed by APEX-Seq. Cell 178(2):473-490, e1-e26 (2019).

Fredriksson, Simon. et al. Protein detection using proximity-dependent DNA ligation assays. Nature biotechnology 20(5):473-477 (2002).

Gao, Shuai. et al. Tracing the temporal-spatial transcriptome landscapes of the human fetal digestive tract using single-cell RNA-sequencing. Nature cell biology 20(6):721-734 (2018).

Goltsev, Yury. et al. Deep Profiling of Mouse Splenic Architecture with Codex Multiplexed Imaging. Cell 174(4):968-981, e1-e15 (2018).

(56) References Cited

OTHER PUBLICATIONS

Halstead, James M. et al. An RNA biosensor for imaging the first round of translation from single cells to living animals. Science 347(6228):1367-1371 (2015).
Han, Xiaoping. et al. Mapping the Mouse Cell Atlas by Microwell-Seq. Cell 172(5):1091-1107, e1-e17 (2018).
Hendriks, Gert-Jan. et al. NASC-seq monitors RNA synthesis in single cells. Nature communications 10(1):3138, 1-9 (2019).
Hrvatin, Sinisa. et al. Single-cell analysis of experience-dependent transcriptomic states in the mouse visual cortex. Nature neuroscience 21(1):120-129 (2018).
Ingolia, Nicholas T. Ribosome footprint profiling of translation throughout the genome. Cell 165(1):22-33 (2016).
Katz, Zachary B. et al. Mapping translation‘hot-spots’ in live cells by tracking single molecules of mRNA and ribosomes. Elife 5:e10415, 1-16 (2016).
Ke, Rongqin. et al. In Situ Sequencing for RNA Analysis in Preserved Tissue and Cells. Nature Methods 10(9):857-860 (2013).
Keller, Philipp J. et al. Visualizing whole-brain activity and development at the single-cell level using light-sheet microscopy. Neuron 85(3):462-483 (2015).
Kishi, Jocelyn Y. et al. Saber amplifies Fish: enhanced multiplexed imaging of RNA and DNA in cells and tissues. Nature methods 16(6):533-544 (2019).
Koos, Bjorn. et al. Analysis of protein interactions in situ by proximity ligation assays. Current Topics in Microbiology and Immunology 377:111-126 (2014).
Larsson, Chatarina. et al. In situ detection and genotyping of individual mRNA molecules. Nat Methods 7(5):395-397 (2010).
Lee, Je Hyuk. et al. Fluorescent in situ sequencing (FISSEQ) of RNA for gene expression profiling in intact cells and tissues. Nature protocols 10(3):442-458 (2015).
Lee, Je Hyuk. et al. Highly multiplexed subcellular RNA sequencing in situ. Science 343(6177):1360-1363 (2014).
Lein, Ed. et al. The promise of spatial transcriptomics for neuroscience in the era of molecular cell typing. Science 358(6359):64-69 (2017).
Lizardi, Paul M. et al. Mutation Detection and Single-molecule Counting Using Isothermal Rolling-circle Amplification. Nature Genetics 19(3):225-232 (1998).
Lubeck, Eric, and Long Cai. et al. Single-cell systems biology by super-resolution imaging and combinatorial labeling. Nature Methods 9(7):743-748 (2012).
Moffitt, Jeffrey R. et al. Molecular spatial and functional single-cell profiling of the hypothalamic preoptic region. Science 362(6416): eaau5324, 1-14 (2018).
Mondal, Manas. et al. Highly multiplexed single-cell in situ RNA and DNA analysis with bioorthogonal cleavable fluorescent oligonucleotides. Chemical science 9(11):2909-2917 (2018).
Moon, Kevin R. et al. Visualizing structure and transitions in high-dimensional biological data. Nature biotechnology 37(12):1482-1492 (2019).
Morisaki, Tatsuya. et al. Real-time quantification of single RNA translation dynamics in living cells. Science 352(6292):1425-1429 (2016). With Supplemental Materials.
Nawy, Tal. In situ sequencing. Nature Methods 11(1):29 (2014).
PCT/US2019/025835 International Search Report dated Jul. 1, 2019.
PCT/US2020/055800 International Search Report and Written Opinion dated Feb. 22, 2021.
PCT/US2022/030232 International Search Report and Written Opinion dated Oct. 26, 2022.
PCT/US2022/030321 International Search Report and Written Opinion dated Oct. 6, 2022.
PCT/US2022/030363 International Search Report and Written Opinion dated Sep. 1, 2022.
PCT/US2022/030370 International Search Report and Written Opinion dated Sep. 1, 2022.
PCT/US2022/030374 International Search Report and Written Opinion dated Sep. 1, 2022.
PCT/US2024/046583 International Search Report and Written Opinion dated Jan. 2, 2025.
PCT/US2024/060469 International Search Report and Written Opinion dated May 7, 2025.
PCT/US2025/018783 International Search Report and Written Opinion dated Jun. 27, 2025.
Perkel, Jeffrey M. Starfish enterprise: finding RNA patterns in single cells. Nature 572(7770):549-549 (2019).
Player, Audrey N. et al. Single-copy gene detection using branched DNA (bDNA) in situ hybridization. The journal of histochemistry and cytochemistry 49(5):603-612 (2001).
Qian, Xiaoyan. et al. Probabilistic cell typing enables fine mapping of closely related cell types in situ. Nature methods 17(1):101-106 (2020).
Ren, Jingyi. et al. Spatiotemporally resolved transcriptomics reveals the subcellular RNA kinetic landscape. Nature Methods 20(5):695-705 (2023).
Rosales, Adrianne M., and Kristi S. Anseth. The design of reversible hydrogels to capture extracellular matrix dynamics. Nature Reviews Materials 1(2):15012, 1-15 (2016).
Sakaue-Sawano, Asako. et al. Visualizing spatiotemporal dynamics of multicellular cell-cycle progression. Cell 132(3):487-498 (2008).
Schweitzer, Barry. et al. Immunoassays with rolling circle DNA amplification: a versatile platform for ultrasensitive antigen detection. Proceedings of the National Academy of Sciences 97(18):10113-10119 (2000).
Schweitzer, Barry. et al. Multiplexed protein profiling on microarrays by rolling-circle amplification. Nature biotechnology 20(4):359-365 (2002).
Shah, Sheel. et al. seqFISH accurately detects transcripts in single cells and reveals robust spatial organization in the hippocampus. Neuron 94(4):752-758, e1 (2017).
Shah, Sheel. et al. Single-molecule RNA detection at depth by hybridization chain reaction and tissue hydrogel embedding and clearing. Development 143(15):2862-2867 (2016).
Soderberg, Ola. et al. Direct observation of individual endogenous protein complexes in situ by proximity ligation. Nature methods 3(12):995-1000 (2006).
Stahl, Patrik L. et al. Visualization and analysis of gene expression in tissue sections by spatial transcriptomics. Science 353(6294):78-82 (2016).
Strell, Carina. et al. Placing RNA in context and space—methods for spatially resolved transcriptomics. The FEBS journal 286(8):1468-1481 (2019).
Tam, Roger Y. et al. Engineering cellular microenvironments with photo-and enzymatically responsive hydrogels: toward biomimetic 3D cell culture models. Accounts of chemical research 50(4):703-713 (2017).
Toga, Arthur W. et al. Towards multimodal atlases of the human brain. Nature Reviews Neuroscience 7(12):952-966 (2006).
Tom Dieck, Susanne. et al. Direct visualization of newly synthesized target proteins in situ. Nature methods 12(5):411-414 (2015).
Tomer, Raju. et al. Advanced Clarity for rapid and high-resolution imaging of intact tissues. Nature protocols 9(7):1682-1697 (2014).
Wang, Guiping. et al. Spatial organization of the transcriptome in individual neurons. BioRxiv :1-45 (2020).
Wang, Xiao. et al. Supplementary Material: Three-dimensional Intact-tissue Sequencing of Single-cell Transcriptional States. Science 361(6400):eaat5691, 1-39 (2018).
Wang, Xiao. et al. Three-dimensional intact-tissue sequencing of single-cell transcriptional states. Science 361(6400):eaat5691, 1-11 (2018).
Weber, Michael. et al. Cell-accurate optical mapping across the entire developing heart. Elife 6:e28307, 1-14 (2017).
Weibrecht, Irene. et al. In situ detection of individual mRNA molecules and protein complexes or post-translational modifications using padlock probes combined with the in situ proximity ligation assay. Nature protocols 8(2): 355-372 (2013).
Weibrecht, Irene. et al. Visualising individual sequence-specific protein-DNA interactions in situ. New biotechnology 29(5):589-598 (2012).

(56) References Cited

OTHER PUBLICATIONS

Wetmur, James G. DNA probes: applications of the principles of nucleic acid hybridization. Critical Reviews in Biochemistry and Molecular Biology 26(3-4):227-259 (1991).
Wu et al., (2016) "Translation dynamaics of single mRNAs in live cells and neurons", Science, 352(6292):14300-14305.
Xia, Chenglong. et al. Spatial transcriptome profiling by Merfish reveals subcellular RNA compartmentalization and cell cycle-dependent gene expression. Proceedings of the National Academy of Sciences 116(39):19490-19499 (2019).
Yang, Bin. et al. Single-cell phenotyping within transparent intact tissue through whole-body clearing. Cell 158(4):945-958 (2014).
Zeisel, Amit. et al. Cell types in the mouse cortex and hippocampus revealed by single-cell RNA-seq. Science 347(6226):1138-1142 (2015).
Zeng, Hu. et al. Integrative in situ mapping of single-cell transcriptional states and tissue histopathology in a mouse model of Alzheimer's disease. Nature neuroscience 26(3):430-446 (2023).
Zhang, Beibei. et al. Detection of nucleic acids with a novel stem-loop primer rolling circle amplification technique. Biotechniques 64(2):69-80 (2018).
Zhang, Wei. et al. Proximity-dependent Assay for Specific RNA-protein Interactions in Intact Cells. RNA 22(11):1785-1792 (2016).
Zhong, Xiao-bo. et al. Visualization of oligonucleotide probes and point mutations in interphase nuclei and DNA fibers using rolling circle DNA amplification. Proceedings of the National Academy of Sciences 98(7):3940-3945 (2001).
Allen Mouse Brain Atlas, Data Portal 2004; [retrieved on Oct. 3, 2025], Available at URL:https://mouse.brain-map.org/ pp. 1-2.
Alpert, N.M. et al. The principal axes transformation—a method for image registration. Journal of nuclear medicine : official publication, Society of Nuclear Medicine 31(10):1717-1722 (1990).
Avey, Denis. et al. Single-cell RNA-seq uncovers a robust transcriptional response to morphine by glia. Cell reports 24(13):3619-3629, e1-e4 (2018).
Bevis, Brooke J. and Benjamin S Glick. Rapidly maturing variants of the Discosoma red fluorescent protein (DsRed) 20(1):83-87 (2002).
Borden, Elizabeth S. et al. Neoantigen fitness model predicts lower immune recognition of cutaneous squamous cell carcinomas than actinic keratoses. Frontiers in Immunology 10:2799, 1-11 (2019).
Buchwalow, Igor, and W.Bocker. Immunohistochemistry: Basics and Methods. Springer-Verlag Berlin Heidelberg 4(13):109-127 (2010).
Chan, Ken Y., et al. Engineered AAVs for efficient noninvasive gene delivery to the central and peripheral nervous systems. Nature neuroscience 20.8: 1172-1179. (2017).
Chen, Renchao. et al. Decoding molecular and cellular heterogeneity of mouse nucleus accumbens. Nature neuroscience 24(12):1757-1771 (2021).
Cheng, Yubao, et al. Sequencing-free whole-genome spatial transcriptomics at single-molecule resolution. Cell (2025).
Co-pending U.S. Appl. No. 19/236,720, inventor Fu; Ye, filed Jun. 12, 2025.
El-Nachef, Danny. et al. High-resolution 3D fluorescent imaging of intact tissues. International journal of cardiology and cardiovascular diseases 1(1):1-14 (2021).
Fang, Rongxin. et al. Three-dimensional single-cell transcriptome imaging of thick tissues. Elife 12:RP90029, 1-18 (2024).
Ferkowicz, Michael J. et al. Large-scale, three-dimensional tissue cytometry of the human kidney: a complete and accessible pipeline. Laboratory investigation 101(5):661-676 (2021).
Fujimoto, Kenzo. et al. Site-specific cytosine to uracil transition by using reversible DNA photo-crosslinking. ChemBioChem 11(12):1661-1664 (2010).
Fujita, Hideki. et al. Langerhans cells from human cutaneous squamous cell carcinoma induce strong type 1 immunity. Journal of investigative dermatology 132(6):1645-1655 (2012).
Gandin, Valentina. et al. Deep-tissue spatial omics: imaging whole-embryo transcriptomics and subcellular structures at high spatial resolution. bioRxiv :2024-05 (2024).
Guenthner, Casey J. et al. Permanent genetic access to transiently active neurons via TRAP: targeted recombination in active populations. Neuron 78(5):773-784 (2013).
Hein, Christopher D. et al. Click Chemistry, a Powerful Tool for Pharmaceutical Sciences. Pharmaceutical Research 25(10):2216-2230 (2008).
Hong, In Seok, and Marc M. Greenberg. DNA interstrand cross-link formation initiated by reaction between singlet oxygen and a modified nucleotide. Journal of the American Chemical Society 127(30):10510-10511 (2005).
Huh, Kang Moo, and You Han Bae. Synthesis and characterization of poly (ethylene glycol)/poly (L-lactic acid) alternating multiblock copolymers. Polymer 40(22):6147-6155 (1999).
Jerby-Arnon et al.: A Cancer Cell Program Promotes T Cell Exclusion and Resistance to Checkpoint Blockade. Cell 175: 984-997.e24 ((2018).
Ji, Andrew L. et al. Multimodal Analysis of Composition and Spatial Architecture in Human Squamous Cell Carcinoma. Cell 182(6):1661-1662 (2020).
Joost, Simon. et al. The molecular anatomy of mouse skin during hair growth and rest. Cell stem cell 26(3):441-457 (2020).
Klechevsky, Eynav. et al. Functional specializations of human epidermal Langerhans cells and CD14+ dermal dendritic cells. Immunity 29(3):497-510 (2008).
Klein, Stefan. et al. elastix: a toolbox for intensity-based medical image registration. IEEE transactions on medical imaging 29(1):196-205 (2010). Published Online Nov. 17, 2009.
Korsunsky, Ilya. et al. Fast, sensitive and accurate integration of single-cell data with Harmony. Nature methods 16(12):1289-1296 (2019).
Lee, Wonjae et al. Hydrophobic nanoparticles improve permeability of cell-encapsulating poly (ethylene glycol) hydrogels while maintaining patternability. Proceedings of the National Academy of Sciences 107(48):20709-20714 (2010).
Li, Weizhe. et al. High-dimensional cell-level analysis of tissues with Ce3D multiplex volume imaging. Nature Protocols 14(6):1708-1733 (2019).
Maintz, J.B. Antoine, and Max A. Viergever. A survey of medical Image Registration. Medical Image Analysis 2(1):1-36 (1998).
Matz, Mikhail V. et al. Fluorescent proteins from nonbioluminescent Anthozoa species. Nature biotechnology 17(10):969-973 (1999).
Nagai, Takeharu. et al. A variant of yellow fluorescent protein with fast and efficient maturation for cell-biological applications. Nature biotechnology 20(1):87-90 (2002).
Nejad, Maryam Imani. et al. Interstrand DNA cross-links derived from reaction of a 2-aminopurine residue with an abasic site. ACS chemical biology 14(7):1481-1489 (2019).
Nguyen, Annalee W. and Patrick S. Daugherty. Evolutionary optimization of fluorescent proteins for intracellular FRET. Nature biotechnology 23(3):355-360 (2005).
Norris, Sam. et al. Whole Tissue Imaging of Cellular Boundaries at Sub-Micron Resolutions for Automatic Cell Segmentation: Applications in Epithelial Bending of Ectodermal Appendages. bioRxiv :1-18 (2024).
Oligonucleotide Definition. Merriam-Webster, [retrieved on Aug. 23, 2017]. Available at URL: https://www.merriam-webster.com/dictionary/oligonucleotide p. 1.
Oligonucleotide. Wikipedia, [retrieved on Feb. 17, 2019]. Available at URL: https://en.wikipedia.org/wiki/Oligonucleotide pp. 1-3.
PCT/US2017/019443 International Search Report and Written Opinion dated May 19, 2017.
PCT/US2024/036943 International Search Report and Written Opinion dated Oct. 18, 2024.
PCT/US2025/030656 International Search Report and Written Opinion dated Aug. 7, 2025.
Pelizzari, Charles A. et al. Accurate three-dimensional registration of CT, PET, and/or MR images of the brain. Journal of computer assisted tomography 13(1):20-26 (1989).
Rizzo, Megan A. et al. An improved cyan fluorescent protein variant useful for FRET. Nature biotechnology 22(4):445-449 (2004).

(56) References Cited

OTHER PUBLICATIONS

Sakaguchi, Richi. et al. Bright multicolor labeling of neuronal circuits with fluorescent proteins and chemical tags. Elife 7:e40350,1-28 (2018).
Sanz, Elisenda. et al. Cell-type-specific isolation of ribosome-associated mRNA from complex tissues. Proceedings of the National Academy of Sciences of the United States of America 106(33):13939-13944 (2009).
Savell, Katherine E. et al. A dopamine-induced gene expression signature regulates neuronal function and cocaine response. Science advances 6(26):eaba4221, 1-15 (2020).
Scheffer, Louis K. et al. A connectome and analysis of the adult *Drosophila* central brain. elife 9:e57443, 1-83 (2020).
Shaner, Nathan C. et al. A guide to choosing flourescent proteins. Nature Methods 2(12):905-909 (2005).
Shkrob, Maria A. et al. Far-red fluorescent proteins evolved from a blue chromoprotein from Actinia equina. The Biochemical journal 392(Pt 3):649-654 (2005).
Stevens, Kristof, and Annemieke Madder. Furan-modified oligonucleotides for fast, high-yielding and site-selective DNA inter-strand cross-linking with non-modified complements. Nucleic Acids Research 37(5):1555-1565 (2009).
Tainaka, Kazuki. et al. Whole-body imaging with single-cell resolution by tissue decolorization. Cell 159(4):911-924 (2014).
Takko, Heli. et al. ShapeMetrics: A userfriendly pipeline for 3D cell segmentation and spatial tissue analysis. Developmental biology 462(1):7-19 (2020).
Taranda, Julian. et al. Combined whole-organ imaging at single-cell resolution and immunohistochemical analysis of prostate cancer and its liver and brain metastases. Cell reports 37(7):110027, 1-14 (2021).
Tasic, Bosiljka. et al. Shared and distinct transcriptomic cell types across neocortical areas. Nature 563(7729):72-78 (2018).
Tepper, James M. et al. Heterogeneity and diversity of striatal GABAergic interneurons: update 2018. Frontiers in neuroanatomy 12:91, 1-14 (2018).
U.S. Appl. No. 17/768,996 Non-Final Office Action dated Aug. 22, 2025.
U.S. Appl. No. 19/236,720 Office Action dated Aug. 7, 2025.
U.S. Appl. No. 19/236,732 Office Action dated Aug. 8, 2025.
U.S. Appl. No. 19/270,264 Notice of Allowance dated Sep. 8, 2025.
Wang, Lei. et al. Evolution of new nonantibody proteins via iterative somatic hypermutation. Proceedings of the National Academy of Sciences 101(48):16745-16749 (2004).
Wang, Yuhan et al. EASI-FISH for thick tissue defines lateral hypothalamus spatio-molecular organization. Cell 184(26):6361-6377, e1-e24 (2021).
West, Jennifer L. and Jeffrey A. Hubbell. Polymeric Biomaterials with Degradation Sites for Proteases Involved in Cell Migration. Macromolecules 32(1):241-244 (1999).
Wiedenmann, et al. A far-red fluorescent protein with fast maturation and reduced oligomerization tendency from Entacmaea quadricolor (Anthozoa, Actinaria). Proc Natl Acad Sci U S A 99(18):11646-11651 (2002).
Woods, Roger P. et al. MRI-PET registration with automated algorithm. Journal of computer assisted tomography 17(4):536-546 (1993).
Xu, C. Shan. et al. Enhanced FIB-SEM systems for large-volume 3D imaging. elife 6:e25916, 1-36 (2017).
Yapp, Clarence. et al. Multiplexed 3D analysis of immune states and niches in human tissue. bioRxiv :1-53 (2023).
Yoshimura, Yoshinaga, and Kenzo Fujimoto. Ultrafast reversible photo-cross-linking reaction: toward in situ DNA manipulation. Organic letters 10(15):3227-3230 (2008).
Yoshimura, Yoshinaga. et al. A New Approach for Reversible RNA Photocrosslinking Reaction: Application to Sequence-Specific RNA Selection. ChemBioChem 10(9):1473-1476 (2009).
Asp et al., (2020) "Spatially Resolved Transcriptomes-Next Generation Tools for Tissue Exploration", Bioessays., 42(10):e1900221.
Bandura et al., Mass cytometry: technique for real time single cell multitarget immunoassay based on inductively coupled plasma time-of-flight mass spectrometry. Analytical Chemistry 81:6813-6822 (2009).
Braasch, Dwaine A, and David R. Corey. Novel antisense and peptide nucleic acid strategies for controlling gene expression. Biochemistry 41(14):4503-4510 (2002).
Englisch, Uwe, and Dieter H. Gauss. Chemically Modified Oligonucleotides as Probes and Inhibitors. Angewandte Chemie International 30(6):613-629 (1991).
Gao, Xin. et al. ClusterMap—Compare multiple Single cell RNA-seq profiling. Jul. 12, 2023 [Retrieved Jul. 15, 2025]. Available at URL:https://xgaoo.github.io/ClusterMap/ClusterMap.html. pp. 1-54.
International Preliminary Report on Patentability for Application No. PCT/US2022/039895, mailed Feb. 22, 2024.
International Search Report and Written Opinion for Application No. PCT/US2022/039895, mailed Nov. 17, 2022.
Jones, Keith. et al. Glowing jellyfish, luminescence and a molecule called coelenterazine. Trends in Biotechnology 17(12):477-481 (1999).
Koshkin, Alexei A. et al. LNA (Locked Nucleic Acids): Synthesis of the Adenine, Cytosine, Guanine, 5-methylcytosine, Thymine and Uecognition. Tetrahedron 54(14):3607-3630 (1998).
Kroschwitz, I. Jacqueline. Polynuclieotids. The Concise Encyclopedia Of Polymer Science And Engineering. A Wiley-Interscience Publication John Wiley & Sons (pp. 858-859) (1990).
Lowe, Rohan. et al. Transcriptomics technologies. PLoS computational biology 13(5):e1005457, 1-23 (2017).
Martin et al. Ein neuer Zugang zu 2'-O-Alkylribonucleosiden and Eigenschaften deren Oligonucleotide. Helv. Chim. Acta, 78:486-504, 1995.
Mount, Natalie M. et al. Cell-based therapy technology classifications and translational challenges. Philosophical Transactions of the Royal Society B: Biological Sciences 370(1680):20150017, 1-16 (2015).
Ornatsky, Olga. et al. Highly multiparametric analysis by mass cytometry. Journal of immunological methods 361(1-2):1-20 (2010).
PCT/US2017/019443 International Preliminary Report on Patentability dated Sep. 7, 2018.
PCT/US2019/025835 International Preliminary Report on Patentability dated Oct. 22, 2020.
PCT/US2020/055800 International Preliminary Report on Patentability dated Apr. 28, 2022.
PCT/US2022/017016 International Preliminary Report on Patentability dated Aug. 31, 2023.
PCT/US2022/017016 International Search Report and Written Opinion dated May 24, 2022.
PCT/US2022/028012 International Preliminary Report on Patentability dated Nov. 16, 2023.
PCT/US2022/028012 International Search Report and Written Opinion dated Aug. 17, 2022.
PCT/US2022/030232 International Preliminary Report on Patentability dated Nov. 30, 2023.
PCT/US2022/030321 International Preliminary Report on Patentability dated Nov. 23, 2023.
PCT/US2022/030363 International Preliminary Report on Patentability dated Nov. 30, 2023.
PCT/US2022/030370 International Preliminary Report on Patentability dated Nov. 30, 2023.
PCT/US2022/030374 International Preliminary Report on Patentability dated Nov. 30, 2023.
PCT/US2022/031275 International Preliminary Report on Patentability dated Dec. 7, 2023.
PCT/US2022/031275 International Search Report and Written Opinion dated Oct. 31, 2022.
PCT/US2022/031275 Invitation to Pay Additional Fees dated Sep. 8, 2022.
PCT/US2022/035271 International Preliminary Report on Patentability dated Jan. 11, 2024.
PCT/US2022/035271 International Search Report and Written Opinion dated Oct. 11, 2022.

(56) References Cited

OTHER PUBLICATIONS

Robles-Remacho, Agustin. et al. Spatial Transcriptomics: Emerging Technologies in Tissue Gene Expression Profiling. Analytical chemistry 95(42):15450-15460 (2023).
Samusik, Nikolay. et al. Automated mapping of phenotype space with single-cell data. Nature methods 13(6):493-496 (2016).
Singh, Sanjay K. et al. LNA (locked nucleic acids): Synthesis and High-affinity Nucleic Acid Recognition. Chemical Communications 4:455-456 (1998).
Sui, Xin. et al. Scalable Spatial Single-cell Transcriptomics and Translatomics in 3d Thick Tissue Blocks. Biorxiv : the Preprint Server for Biology :1-37 (2024).
Sui, Xin, et al. Scalable spatial single-cell transcriptomics and translatomics in 3D thick tissue blocks. Nature Methods: 1-11. (2025).
U.S. Appl. No. 18/277,950 Office Action dated Oct. 1, 2025.
U.S. Appl. No. 19/230,050 Office Action dated Sep. 4, 2025.
Vickovic, Sanja. et al. High-definition spatial transcriptomics for in situ tissue profiling. Nature methods 16(10):987-990 (2019).
Wahlestedt, Claes et al. Potent and Nontoxic Antisense Oligonucleotides Containing Locked Nucleic Acids. PNAS USA 97(10):5633-5638 (2000).
Wang, Jing. et al. Cyclohexene nucleic acids (CeNA): serum stable oligonucleotides that activate RNase H and increase duplex stability with complementary RNA. Journal of the American Chemical Society 122(36):8595-8602 (2000).
Wang, Lili. et al. Human CD4+ lymphocytes for antigen quantification: characterization using conventional flow cytometry and mass cytometry. Cytometry Part A 81(7):567-575 (2012).
Wang, Xiao. et al. Supplemental Information: Three-dimensional intact-tissue sequencing of single-cell transcriptional states. Science 361(6400):eaat5691, 1-39 (2018).
Zeng, Hongkui, and Joshua R. Sanes. Neuronal cell-type classification: challenges, opportunities and the path forward. Nature Reviews Neuroscience 18(9):530-546 (2017).

* cited by examiner

Figure 7:
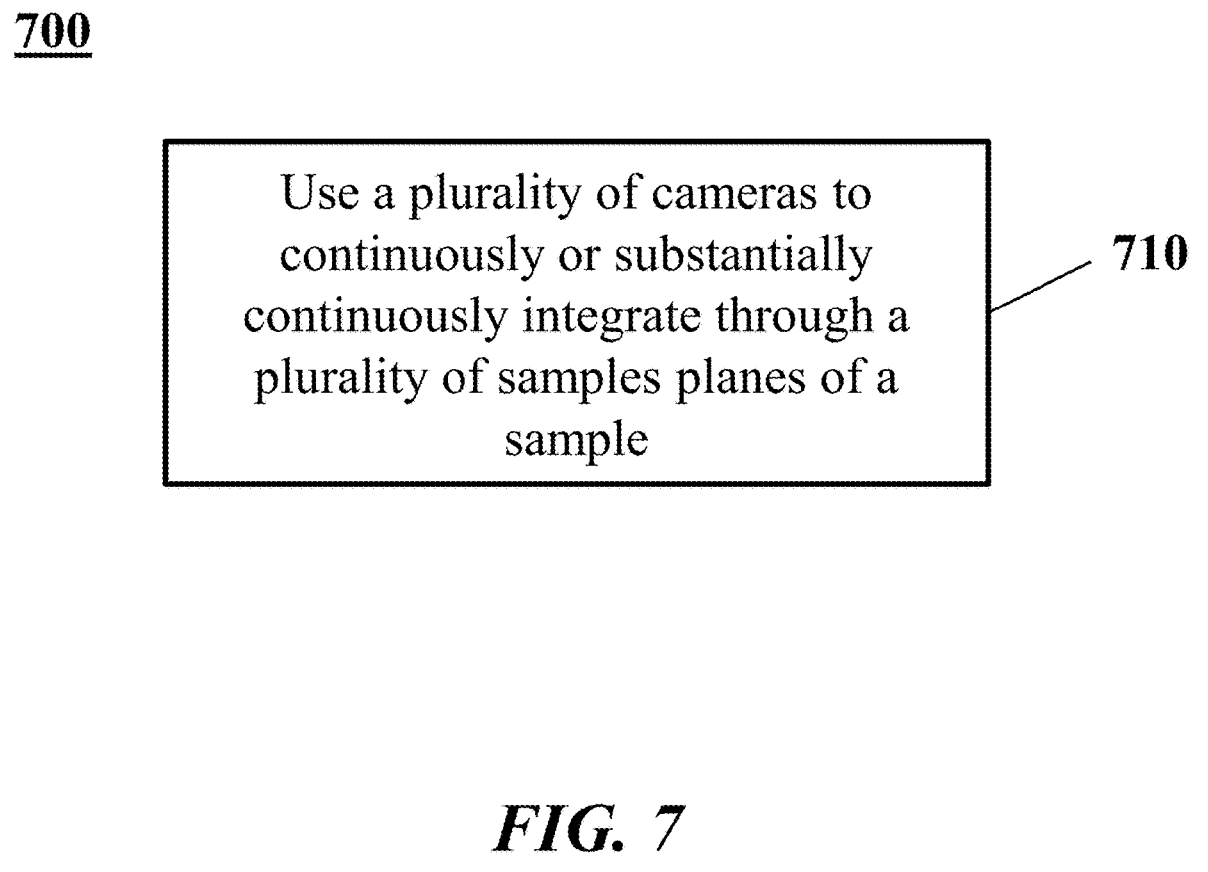

700

Use a plurality of cameras to continuously or substantially continuously integrate through a plurality of samples planes of a sample

METHODS AND SYSTEMS FOR VOLUMETRIC IMAGING

CROSS REFERENCE

This application is a continuation application of PCT/US25/18783, filed Mar. 6, 2025, which claims the benefit of U.S. Provisional Patent Application No. 63/562,543 filed Mar. 7, 2024, and U.S. Provisional Patent Application No. 63/745,212 filed Jan. 14, 2025, each of which is incorporated herein by reference in its entirety.

BACKGROUND

Imaging-based in situ multi-omic tools (e.g., genomic, transcriptomic, and proteomic profiling through in situ deoxyribonucleic acid/ribonucleic acid (DNA/RNA) hybridization, in situ DNA/RNA sequencing, and in situ analyte barcode sequencing) may show great promise in elucidating tissue structure-function relationships in important biological systems. However, prior methods of three-dimensional imaging of samples with sub-micrometer resolution can be a slow and labor-intensive process.

SUMMARY

High resolution volumetric imaging of biological samples can provide information not only about the presence of particular genes or analytes within the sample, but also the location of the analytes. Acquiring such imaging can be slow, as discrete imaging of a large volume can have a number of movement operations in between imaging operations, and the time spent waiting for the system to settle and move can slow overall image acquisition by a factor of two or more.

Surprisingly, the present disclosure describes that continuously moving the sample along the optical axis while imaging can provide significantly increased throughput while maintaining high resolution. Additionally, by continuously reading out the output from a sensor or sensor rather than waiting for the sensor to fully read before acquiring a new image, the throughput of the system can be further enhanced.

In an aspect, provided herein is a method of volumetric imaging of a sample. The method can comprise providing a three-dimensional sample disposed on a stage; providing an imaging module configured to create an image, the imaging module comprising an objective lens configured to transmit photons from one or more object planes within the sample to one or more sensors; and moving the objective lens relative to the sample, while simultaneously using the imaging module to acquire a series of images corresponding to one or more object planes within the sample.

In another aspect, provided herein is a method of volumetric imaging of a sample, the method comprising: (a) providing a three-dimensional sample disposed on a stage; (b) providing an imaging module, imager, imaging device, or imaging system, comprising an objective lens to transmit photons from one or more object planes within the sample to one or more sensors; and (c) moving the objective lens relative to the sample while simultaneously using the imaging module, imager, imaging device, or imaging system, to acquire a series of images corresponding to a plurality of object planes within the sample.

In some embodiments, the objective lens is moved toward the sample.

In some embodiments, the objective lens is moved away from the sample.

In some embodiments, the objective lens is moved in a direction substantially parallel to an optical axis of the objective.

In some embodiments, the objective lens is moved substantially continuously during a time period at which the imaging module simultaneously acquires the series of images.

In some embodiments, the series of images correspond to a plurality of adjacent object planes within the sample.

In some embodiments, the series of images comprise a video.

In some embodiments, the sensor is a CMOS sensor.

In some embodiments, the sensor is a rolling shutter sensor.

In some embodiments, the sensor is a global shutter sensor.

In some embodiments, the sensor comprises an array of pixels.

In some embodiments, the array of pixels are organized into multiple groups of pixels, whereby each group of pixels are read in series while the remaining groups of pixels are integrating photons.

In some embodiments, the sensor integrates photons with a duty cycle of greater than about 90%.

In some embodiments, the imaging module is a confocal microscope.

In some embodiments, the imaging module is a light sheet microscope.

In some embodiments, the imaging module, imager, imaging device, or imaging system, comprises sensors imaging in multiple passbands.

In some embodiments, the objective lens transmits photons to a plurality of sensors.

In some embodiments, each of the plurality of sensors integrate photons having a different wavelength.

In some embodiments, each sensor of the plurality of sensors is oriented to produce parallel object planes.

In some embodiments, the object plane is angled relative to the stage.

In some embodiments, the object plane is not orthogonal to the optical axis.

In some embodiments, an angle of the object plane relative to the optical axis is less than about 1 milliradian.

In some embodiments, the method further comprises applying a mathematical transformation to the series of images to correct for an angle relative to the optical axis.

In some embodiments, the objective lens is moved, and the sample is stationary.

In some embodiments, the sample is moved, and the optical lens is stationary.

In some embodiments, a relative distance between the objective lens and the sample is increasing.

In some embodiments, a relative distance between the objective lens and the sample is decreasing.

In some embodiments, the objective lens is moved relative to the sample until a field of view has been imaged to a chosen depth.

In some embodiments, the series of images cover a field of view.

In some embodiments, the method further comprises repeating (a)-(d) to provide a volumetric image at a plurality of adjacent fields of view.

In some embodiments, the volumetric images at the plurality of adjacent fields of view are mathematically joined into a continuous imaged volume.

In some embodiments, the plurality of adjacent fields of view are imaged spanning an imaged volume of the sample.

In some embodiments, the method further comprises moving the objective lens relative to the sample in a direction substantially perpendicular to the optical axis of the objective, such that the imaging module is capable of imaging a second field of view of the sample.

In some embodiments, a velocity of the objective lens relative to the sample varies by less than about 5% during a period of time when the objective lens is continuously moved relative to the sample.

In some embodiments, the objective lens is moved relative to the sample at a velocity such that a second object plane of the adjacent object planes is stacked on a first object plane of the adjacent object planes.

In some embodiments, each of the series of images has a depth of focus.

In some embodiments, each of the series of images is separated by approximately one depth of focus.

In some embodiments, a velocity of the objective lens relative to the sample is coordinated with a frame rate of the sensor such that the series of images are separated by approximately one depth of focus.

In some embodiments, the sample is illuminated.

In some embodiments, the sample is illuminated with a laser.

In some embodiments, the sample is illuminated at one or more portions of the sample corresponding to the object plane.

In some embodiments, the imaging module, imager, imaging device, or imaging system, comprises a spinning disk.

In some embodiments, the spinning disk is configured to enrich the transmitted photons to photons that arise from the object plane within the sample.

In some embodiments, the sample is a tissue sample.

In some embodiments, the sample is a cleared and hydrogel stabilized tissue sample.

In some embodiments, the sample comprises fluorescently labeled loci.

In some embodiments, the fluorescently labeled loci are associated with locations of a biomolecule.

In some embodiments, the volumetric image of the sample indicates locations at which an RNA is expressed or a protein is produced.

In some embodiments, the volumetric image comprises locations at which a fluorescently labeled nucleotide has been incorporated into a growing nucleic acid strand.

In some embodiments, the volumetric image comprises locations at which a fluorescently labeled oligonucleotide has been ligated onto a nucleic acid template.

In some embodiments, the growing nucleic acid strand is at least partially complimentary to a sequence of interest.

In some embodiments, (b)-(d) are repeated for incorporation of each of type of nucleotide (A, C, T, and G), thereby determining a nucleotide sequence of the sequence of interest.

In some embodiments, the tissue sample comprises at least 500,000 cells.

In some embodiments, at least about 500 sequences of interest are sequenced.

In some embodiments, the series of images are acquired with a duty cycle of at least about 90%.

In some embodiments, the series of images are acquired at a rate of at least about 100,000,000 voxels/second on each of two or more wavelength channels.

In some embodiments, the series of images comprise at least 50 images.

In some embodiments, the method further comprises performing fluidic operations on the sample.

In some embodiments, the fluidic operations comprise labeling, stripping, aspirating, dispensing, incubating, or any combination thereof.

In some embodiments, multiple samples are loaded onto multiple areas of the stage.

In some embodiments, the series of images are acquired from a first sample while a second sample is undergoing a fluidic operation or an incubation period.

In some embodiments, the series of images comprise signals acquired at fixed locations within the sample.

In some embodiments, the method further comprises associating the signals and locations with a reference database.

In some embodiments, the method further comprises extracting signals from the series of images within 20 seconds of acquiring the series of images.

In some embodiments, the signals are extracted from the series of images without saving the series of images.

In another aspect, provided herein is a system for volumetric imaging of a sample. The system can comprise: a stage configured to hold a three-dimensional sample; and an imaging module configured to create an image, the imaging module comprising an objective lens configured to transmit photons from one or more object planes within the sample to a sensor; wherein the system is configured to move the objective lens relative to the sample in a direction substantially toward or away from the sample, while simultaneously, using the imaging module to acquire a series of images corresponding to the one or more object planes within the sample.

In another aspect, provided herein is a system for volumetric imaging of a sample, the system comprising: (a) a stage configured to hold a three-dimensional sample; and (b) an imaging module, imager, imaging device, or imaging system, to create an image, the imaging module, imager, imaging device, or imaging system, comprising an objective lens to transmit photons from one or more object planes within the sample to a sensor, wherein the imaging module, imager, imaging device, or imaging system, is configured to move the objective lens relative to the sample in a direction substantially toward or away from the sample while simultaneously using the imaging module to acquire a series of images corresponding to the one or more object planes within the sample.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure.

Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 1A shows a schematic drawing of an example upright microscopy system for use as described herein. FIG. 1B shows a schematic drawing of an example inverted microscopy system with a confocal filter for use as described herein. FIG. 1C shows a schematic drawing of an example inverted microscopy system for use as described herein. FIG. 1D shows a schematic drawing of an example inverted microscopy system where a sample is held or provided in a flow cell for use as described herein.

FIG. 7 is a flowchart of a method, according to some embodiments.

DETAILED DESCRIPTION

Figure 1A:
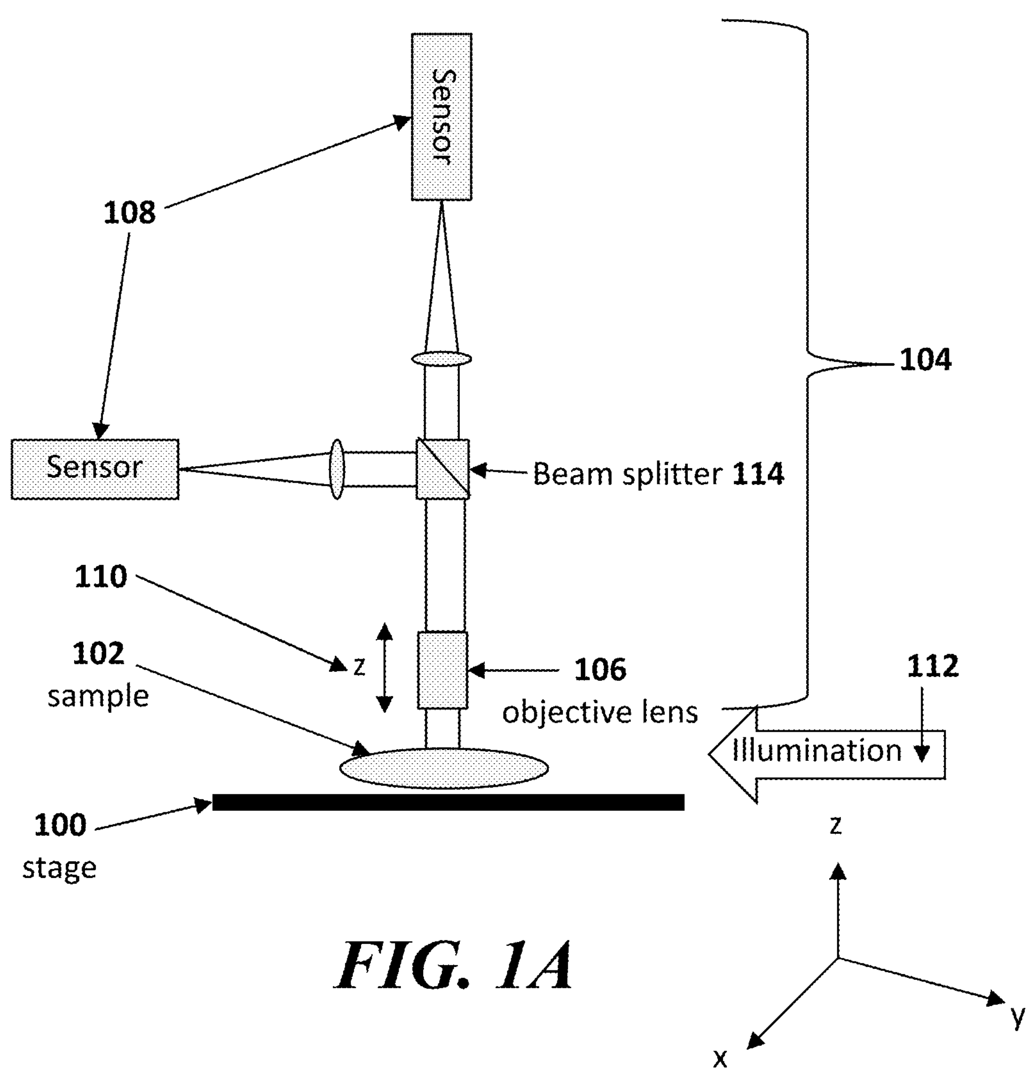
FIGS. 1A-1D show schematic drawings of example microscopy systems for use as described herein.

While various embodiments have been shown and described herein, it will be obvious to those skilled in the art that such embodiments are provided by way of example only. Numerous variations, changes, and substitutions may occur to those skilled in the art without departing from the invention. It should be understood that various alternatives to the embodiments described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "at most," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every sub range and value within the range is present as if explicitly written out. The term "about" or "approximately" may mean within an acceptable error range for the particular value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

As used herein, the term "cell" generally refers to an engineered cell, e.g., an engineered active cell, or a cell that is not engineered, e.g., a non-engineered active cell. In some instances, cell may refer to, inter alia, stem cells, endothelial cells, muscle cells, myocardial cells, smooth muscle cells, skeletal muscle cells, mesenchymal cells, epithelial cells; hematopoietic cells, adipocytes, neuronal cells, and non-neuronal cells or genetically modified cells thereof. In some instances, the cells are a transformed (e.g., cancerous, e.g., neoplastic) cell type. In some cases, the cell is a cell type available in the American Type Culture Collection (ATCC) or the German Collection of Microorganisms and Cell Cultures (DSMZ). In some cases, the cells are derived spontaneously. In some cases, the cells are selected for some desired trait (e.g., doubling time, e.g., drug resistance).

As used herein, the term "confocal" generally refers to an optical imaging system having an intermediate focal plane comprising one or more spatial filters (pin holes) used to control inbound illumination and outbound scattered or fluorescent light. The spatial filters may be used to reject out of object plane light.

As used herein, the term "detection tag" generally refers to any chemical or physical entity that allows for visualization of a volume within a sample. In some instances, a detection tag is a fluorescent label. In some cases, a detection tag is a fluorescent label that is attached to a nucleotide or oligonucleotide within a sample (e.g., a tissue, e.g., a cell). In some cases, the detection tag is treated with one or more agents known to enhance its signal. For example, silver or gold nanoparticles may be used to enhance signal from some fluorescent labels.

As used herein, the term "duty cycle" generally refers to the fraction of time, often over a cycle, spent doing useful work. In this context, duty cycle may refer to the fraction of a data acquisition cycle spent integrating, i.e., collecting (integrating) photons. In the larger context of the instrument, it may refer to the fraction of run time spent acquiring data or more specifically collecting photons.

As used herein, the term "fixing" or "fixation" generally refer to the process of preserving biological material (e.g., biological tissue, e.g., cells) from decay or degradation. Fixation may be accomplished using any art recognized protocol. Fixation can include contacting the sample with a fixation reagent (e.g., formaldehyde, e.g., methanol, e.g., acetone) for the requisite amount of time.

As used herein, the term "frame" generally refers to an image in a video or a z-stack.

As used herein, the term "frame rate" generally refers to the number of frames acquired per unit time, typically reported in Hz. In high duty cycle imaging the integration time may be roughly the reciprocal of the frame rate.

As used herein, the term "image" generally refers to a representation of the sample. In some cases, the image does not have to be a visual representation. The image can be a digital representation, e.g., comprising signals and coordinates of signals. The signals can be a number of photon-electrons captured at a given wavelength over a given period of time. The coordinates can be coordinates with respect to the sample given a mathematical transform accounting for the imaging system, e.g. magnifications and reflections.

The image may refer to 2-dimensional data collected on a sensor. Typically, an optical system may focus an object on the sensor where the image is collected in the form of photoelectrons. If the optical system is static, the focused image may comprise a representation of a thin slice of the object (object plane) within the depth-of-focus of the system. If the sample and optical system are in relative z-motion, then the image may comprise a representation of a slice of the object whose depth includes the depth-of-focus and the relative z-distance traveled during the integration time (the time during which photo-electrons are captured). The resulting 2-dimensional data may comprise pixels integrated over the same time interval (global shutter) or pixels integrated over staggered and overlapping intervals (rolling shutter). Image (the verb) can refer to a process of acquiring an image (the noun).

As used herein, the term "integration" in the context of imaging generally refers to a collection or accumulation of photons. For a single frame this may comprise the time a physical shutter is open or the time that an object is illuminated. Electronic shutters (global or rolling) may also define the time interval although in the latter case the interval is time shifted throughout the image.

As used herein, the term "object plane" or "object surface" generally refer to the surface or slice within the object (sample e.g.) corresponding to a two-dimensional image. If the image is acquired with global shutter, the object plane or slice may be orthogonal to the optical axis in the sample. If the image is acquired with rolling shutter, the object plane may correspond to one (or more) planes slightly skew to the optical axis in the sample. In some cases, the image may be divided into blocks of rows, each of which reads out in parallel thereby creating multiple planes, perhaps in a saw-tooth arrangement. Rolling shutter systems may subdivide the sensor into zones and are read out in parallel, each of which would comprise a plane in this context. Generally, an image may correspond to a depth about an object surface where the depth comprises a depth of focus in addition to any motion of the of the system during integration. Acceleration during acquisition may create non-planar object surfaces.

As used herein, the term "permeabilize" generally refers to the process of rendering a sample (e.g., tissue or cells) permeable to experimental reagents or probes. For example, the probes may be those required for in situ transcriptomics (e.g., in situ RNA sequencing). Suitable permeabilization reagents may include, inter alia, detergents (e.g., Saponin, Triton X-100, or Tween-20). In some instances, the probe may comprise one or more detection tags (e.g., a detection tag as described herein).

As used herein, the term "rolling shutter" generally refers to a method of image capture in which a still picture (in a still camera) or each frame of a video (in a video camera) is captured not by taking a snapshot of the entire scene at a single instant in time but rather by scanning across the scene rapidly, vertically, horizontally, or rotationally. In other words, not all parts of the image of the scene may be recorded over the same time interval. Though, during playback, the entire image of the scene may be displayed at once, as if it represents a single instant in time. This may produce predictable distortions of fast-moving objects or rapid flashes of light. This is in contrast with "global shutter" in which the entire frame may be integrated over the same interval.

As used herein, the term "skew angle" generally refers to the deviation of a rolling shutter object plane from perpendicular to the optical axis. For continuous integration, this would amount to one z voxel over the image row width, typically thousands of pixels.

As used herein, the term "tissue" generally refers to one or more portions of an organism comprising cells, optionally including a natural or artificial extracellular matrix. The tissue can be chemically or physically modified from its native state, including by clearing opaque matter and stabilizing with hydrogel. In some cases, tissue may refer to a group of epithelial cells, muscle cells, or nerve cells. Tissue may include tissue collected from any subject. For example, tissue may be collected from a biopsy or an autopsy. In some instances, a tissue may be visualized or imaged immediately or may be stored prior to analysis.

As used herein, the term "voxel" generally refers to a 3-dimensional sample of a volume. Typically, this refers to a pixel in a 3-dimensional image stack. The size of a voxel may be set, in the x-y plane by the size of the sensor pixel and the transverse magnification of the optical system. The z-size of a voxel may be set by one or more of the depths of focus, the z-separation of images in an image stack, or the z-distance traveled during image integration.

Systems

In an aspect, the present disclosure provides system for analyzing one or more samples as described herein. In some cases, the system may comprise a system for volumetric imaging of a sample. In some cases, the sample may comprise a two-dimensional sample or a three-dimensional sample. In some instances, the system may comprise a stage to hold the sample. Additionally, the system may comprise an imaging module, imager, imaging device, or imaging system that creates an image of one or more portions of the sample. The one or more portions of the sample may comprise one or more adjacent portions across a surface of the sample. In some instances, the one or more portions of the sample may comprise one or more adjacent portions of the sample along an axis normal to the surface of the sample. In some cases, the one or more portions of the sample may comprise one or more object planes within the sample. In some cases, the imaging module, imager, imaging device, or imaging system may comprise an objective lens that transmits photons from one or more object planes within the sample to a sensor of the imaging module, imager, imaging device, or imaging system. In some cases, the objective lens may collect, relay, or direct photons scattered from the sample to one or more optical system components when an illumination of the illumination source is provided to the sample. The object plane within the sample may comprise a plane within the sample from which scattered photons from the one or more portions of the sample are imaged onto one or more sensors of the imaging module, imager, imaging device, or imaging system.

In some cases, the imaging module, imager, imaging device, or imaging system may move the objective lens relative to the sample along an optical axis of the objective. In some cases, the system may move the objective lens relative to sample in a direction parallel or substantially parallel to the optical axis of the objective. In some cases, moving the objective lens relative to the sample in a direction substantially parallel to the optical axis of the objective may comprise moving the objective lens along an axis that is parallel within up to about 1%, up to about 2%, up to about 3%, up to about 4%, or up to about 5% parallel with the optical axis of the objective. In some cases, moving the objective lens relative to the sample in a direction substantially parallel to the optical axis of the objective may comprise moving the objective lens along an axis that is parallel within up to about 0.010, up to about 0.05°, up to about 0.1°, up to about 0.5°, up to about 1.0°, or up to about 3.0° with the optical axis of the objective In some cases, the objective lens is moved relative to the sample, but not along an optical axis of the objective. The objective lens can be moved substantially toward or substantially away from the sample. For example, moving the objective lens toward the sample at an angle relative to the optical axis can image a trapezoidal field of view of the sample.

In some cases, the system may continuously move the objective lens relative to the sample along an optical axis of the objective. The optical axis of the objective lens may comprise an axis that is co-linear or parallel with an axis through the center of the objective lens. In some instances, the system may continuously move the objective lens relative to the sample in a direction parallel or substantially parallel to the optical axis of the objective. In some cases, while the objective lens of the system is moving (e.g., continuously) relative to the sample along the optical axis of the objective, the imaging module, imager, imaging device, or imaging system may acquire a series of images. In some cases, the series of images may correspond to adjacent object planes within the sample.

Figure 1B:
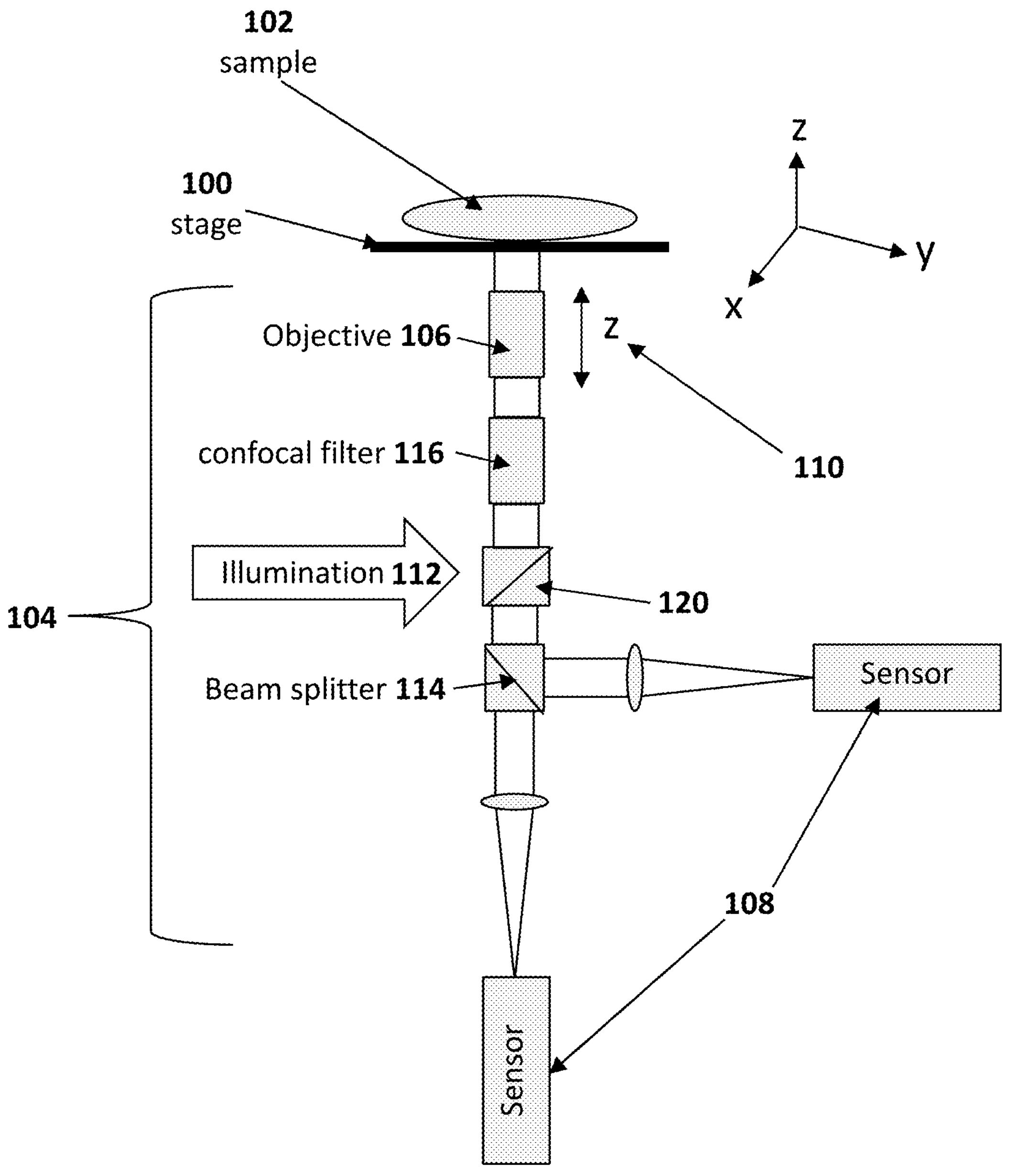
Figure 1C:
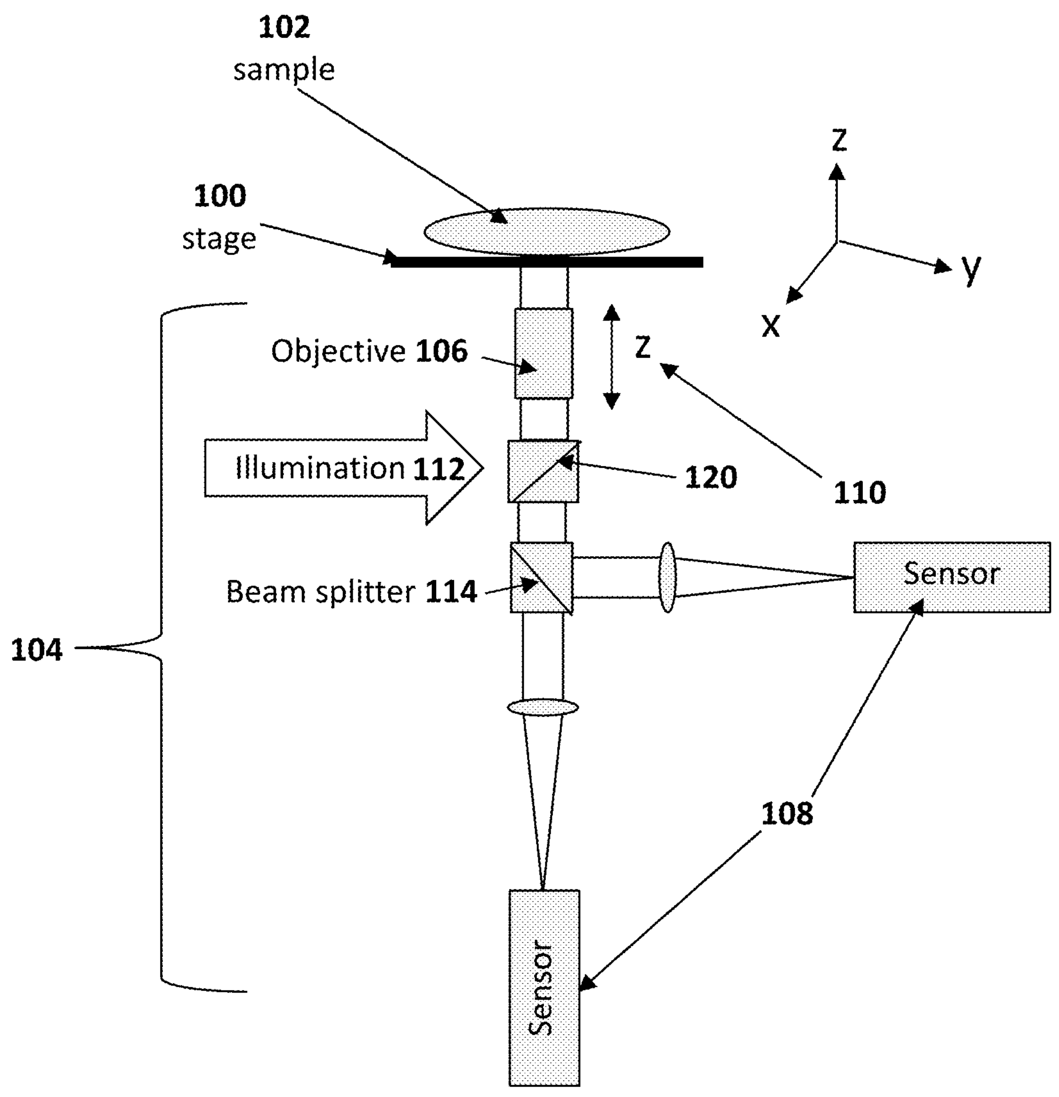
Figure 1D:
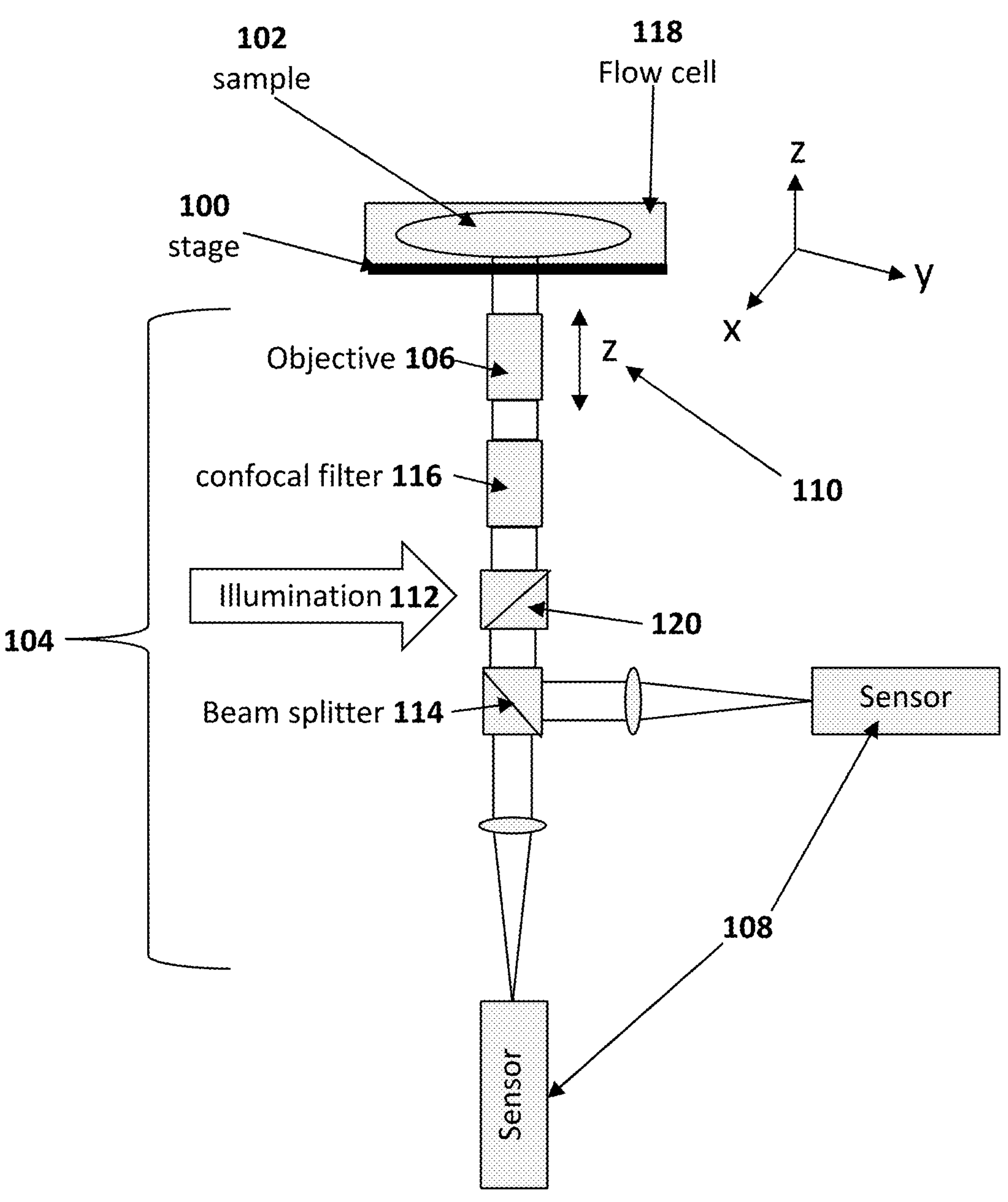

FIGS. 1A-1D illustrate a schematic drawing of an example microscopy system for use as described herein. In some cases, the microscopy system may comprise an upright microscopy system, as shown in FIG. 1A. In some instances, the microscopy system may comprise an inverted microscopy system as shown in FIGS. 1B-1D.

The system described herein can be used for volumetric imaging of a sample. With reference to FIG. 1A, the system can include a stage 100 configured to hold a three-dimensional or two-dimensional sample 102. In some cases, the sample 102 may be housed, provided, held, or contained, or any combination thereof, within a holder, as described herein.

The system can include an imaging module, imager, imaging device, or imaging system 104 configured to create an image. The imaging module, imager, imaging device, or imaging system can include an objective lens 106 configured to transmit photons from one or more object planes within the sample to one or more sensors 108. The system can be configured to continuously move the objective lens relative to the sample in a direction substantially parallel to an optical axis of the objective, i.e., a z-direction 110, described herein. In some cases, the system may move the objective lens 106 relative to the sample 102 with a z-axis scanner coupled to the objective lens. In some cases, the z-axis scanner may comprise a stage or an actuator (e.g., linear actuator). A control unit in electrical communication with the z-axis scanner and the system may provide a command to the z-axis scanner to move or translate the objective lens 106, as described herein. The system can be configured to simultaneously use the imaging module, imager, imaging device, or imaging system to acquire a series of images corresponding to adjacent object planes within the sample. In some cases, one or more sensors may simultaneously collect or acquire photons scattered from a plurality of object planes (e.g., a plurality of adjacent object planes) of the sample onto one or more sensors while the objective lens of the imaging system is moved in a direction towards a surface of one or more portions of the sample, or away from a surface of the one or more portions of the sample, or any combination thereof. The sensor can be a camera. The series of images can comprise a video.

The system may comprise one or more light sources configured to illuminate the one or more samples, or the one or more portions of the one or more samples. Continuing with FIG. 1A, the imaging module, imager, imaging device, or imaging system can include a system or device for illuminating 112 the sample (e.g., a laser). In some cases, the imaging system may comprise an illumination source 112 for illuminating the sample. In some cases, the illumination from an illumination source 112 may be provided orthogonal to an optical axis of the objective lens 106. The sample can be illuminated at one or more portions of the sample corresponding to the object plane. However, other portions of the sample can also be illuminated. The illuminated sample can produce one or more photons or a plurality of photons that are transmitted to the one or more sensors 108. For example, when the one or more portions of the sample are illuminated by the illumination source 112, the sample may scatter, absorb, or reflect, one or more photons of the illumination source. The objective lens 106 can transmit the scattered or reflected photons to a plurality of sensors. In some cases, the objective lens 106 may collect, direct, or relay the one or more photons scattered or reflected from the one or more portions of the sample onto one or more sensors.

In some cases, the disclosure provides an inverted confocal microscopy system for analyzing one or more samples, as shown in FIG. 1B. In some cases, the inverted confocal microscopy system may comprise an imaging module, imager, imaging device, or imaging system 104. The imaging module, imager, imaging device, or imaging system 104 may comprise a confocal filter 116. The confocal filter 116 may comprise a pinhole. In some cases the confocal filter 116 may comprise a plurality of pin holes. In some cases, the confocal filter 116 may comprise one or more confocal spinning disks, as described herein. In some cases, the confocal filter 116 may couple light from an illumination source 112 through the one or more pin holes of the confocal filter 116 to an objective lens 106 that focuses the illumination source onto one or more portions of the sample 102. In some instances, the confocal filter 116 may couple, direct, or relay illumination 112 photons reflected or scattered from the sample 102 through one or more pin holes of the confocal filter 116 to one or more sensors 108. In some cases, the photons reflected or scattered from the sample 102 directed through the one or more pin holes of the confocal filter 116 may be optically coupled to, transmitted through, or a combination thereof, a filter 120 (e.g., a dichroic filter), beam splitter 114, or a combination thereof. In some cases, the confocal filter 116 may be optically coupled to the objective lens 106, the filter 120, or a combination thereof. In some cases, imaging module, imager, imaging device, or imaging system 104 may comprise a beam splitter 114, where the beam splitter may transmit or reflect the one or more photons scattered or reflected from the one or more portions of the sample based on at least a wavelength or wavelength band of the one or more photons. In some cases, the beam splitter 114 may transmit a first one or more photons of a first wavelength or a first wavelength band to a first sensor and transmit a second one or more photons of a second wavelength or a second wavelength band to a second sensor. In some cases, the imaging module, imager, imaging device, or imaging system 104 may comprise an illumination source 112 that illuminates one or more portions of the sample. In some cases, an output illumination of the illumination source 112 may be optically coupled to the sample 102 by a filter 120. The filter 120 may reflect an illumination output of the illumination source 112 towards the confocal filter 116 and objective lens 106 to focus the illumination onto the sample 102. In some instances, the filter 120 may be optically coupled to the illumination source 112, the confocal filter 116, or the beam splitter 114, or any combination thereof. In some cases, the filter 120 may transmit the one or more scattered or reflected photons from the sample to the beam splitter 114 when the one or more portions of the sample are illuminated by the illumination source 112. In some cases, the objective lens 106 may be translated or moved along a z-direction 110 towards a surface of the sample 102, away from a surface of the sample 102, or any combination thereof. In some cases, the objective lens 106 may be coupled to a z-axis scanner, described herein, that may translate or move the objective lens 106. In some cases, the sample 102 may be provided on a substrate (e.g., a stage 100), where the substrate may translate or move a position of a sample on a two-dimensional plane.

In some cases, the disclosure provides an inverted microscopy system for analyzing one or more samples, as shown in FIG. 1C. In some cases, the inverted confocal microscopy system may comprise an imaging module, imager, imaging device, or imaging system 104. In some cases, the imaging module, imager, imaging device, or imaging system 104 may comprise an illumination source 112 that illuminates one or more portions of the sample 102. In some cases, an output illumination of the illumination source 112 may be optically coupled to the sample 102 by a filter 120. The filter 120 may reflect an illumination output of the illumination source 112 towards the object lens 106 to focus the illumination onto the sample 102. In some instances, the filter 120 may be optically coupled to the illumination source 112, or the beam splitter 114, or any combination thereof. In some cases, the filter 120 may transmit the one or more scattered or reflected photons from the sample to the beam splitter 114 when the one or more portions of the sample 102 are illuminated by the illumination source 112. In some cases, the beam splitter 114 may transmit a first one or more photons of a first wavelength or a first wavelength band to a first sensor and transmit a second one or more photons of a second wavelength or a second wavelength band to a second sensor. In some cases, the objective lens 106 may be translated or moved along a z-direction 110 towards a surface of the sample 102, away from a surface of the sample 102, or any combination thereof. In some cases, the objective lens 106 may be coupled to a z-axis scanner, described herein, that may translate or move the objective lens 106. In some cases, the sample 102 may be provided on a substrate (e.g., a stage 100), where the substrate may translate or move a position of the sample 102 on a two-dimensional plane.

In some instances, the disclosure provides an inverted confocal microscopy system for analyzing one or more samples provided in a flow cell 118, as shown in FIG. 1D. In some cases, the inverted confocal microscopy system shown in FIG. 1D may comprise an imaging module, imager, imaging device, or imaging system 104. The imaging module, imager, imaging device, or imaging system 104 may comprise a confocal filter 116. The confocal filter 116 may comprise a pinhole. In some cases the confocal filter 116 may comprise a plurality of pin holes. In some cases, the confocal filter 116 may comprise one or more confocal spinning disks, as described herein. In some cases, the confocal filter 116 may couple light from an illumination source 112 through the one or more pin holes of the confocal filter 116 to an objective lens 106 that focuses the illumination source 112 onto one or more portions of the sample 102. In some instances, the confocal filter 116 may couple, direct, or relay illumination 112 photons reflected or scattered from the sample 102 through one or more pin holes of the confocal filter 116 to one or more sensors 108 through the filter 120 and beam splitter 114. In some cases, the confocal filter 116 may be optically coupled to the objective lens 106, the filter 120, or a combination thereof. The imaging module, imager, imaging device, or imaging system 104 of the inverted microscopy system may comprise one or more sensors 108 that may image one or more photons scattered or reflected from one or more portions of the sample 102 when the one or more portions of the sample 102 are illuminated by the illumination source 112. In some cases, the imaging module, imager, imaging device, or imaging system 104 may comprise a beam splitter 114, where the beam splitter may transmit a first one or more photons of a first wavelength or a first wavelength band to a first sensor and transmit a second one or more photons of a second wavelength or a second wavelength band to a second sensor. In some cases, the imaging module, imager, imaging device, or imaging system 104 may comprise an illumination source 112 that illuminates one or more portions of the sample 102. In some cases, an output illumination of the illumination source 112 may be optically coupled to the sample 102 by a filter 120. The filter 120 may reflect an illumination output of the illumination source 112 towards the objective lens 106 to focus the illumination onto the sample 102. In some instances, the filter 120 may be optically coupled to the illumination source 112, the objective lens 106, or the beam splitter 114, or any combination thereof. In some cases, the filter 120 may transmit the one or more scattered or reflected photons from the sample 102 when the one or more portions of the sample are illuminated by the illumination source 112, to the beam splitter 114. In some cases, the sample 102 may be provided, contained, or housed in a flow cell 118.

The illumination from the illumination source 112 provided or directed to the sample (e.g., of the one or more samples) 102 may cause the one or more samples to reflect or scatter one or more photons. In some cases, collecting or detecting, and processing the reflected or scattered one or more photons from the sample may generate one or more signals in one or more voxels of the sample. In some cases, the one or more voxels of the sample may correspond to position (e.g., a three-dimensional position or coordinate) and corresponding volume within the sample where the one or more scattered or reflected photons are detected or collected. The illumination from the illumination source 112 provided or directed to one or more object planes (e.g., one or more adjacent object planes) of the sample may cause the sample to reflect or scatter one or more photons. In some cases, collecting or detecting, and processing the reflected or scattered one or more photons from the one or more object planes may generate one or more signals from the one or more object planes of the one or more samples. The one or more voxels may comprise a plurality of object planes of the sample. The illumination may comprise an illumination in a plurality of wavelength bands (e.g., in a plurality of colors). The plurality of wavelength bands may correspond to the excitation wavelengths for a plurality of fluorophores or other labels within the sample, described herein. In some cases, the plurality of wavelength bands of the illumination provided to the sample may cause the plurality of fluorophores or other labels of the sample to absorb the plurality of wavelength bands and emit or scatter one or more photons. The one or more photons emitted by the plurality of fluorophores or other labels of the sample may be detected or collected and processed as one or more signals of the one or more voxels of the sample. The one or more photons emitted by the plurality of fluorophores or other labels may be detected or collected and processed as one or more signals of the one or more object planes of the sample. The light source may be configured to provide light sheet illumination to the sample as described elsewhere herein. In some cases, the light source may comprise a lens (e.g., a cylindrical lens), whereby the output illumination of the light source transmitting through the lens may form a light sheet illumination. For example, the light source can comprise a laser and optical elements (e.g., spatial light modulator, cylindrical lens, etc.) to generate or provide a flat sheet of light to the sample.

The one or more light sources may be configured to continuously operate (e.g., may be configured to continuously illuminate the voxel that is being detected by the one or more sensors). For example, the one or more light sources may be configured to illuminate the one or more samples throughout a detecting process as described herein. For example, the one or more light sources may illuminate throughout a detecting process of the system. In some cases, the detecting process may comprise collecting, detecting, or integrating, or any combination thereof, one or more scattered or reflected photons from the sample in response to an illumination of the sample by an illumination source. In some cases, the detecting process may comprise integrating, reading, or a combination thereof operations, of the sensor to convert the detected one or more photons into a signal (e.g., an electrical signal).

The imaging module, imager, imaging device, or imaging system can be a light sheet microscope or a confocal microscope. For example, the system may be configured to confocally image the one or more samples. The confocal microscopy system may comprise a spinning disk confocal microscopy system. For example, the confocal microscopy system may use a spinning disk configured to reject one or more portions of the light moving through the system to achieve the confocal focus. In some cases, the spinning disk may enrich one or more photons that arise from the sample (e.g., are scattered or reflected) and transmitted to one or more sensors. For example, by utilizing the spinning disk, the one or more photons that are transmitted from the sample to the one or more sensors may be limited to only the photons that arise from the depth of focus based on a size of one or more pinholes of the spinning disk, the depth of focus of the objective lens, or a combination thereof. The geometric restriction to the scattered or reflected photons of the sample enabled by the spinning disks with one or more pin holes may increase the resolution of the signal collected or detected in the one or more voxels of the sample compared to a resolution of a confocal imaging system that did not use the spinning disk with one or more pin holes. In some cases, the confocal microscopy system may use one or more spinning disks to reject one or more portions of the light moving through the system to achieve the confocal focus. The confocal microscopy system may comprise a plurality of spinning disks each comprising a plurality of pinholes configured to reject out of angle light for one or more illumination or one or more detection channels. The plurality of spinning wheels can enable parallel acquisition in a plurality of wavelength bands. For example, each wheel of the plurality of spinning wheels can acquire a different wavelength band of the plurality of wavelength bands.

The imaging module, imager, imaging device, or imaging system can include a beam splitter 114 configured to split the beam of transmitted photons into a plurality of sensors (e.g., cameras). The imaging module, imager, imaging device, or imaging system can include sensors imaging in multiple passbands. In some cases, each of the plurality of sensors may integrate photons having a different wavelength. Each sensor can be oriented to produce parallel object planes.

The system may comprise one or more sensors as described elsewhere herein. The one or more sensors may be configured to receive the one or more signals from the voxel of the sample, described herein. The one or more sensors may comprise one or more global shutter sensors. The sensor can comprise an array of pixels. The array of pixels may be organized into multiple groups of pixels, where each group of pixels are read in series while the remaining groups of pixels are integrating photons. For example, all of the rows of pixels (e.g., bins) in the sensor can be read out at the same time. The one or more sensors may comprise one or more rolling shutter sensors. The sensor may comprise a charge coupled device (CCD) detector, a complementary metal oxide semiconductor (CMOS) sensor, or the like. The system may comprise a plurality of sensors.

The system can achieve a high overall efficiency. For example, efficiency can be determined by what percentage of time the most expensive portions of the system (e.g., image acquisition module) is in use. Some methods may require performing one or more fluidic operations on a sample (e.g., labeling, stripping, aspirating, dispensing, or incubating, or any combination thereof). In some cases, the one or more fluidic operations may comprise aspirating fluid, providing fluid, or dispensing fluid, or any combination thereof, to one or more samples. In such cases, multiple samples can be processed in parallel on the system (e.g., loaded onto multiple areas of a stage). In this way, the series of images can be acquired from a first sample while a second sample is undergoing a fluidic operation or an incubation period. For example, as a first sample of a plurality of samples provided on the stage is imaged by the systems described herein, a second sample of the plurality of samples may undergo one or more fluidic operations simultaneously, in parallel or concurrently. In some cases, the order or sequence of the one or more fluidic operations and the imaging operations may be scheduled or ordered with an order based on at least an assay or reaction conducted on the one or more samples. By imaging and conducting the one or more fluidic operations simultaneously or in parallel, the imaging system may operate with a high throughput in a cost effective manner with reduced down-time and waiting periods between the one or more fluidic operations conducted on one or more samples and subsequent imaging of the one or more samples.

Movement of Objective and Continuous Integration

The system may comprise one or more z-axis scanners configured to continuously or substantially continuously move a focal volume of the imaging module, imager, imaging device, or imaging system, through the sample. In some cases, the z-axis scanner may be releasably coupled to an objective lens. In some cases, the z-axis scanner may be mechanically coupled to the objective lens. Movement or translation of the objective lens can be achieved by moving the objective lens relative to the sample (e.g., in a direction substantially parallel to the optical axis of the objective). In some cases, a relative distance between the objective lens and the sample may be changing as the objective lens moves relative to the sample. The relative distance between the objective lens and the sample may increase or decreased between a first position on a surface of the sample and a second position on the objective lens during imaging or acquiring a series of images from the plurality of objective planes within the sample. The objective lens can be moved (while the sample is stationary) or the sample can be moved (while the optical lens is stationary), or a combination thereof. The objective can be moved toward or away from the sample e.g., a relative distance between the objective lens and the sample can be increasing or decreasing.

Figure 2:
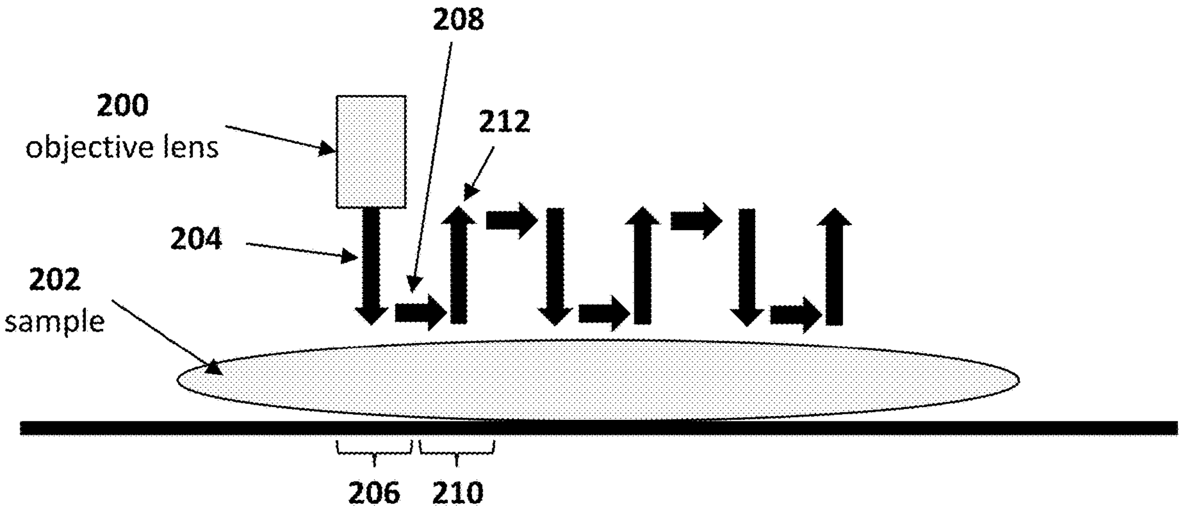
FIG. 2 is an example schematic drawing of a path of movement of the objective lens for imaging of a sample, according to some embodiments of the present disclosure.

FIG. 2 is an example schematic drawing of a path of movement of the objective lens for imaging of a sample, according to some embodiments of the present disclosure. Here, the objective lens 200 may be moved along a path (represented by block arrows) relative to the sample 202. The objective lens can be moved toward 204 the sample (while imaging) until a field of view 206 has been imaged to a chosen depth. Then, the method can further comprise (stopping imaging and) moving the objective lens relative to the sample in a direction substantially perpendicular 208 to the optical axis of the objective, such that the image module, imager, imaging device, or imaging system is capable of imaging a second field of view 210 of the sample. The second field of view can be imaged while moving the objective lens away from 212 the sample. The movement can continue in this way until one or more suitable portions of the sample are imaged. In some cases, imaging may be performed in a consistent direction relative to the sample (i.e., either toward or away from the sample).

There can be advantages of continuous movement while imaging (e.g., compared to imaging a focal plane while the sensor is stationary, moving the objective to an adjacent focal plane, capturing a second planar image while stationary, etc.). One advantage may be that time is not wasted waiting for the objective to accelerate, move, decelerate, and then settle its motion for each layer. Instead, the objective can move at a relatively constant velocity. A second advantage is that the sensor may being used (i.e., photons are being integrated) at substantially all times (i.e., instead of just when the objective is being held steady at each focal plane).

The system may not settle (e.g., pause after movement to reduce artifacts in the images or signals due to movement) between imaging operations. The settling may comprise a time where a stage comprising the sample settles after movement of the stage. The one or more z-axis scanners may be configured to shift (e.g., move) one or more sample stages of the system (e.g., be configured to traverse the one or more sample stages along an optical axis of the one or more sensors), one or more optical elements in optical communication with the one or more sensors (e.g., one or more optical elements (e.g., lenses, filters, micromirror arrays, etc.) configured to optically shift the object plane through the one or more samples), or move the one or more sensors (e.g., shift the one or more sensors to shift the one or more object planes), or any combination thereof.

Use of continuous integration through a volume of a sample via z-axis scanning can improve system throughput and reduce sensor overhead (e.g., cost overhead, time overhead). In this way, large amounts of spatially resolved three-dimensional data can be acquired for a large sample (e.g., a plurality of cells). In some cases, the one or more sensors may be integrating continuously while the one or more z-axis scanners provide new voxels of the one or more samples to detect. In this way, the one or more sensors can be continuously on while not wasting energy or imaging time.

In some cases, a field of view may comprise a field of view of an imaging module, imager, imaging device, imaging system, or any combination thereof, described herein. In some cases, the field of view may comprise a field of view of the objective lens of the imaging module, imager, imaging device, imaging system, or any combination thereof. In some cases, a field of view may comprise a field of view of a sample (206, 207). In some cases, the series of images acquired using the imaging module, imager, imaging device, imaging system, or any combination thereof, described herein can cover one or more fields of view of a sample. The one or more fields of view of the sample may comprise a field of view dimension of the field of view of the imaging module, imager, imaging device, imaging system, or any combination thereof. The imaging method can be repeated to provide a volumetric image at a plurality of adjacent fields of view of the sample. The plurality of image fields of view may be mathematically joined into a continuous imaged volume. In the case of rolling shutter, the joining may involve removing the skew angle induced in the scan to create cartesian axes. Then, image volumes can be corrected for field effects such as pin cushion or barrel distortion, allowing seamless stitching between adjacent volumes. The plurality of fields of view can be imaged spanning an imaged volume of the sample.

The objective can be moved substantially continuously while imaging. For example, the velocity of the objective lens moving relative to the sample can increase or decrease by less than about 5%, less than about 3%, less than about 1%, less than about 0.5%, less than about 0.3%, less than about 0.1%, less than about 0.05%, less than about 0.01%, less than about 0.005%, or less than about 0.001%, during a period of time when the objective lens is continuously moved relative to the sample.

The objective can be moved at any suitable constant velocity. For example, the objective lens may be moved relative to the sample at a velocity such that a second object plane is stacked on a first object plane.

Each of the series of images can have a depth of focus. Each of the series of images can be separated by approximately one depth of focus. In some cases, the series of images are separated by about 1 depth of focus to about 4 depth of focus. In some cases, the series of images are separated by about 1 depth of focus to about 2 depth of focus, about 1 depth of focus to about 3 depth of focus, about 1 depth of focus to about 4 depth of focus, about 2 depth of focus to about 3 depth of focus, about 2 depth of focus to about 4 depth of focus, or about 3 depth of focus to about 4 depth of focus. In some cases, the series of images are separated by about 1 depth of focus, about 2 depth of focus, about 3 depth of focus, or about 4 depth of focus. In some cases, the series of images are separated by at least about 1 depth of focus, about 2 depth of focus, or about 3 depth of focus. In some cases, the series of images are separated by at most about 2 depth of focus, about 3 depth of focus, or about 4 depth of focus.

In some cases, the velocity of the objective lens relative to the sample is coordinated with a frame rate of the sensor such that the series of images are separated by approximately one depth of focus. In some cases, the depth of focus may comprise the depth of focus of the objective lens. In some instances, the depth of focus may comprise the depth of focus of the imaging module, imager, imaging device, or imaging system. In some instances, the depth of focus may comprise the depth of focus of the objective lens in combination with one or more pin holes of the one or more spinning disks.

Volumetric Images

Figure 3:
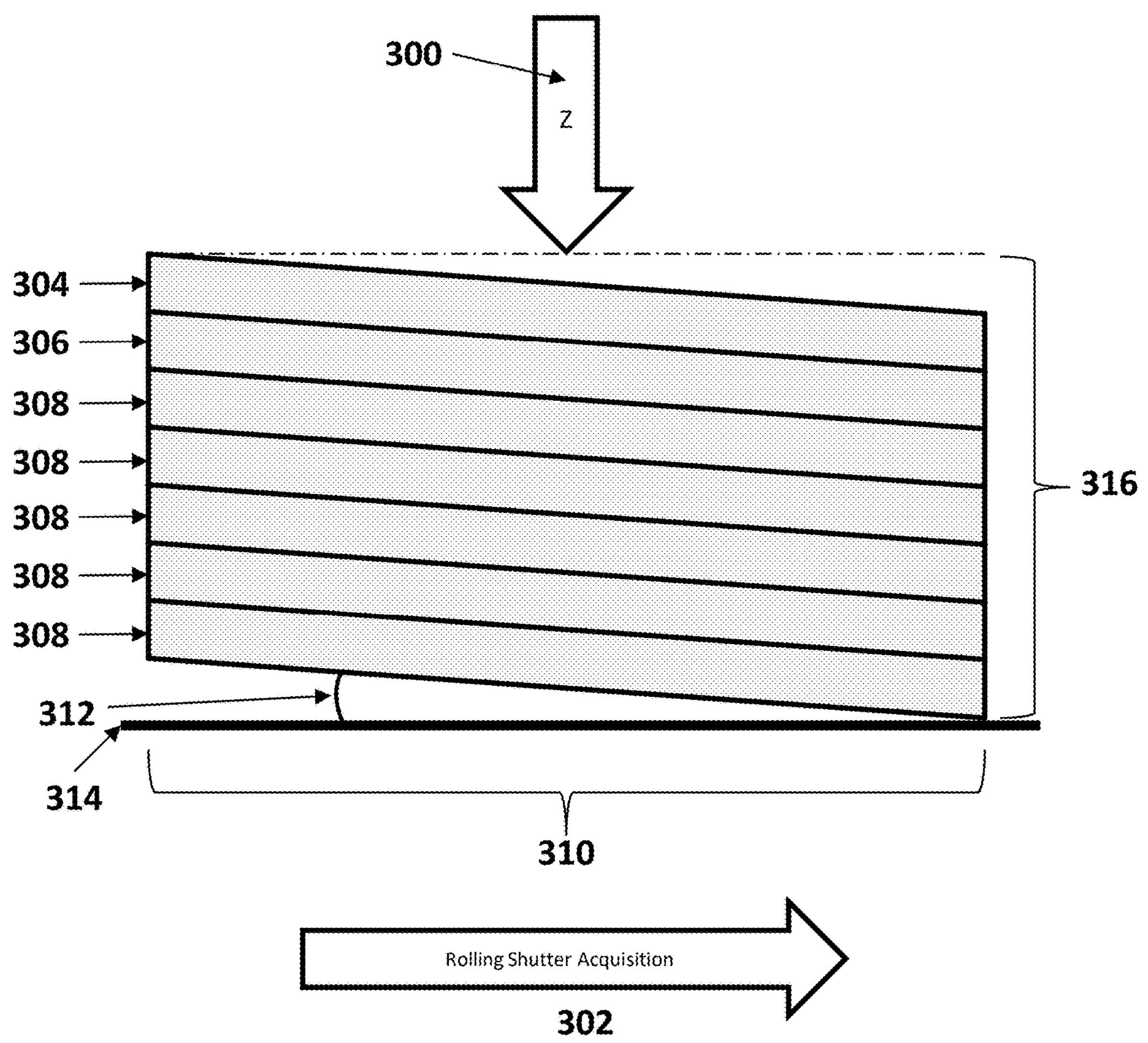
FIG. 3 is an example schematic drawing of a z-stack image comprising multiple object planes in one field of view, according to some embodiments of the present disclosure.

Continuously moving the objective while simultaneously using the imaging module, imager, imaging device, or imaging system to acquire a series of images can produce a volumetric image of the sample at a plurality of object planes of the sample. FIG. 3 is a schematic of a volumetric (z-stack) image comprising multiple object planes in one field of view. The volumetric image can be a video. Here, the objective may be moved relative to the sample in the z-direction 300. Simultaneously, the sensor may be operating in rolling shutter mode 302, reading the pixels from left to right. FIG. 3 is a cross-sectional diagram, i.e., showing the width of several objective planes 304, 306, 308 for a single field of view 310. Each object plane may be angled 312 in relation to the stage 314.

In other words, the object plane may not be perfectly orthogonal to the optical axis (i.e., the tilt of the object plane in relation to the optical axis may be a small angle). This angle can be any suitable angle, such as less than about 1 milliradian. Additional angles are described below. As described herein the method can further comprise applying a mathematical transformation to the series of images to correct for the angle relative to the optical axis. In the case of rolling shutter, the mathematical transformation can include correcting for the skew angle and resampling in cartesian axes.

Continuing with FIG. 3, once the rolling shutter acquisition has proceeded across all pixels, the full field of view may have been imaged for the first object plane 304. The sensors can be integrating one or more pixels of the sensor during a period of time (e.g., except when the one or more pixels of the sensor are being read), such that the second object plane 306 can begin being read once the first object plane 304 is completely imaged. This can be continued for subsequent object planes 308, up to a chosen depth of imaging 316. This z-stack image may be acquired while the objective moves in the z-direction relative to the sample (e.g., 204 or 212 in FIG. 2).

Following imaging of a field of view, the objective can be moved to a position configured to image a second field of view. The second field of view may be adjacent to the prior field of view (e.g., movement 208 in FIG. 2).

Figure 4:
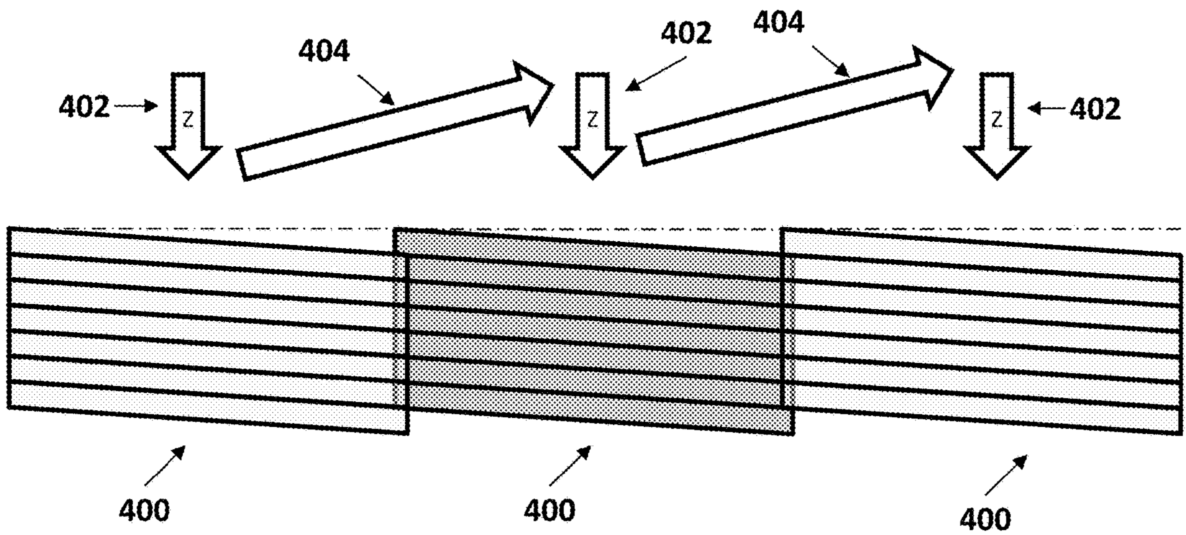
FIG. 4 is an example schematic drawing of z-stack images comprising multiple adjacent fields of view, according to some embodiments of the present disclosure.

FIG. 4 is an example schematic drawing of z-stack images (volume videos) comprising three adjacent fields of view 400, according to some embodiments of the present disclosure. These volume videos may be taken using a rolling shutter sensor, resulting in angled object planes. In this example, the imaging may be performed when the objective is moving toward the sample 402. Therefore, the objective may return 404 to the original separation distance between imaging fields. The plurality of fields of view (imaged at a depth, to create volumes) may be acquired by a single sensor in a plurality of passes or by a plurality of sensors in a single pass.

Methods

In an aspect, the present disclosure provides a method for analyzing one or more samples using a system disclosed herein. In another aspect, the present disclosure provides a method of volumetric imaging of a sample. In some cases, the method of volumetric imaging of a sample may comprise providing a sample disposed on a substrate (e.g., stage). In some cases, the sample may comprise a two-dimensional or a three-dimensional sample. In some cases, the method of volumetric imaging of a sample may comprise providing an imaging module, imager, imaging device, or imaging system, that may acquire, create, or generate one or more images (e.g., a series of images) of a sample. In some cases, the image may comprise a series of images. In some cases, the imaging module, imager, imaging device, or imaging system may comprise a lens (e.g., an objective lens) that may transmit photons from one or more object planes or a plurality of object planes within the sample to one or more sensors or a plurality of sensors of the imaging module, imager, imaging device, or imaging system. In some cases, the method of volumetric imaging of a sample may comprise continuously or periodically moving the objective lens relative to the sample in a direction along the optical axis of the objective lens. In some cases, the method of volumetric imaging of the sample may comprise continuously or periodically moving the objective lens relative to the sample in a direction along an axis parallel to or substantially parallel to the optical axis of the objective. In some cases, the method of volumetric imaging of a sample may comprise, while simultaneously moving the objective lens, using the imaging module, imager, imaging device, or imaging system to acquire a series of images corresponding to one or more object planes with the sample. In some cases, the one or more object planes may comprise a plurality of object planes. In some cases, the one or more object planes may comprise a first object plane and a second object plane. In some cases, the one or more object planes or the plurality of object planes may be adjacent object planes within the sample. The first object plane and the second object plane may be adjacent object planes within the sample. In some cases, the method operation of providing a sample disposed on a substrate may be repeated one or more times to provide one or more volumetric images of one or more samples disposed on the substrate. In some instances, the method operation of continuously or periodically moving the objective lens relative to the sample in a direction along the optical axis of the objective may be repeated one or more times to provide a volumetric image at a plurality of adjacent fields of view of the sample. In some cases, using the imaging module, imager, imaging device, or imaging system while simultaneously moving the objective lens to acquire a series of images corresponding to one or more object planes with the sample, or any combination thereof, may be repeated one or more times to provide a volumetric image at a plurality of adjacent fields of view. In some cases, adjacent fields of view may comprise an adjacent one or more portions of the sample imaged within a field of view of the imaging module, imager, imaging device, or imaging system. In some instances, the field of view may comprise the field of view of the objective lens. In some cases, an adjacent field of view may comprise a one or more adjacent portions of a sample that comprise a width or length corresponding to the width or length of the field of view of the imaging module, imager, imaging device, or imaging system. In some cases, the objective lens may begin motion at a first point a distance away from the sample and move towards a second point a distance less than the distance of the first point from the sample. In some cases, the objective may move from the first point to the second point while acquiring the series of images corresponding to the one or more object planes of the sample. In some cases, the objective lens may acquire a series of images at a first portion of a sample moving from the first point to the second point. In some instances, the objective lens may move from the second point to the first point e.g., to reset to acquire another series of images of the sample or a different portion of the sample. In some cases, as the objective lens moves from the second point to the first point, the objective lens may simultaneously move or translate to an adjacent portion of the sample. In some cases, the objective lens may then move or translate from the first point to the second point while the imaging module, imager, imaging device, imaging system, acquires a series of images of the one or more object planes of the sample at the adjacent portion. In some cases, a skew angle, described herein, associated with one or more object planes of the sample may be generated when the series of images are acquired while the objective lens is continuously or periodically moving relative to the sample in a direction along the optical axis of the objective lens. In some cases, a mathematical transformation may be applied to the series of images to remove or correct the skew angle, described herein. In some cases, the series of images where the skew angle has been removed or corrected, may be a series of calibrated or corrected images.

The system may comprise one or more sensors, one or more z-axis scanners, or one or more sample holders, or any combination thereof.

In an aspect, provided herein is a method of volumetric imaging of a sample. The method can include providing a three-dimensional or a two-dimensional sample disposed on a stage (e.g., sample holder). The method can further include providing an imaging module, imager, imaging device, or imaging system. The imaging module, imager, imaging device, or imaging system can be configured to create an image. The imaging module, imager, imaging device, or imaging system can have an objective lens configured to transmit photons from one or more object planes within the sample to a sensor.

The method can further include continuously moving the objective lens relative to the sample in a direction substantially parallel to an optical axis of the objective, while simultaneously using the imaging module, imager, imaging device, or imaging system to acquire a series of images corresponding to adjacent object planes within the sample.

The methods, or systems, or combination thereof, of the present disclosure may be used as a part of a determination of a property of a sample. Examples of properties can include, but are not limited to, a presence or absence of a molecule (e.g., nucleic acid molecule, protein, carbohydrate, bioactive molecule, etc.), a sequence of a molecule, a transcriptome of the sample, a location of a molecule with the sample (e.g., a three dimensional position of the molecule within a cell, etc.), a test panel (e.g., a panel configured to determine a plurality of properties of the sample), or the like, or any combination thereof. Generally, the detections are barcodes (i.e., label sequences), specifically attached to a molecule of interest (e.g., RNA, DNA, protein, or ribosome).

In some cases, a method of determining an identity of a biomolecule can comprise providing a system as described elsewhere herein. For example, the system may comprise one or more sensors and one or more z-axis scanners. The one or more sensors and the one or more z-axis scanners may be used to image a cell to generate a signal, and the signal may be used to determine an identity of the biomolecule as described elsewhere herein.

Figure 5:
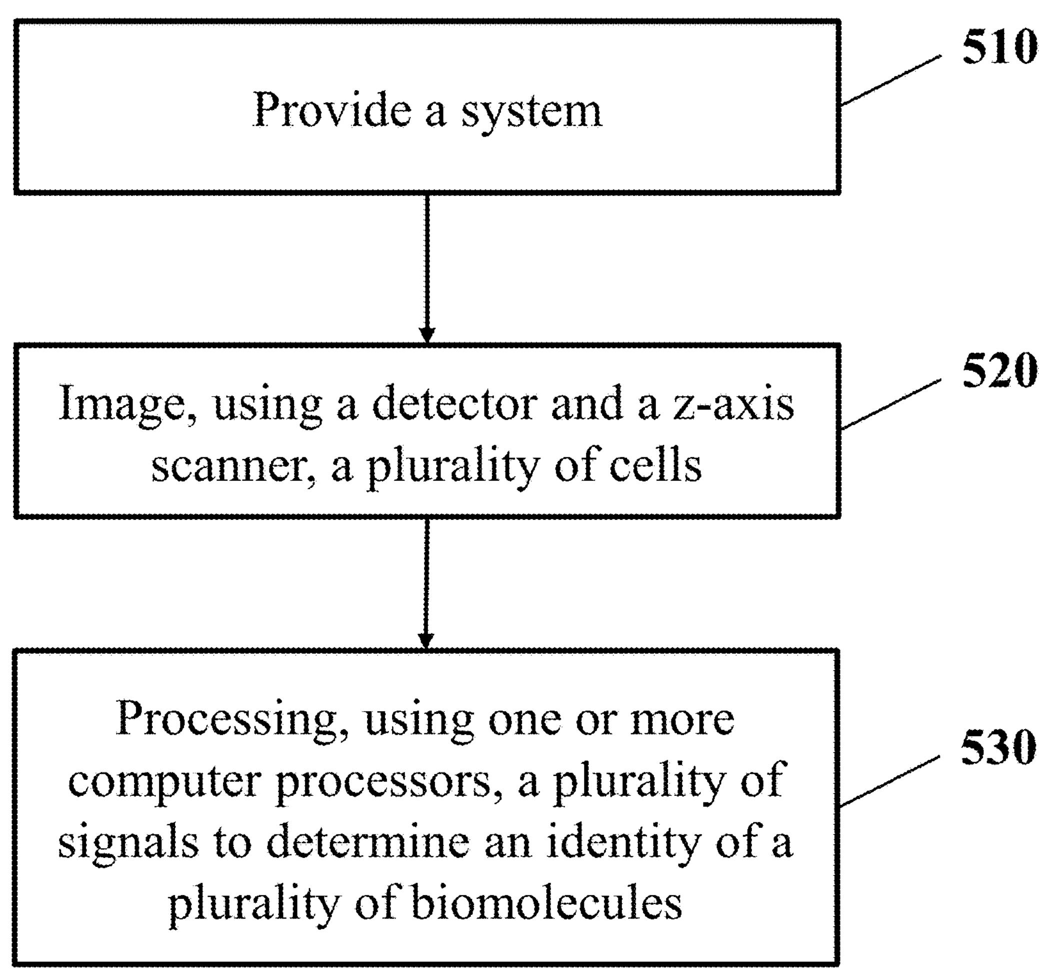
FIG. 5 is a flowchart of a method of determining a property of a plurality of cells, according to some embodiments.

FIG. 5 is a flowchart of a method 500 of determining a property of a plurality of cells, according to some embodiments. In an operation 510, the method 500 may comprise providing a system. The system may comprise one or more sensors and one or more z-axis (e.g., optical axis) scanners.

In an operation 520, the method 500 may comprise imaging, using the one or more sensors and the one or more z-axis scanners, the plurality of cells to generate a plurality of signals. The plurality of signals may be a plurality of images of each cell of the plurality of cells. The plurality of signals may be a single image of each cell of the plurality of cells. The plurality of signals may be a plurality of signals from each cell of the plurality of cells. The plurality of signals may be a single signal from each cell of the plurality of cells.

In another operation 530, the method 500 may comprise using the plurality of signals to determine an identity of the plurality of biomolecules. The imaging or the determining may occur in at most about 72 hours, 60 hours, 48 hours, 36 hours, 35 hours, 34 hours, 33 hours, 32 hours, 31 hours, 30 hours, 29 hours, 28 hours, 27 hours, 26 hours, 25 hours, 24 hours, 23 hours, 22 hours, 21 hours, 20 hours, 19 hours, 18 hours, 17 hours, 16 hours, 15 hours, 14 hours, 13 hours, 12 hours, 11 hours, 10 hours, 9 hours, 8 hours, 7 hours, 6 hours, 5 hours, 4 hours, 3 hours, 2 hours, 1 hours, 0.5 hours, 0.1 hours, or less. The imaging or the determining may occur in at least about 0.1 hours, 0.5 hours, 1 hours, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 25 hours, 26 hours, 27 hours, 28 hours, 29 hours, 30 hours, 31 hours, 32 hours, 33 hours, 34 hours, 35 hours, 36 hours, 48 hours, 60 hours, 72 hours, or more.

The identity may be determined at least in part using the plurality of signals. For example, the imaging can provide data processed to determine the property. Examples of properties may include, but are not limited to, a structure of a cell of the plurality of cells, an identity or sequence of biomolecule (e.g., nucleic acid, protein, polypeptide, or fragment thereof) contained within a cell of the plurality of cells, or an identity or sequence of a plurality of nucleic acids of the plurality of cells (e.g., perform a panel on the plurality of cells), or any combination thereof. Each cell of the plurality of cells may have a same property determined. For example, each cell of the plurality of cells may have an identity of a nucleic acid determined.

Figure 6:
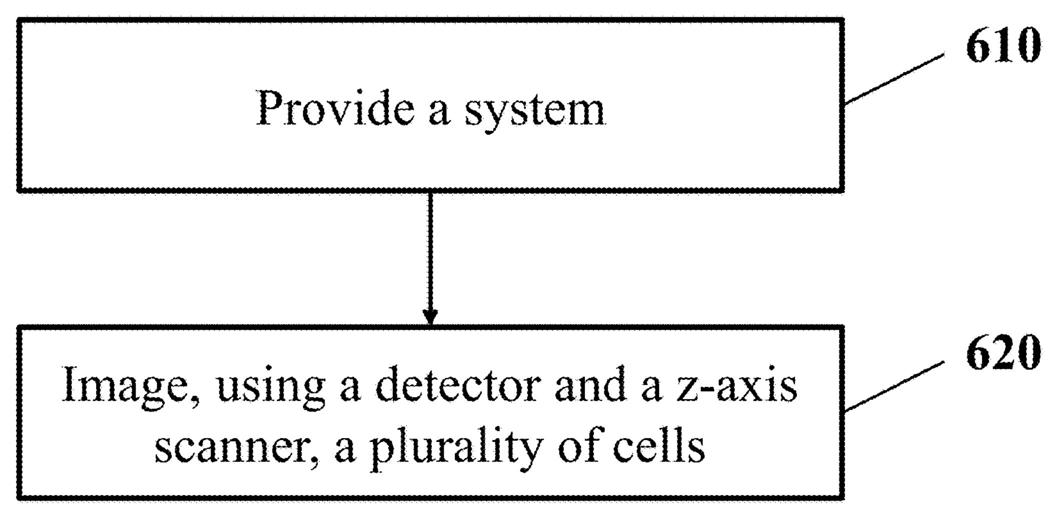
FIG. 6 is a flowchart of a method of imaging a plurality of cells, according to some embodiments.

FIG. 6 is a flowchart of a method 600 of imaging a plurality of cells, according to some embodiments. In an operation 610, the method 600 may comprise providing a system. The system may comprise one or more sensors and one or more z-axis (e.g., optical axis) scanners as described elsewhere herein.

In another operation 620, the method 600 may comprise imaging, using the one or more sensors and the one or more z-axis scanners, the plurality of cells. The voxel may comprise the plurality of cells. For example, the imaged volume of the voxel can be of a sample chamber comprising the plurality of cells.

FIG. 7 is a flowchart of a method 700, according to some embodiments. In an operation 710, the method 700 may comprise using a plurality of sensors to continuously or substantially continuously integrate through a plurality of object planes of a sample (e.g., optical planes of the sample) to generate a volumetric measurement of the sample. The imaging of the sample can comprise identifying one or more barcode tags. For example, a sample with barcoded molecular tags can be labeled after a plurality of labeling operations to result in a barcode signal to be detected and decoded by the methods and systems of the present disclosure to determine the identity of the analyte associated with the barcoded molecular tags.

Figure 8:
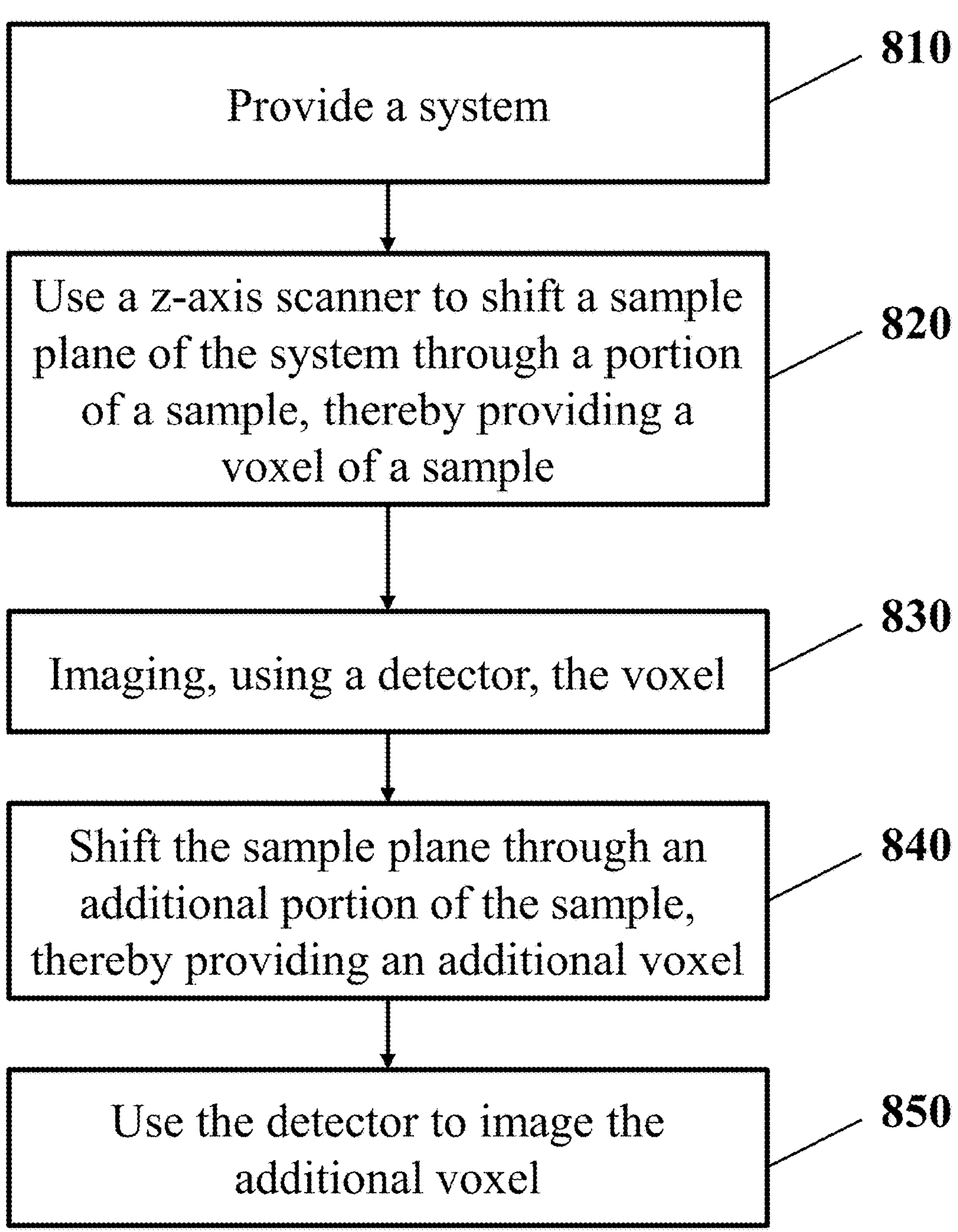
FIG. 8 is a flowchart of a method of taking a volume video of a sample, according to some embodiments.

FIG. 8 is a flowchart of a method 800 of taking a volume video of a sample. In an operation 810, the method 800 may comprise providing a system. The system may comprise one or more sensors and one or more z-axis (e.g., optical axis) scanners as described elsewhere herein.

The one or more z-axis scanners may be configured to linearly move the object plane of the system through the sample. The one or more z-axis scanners may be configured to move the object plane non-linearly through the sample. The one or more z-axis scanners may comprise, for example, a motor, a stepper motor, a voice coil, a servo motor, a piezo electric actuator, a hydraulic actuator, or a pneumatic actuator, or any combination thereof. The one or more z-axis scanners may be configured to move one or more sample stages comprising one or more samples, or one or more optical elements configured to move the object plane, or a combination thereof.

In another operation 820, the method 800 may comprise using the one or more z-axis scanners to shift one or more object planes of the system through one or more portions of the one or more samples, thereby generating one or more voxels of the one or more samples. The one or more voxels may be one or more volumes of the one or more samples imaged by the one or more sensors. For example, the voxel may be a volume comprising one or more portions of the sample. In another example, the voxel may be a volume of a plurality of volumes of the sample. The sample may be as described elsewhere herein.

In another operation 830, the method 800 may comprise imaging, using the one or more sensors, the one or more voxels. The imaging may comprise continuous imaging. For example, the imaging of a sample may be continuous through a voxel of the sample. The imaging may comprise substantially continuous imaging. For example, the imaging may be continuously saved for a readout time of the sensor. The imaging may comprise no or substantially no settling time (e.g., less than about 50 milliseconds (ms). For example, the imaging can be performed without waiting for the system to settle (e.g., stop moving after stage or optical element movement of the system). In this example, the imaging can occur as the object plane is shifted through the sample and terminated during settling. The settling time may be due to, for example, waiting for the sample to settle after movement of the sample stage. In this example, the continuous movement of the z-axis scanner can remove settling time from the imaging time which can, in turn significantly improve the throughput of the system. For example, by removing settling time from the imaging cycle of a system, a significant portion of the imaging time can be removed, thereby increasing the throughput.

In another operation 840, the method 800 may comprise shifting the one or more object planes through an additional one or more portions of the one or more samples, thereby providing one or more additional voxels of the one or more samples. The one or more additional voxels and the one or more voxels may be adjoining or contiguous volumes of the sample. For example, one side of the voxel may also be a side of the additional voxel. The one or more additional voxels and the one or more voxels may not be adjacent or contiguous. For example, the additional voxel and the voxel may have space between them.

In another operation 850, the method 800 may comprise detecting, using the one or more sensors, the additional one or more voxels. The imaging of the one or more voxels and the imaging of the additional one or more voxels may occur substantially continuously.

Sample Preparation

The methods, or systems, or a combination thereof, of the present disclosure may be suitable for analyzing a variety of biomolecules (e.g., nucleic acid molecules, proteins, polypeptides, carbohydrates, fragments thereof, etc.) derived from any of a variety of samples or sources.

The methods or systems of the present disclosure may be suitable for a variety of sequencing and imaging applications and for sequencing biomolecules (e.g., nucleic acid molecules) derived from any of a variety of samples and sources. Biomolecules (e.g., nucleic acids), in some cases, may be extracted from any of a variety of biological samples, e.g., blood samples, saliva samples, urine samples, cell samples, tissue samples, and the like. The samples of the present disclosure may be extracted from one or more sources. For example, a tissue sample can be extracted from a subject. The samples of the present disclosure may be extracted from other samples. For example, a plurality of cells can be extracted from a tissue. In another example, a biomolecule (e.g., a nucleic acid molecule) can be extracted from a cell.

For example, the disclosed devices and systems may be used for the analysis of biomolecules (e.g., nucleic acids molecules) derived from any of a variety of different cell, tissue, or sample types. For example, nucleic acids may be extracted from cells, or tissue samples comprising one or more types of cells, derived from eukaryotes (such as animals, plants, fungi, or protista), archaebacteria, or eubacteria. In some cases, biomolecules (e.g., nucleic acids) may be extracted from prokaryotic or eukaryotic cells, such as adherent or non-adherent eukaryotic cells. Biomolecules (e.g., nucleic acids) can be variously extracted from, for example, primary or immortalized rodent, porcine, feline, canine, bovine, equine, primate, or human cell lines. Biomolecules (e.g., nucleic acids) may be extracted from any of a variety of different cell, organ, or tissue types (e.g., white blood cells, red blood cells, platelets, epithelial cells, endothelial cells, neurons, glial cells, astrocytes, fibroblasts, skeletal muscle cells, smooth muscle cells, gametes, or cells from the heart, lungs, brain, liver, kidney, spleen, pancreas, thymus, bladder, stomach, colon, or small intestine). Biomolecules (e.g., nucleic acids) may be extracted from normal or healthy cells. Alternately or in combination, the biomolecules can be extracted from diseased cells, such as cancerous cells, or from pathogenic cells that are infecting a host. Some nucleic acids may be extracted from a distinct subset of cell types, e.g., immune cells (such as T cells, cytotoxic (killer) T cells, helper T cells, alpha beta T cells, gamma delta T cells, T cell progenitors, B cells, B-cell progenitors, lymphoid stem cells, myeloid progenitor cells, lymphocytes, granulocytes, Natural Killer cells, plasma cells, memory cells, neutrophils, eosinophils, basophils, mast cells, monocytes, dendritic cells, or macrophages, or any combination thereof), undifferentiated human stem cells, human stem cells that have been induced to differentiate, rare cells (e.g., circulating tumor cells (CTCs), circulating epithelial cells, circulating endothelial cells, circulating endometrial cells, bone marrow cells, progenitor cells, foam cells, mesenchymal cells, or trophoblasts). The biomolecules (e.g., nucleic acids) may optionally be attached to one or more moieties (e.g., non-nucleotide moieties) such as labels and other small molecules, large molecules (such as proteins, lipids, sugars, etc.), or solid or semi-solid supports, for example through covalent or non-covalent linkages with either end of a biomolecule (e.g., the 5' or 3' end of the nucleic acid). Labels can include any moiety that is detectable using any of a variety of detection methods known to those of skill in the art, and thus renders the attached oligonucleotide or nucleic acid similarly detectable. Some labels, e.g., fluorophores, can emit electromagnetic radiation that is optically detectable or visible. The labels may comprise one or more barcode molecules (e.g., molecules configured to provide a detectable signal corresponding to an identity of the molecule).

The one or more samples may comprise one or more label moieties. Examples of label moieties may include, but are not limited to, optical barcodes, nanoparticles, magnetic moieties, or electrical moieties, or any combination thereof. For example, the one or more samples may comprise a plurality of barcode tags. For example, the one or more samples can be treated with a plurality of barcode tags configured to bind to a plurality of analytes (e.g., nucleic acids, proteins, carbohydrates, etc.) contained within the one or more samples.

Sequencing

In some cases, the sample may be a tissue sample. The sample can be a cleared and hydrogel stabilized tissue sample. The sample can include fluorescently labeled loci. The fluorescently labeled loci can be associated with locations of a biomolecule. The volumetric image of the sample can indicate locations at which an RNA is expressed, or a protein is produced. In some instances, the tissue sample may comprise at least 500,000 cells. In some cases, at least about 500 sequences of interest may be sequenced.

The loci can represent locations at which a DNA sequencing reaction takes place, e.g., locations at which a fluorescently labeled nucleotide has been incorporated into a growing nucleic acid strand. The fluorescently labeled oligonucleotide can be ligated onto a nucleic acid template.

The growing nucleic acid strand can be at least partially complimentary to a sequence of interest. The method described herein can be repeated for incorporation of each of type of nucleotide (A, C, T, or G), thereby determining a nucleotide sequence of the sequence of interest.

Further description of suitable sample preparation methods, DNA sequencing methods, imaging methods, and data analysis methods can be found in: PCT Patent Application Serial No. PCT/US2019/025835; PCT Patent Application Serial No. PCT/US2022/030370; PCT Patent Application Serial No. PCT/US2022/030321; PCT Patent Application Serial No. PCT/US2017/019443; PCT Patent Application Serial No. PCT/US2022/035271; PCT Patent Application Serial No. PCT/US2020/055800; and PCT Patent Application Serial No. PCT/US2022/030232, each of which are incorporated herein by reference in their entirety.

Data Extraction and Analysis

In one aspect, the present disclosure may provide a method of volumetric imaging of a sample (e.g., a biological tissue), the method comprising: (i) acquiring a series of rolling shutter video frames (e.g., fluorescence images) of the sample while under continuous motion in the z-direction; and, (ii) assembling the video frames, thereby forming a skewed volumetric image of the sample.

In some instances, the video rate (i.e., frame rate) and velocity in the z-direction may be coordinated such that:

$$\frac{z-\text{velocity } (\mu m\ s^{-1})}{\text{frame rate (Hz)}} = \text{desired voxel } z(\mu m).$$

In some cases, the sensor height of the camera and z-voxel size may be chosen such that, for a given video rate:

$$\tan^{-1}\left(\frac{\text{voxel } z\ (\mu\text{m})}{\text{sensor height } (\mu\text{m})}\right) \leq 0.1°$$

In some instances, (i) may comprise acquiring a series of video frames using a system (e.g., a microscope system) described herein. In some cases, (i) may comprise acquiring a series of video frames using a system comprising: a microscope device; a sensor comprising a rolling shutter functionality; a device or system for motion in the z-direction; and a control unit. In some case, the system may comprise a z-axis scanner to provide motion in the z-direction, as described herein.

In some instances, the sample of the method is a sample described herein.

In some cases, the collected images are JP2, JPG, TIFF, BMP, GIF, PNG, ND2, JFF, JTF, AVI, or ICS/IDS file types.

In some cases, the present disclosure provides a method for correcting rolling shutter volumetric data, the method comprising: (i) collecting data (i.e., fluorescence images) of a sample under rolling shutter video acquisition, while continuously moving in the z-direction; and (ii) resampling the data into a rectilinear space by removing a skew induced by rolling shutter video acquisition; thereby correcting rolling shutter volumetric data.

In some cases, the data may be collected using a system described herein (e.g., a microscope system described herein).

In some cases, the present disclosure provides a method for stitching adjacent rolling shutter volumetric data, the method comprising: (i) collecting data (i.e., fluorescence images) of a sample under rolling shutter video acquisition, while continuously moving in the z-direction; (ii) removing skews induced by rolling shutter video acquisition while in continuous motion for each field thereby creating a combined volume resampled in a rectilinear coordinate system; thereby stitching adjacent rolling shutter volumetric data.

In some instances, the data may be collected using a system described herein (e.g., a microscope system described herein).

The sensor can collect signals (e.g., that comprise an image). However, not all of the collected information may be useful in all instances. E.g., the series of images can comprise signals acquired at fixed locations within the sample (e.g., nucleic acid sequencing loci). In some cases, the desired information is the nucleic acid sequence at a number of loci.

Thus, provided herein are methods that may associate the signals and locations with a reference database. The reference database can include structural information about the sample, reference nucleic acid sequences, or other information.

The signals (e.g., nucleic acid sequences at particular loci) can be extracted from the signals. In some instances, this is done quickly (e.g., within 20 seconds of acquiring the series of images). In some cases, signals may be extracted from the series of images without saving the series of images. The series of images can be kept in a temporary memory buffer while and until signals are extracted.

Parameters

The stage can include one or more sample holders, which may be configured to retain the one or more samples. The one or more sample holders may comprise, for example, a flow cell, a plurality of flow cells, a well, a plurality of wells, a slide, or a plurality of slides, or any combination thereof. In one example, a flow cell may be configured to flow a plurality of cells to an imaging region of the system (e.g., a region where sensors are configured to image the region). In another example, a well may be configured to retain the plurality of cells. In another example, a plurality of wells may be configured to retain the plurality of cells. In another example, the at least one slide may be configured to retain the plurality of cells. The sample may comprise one or more cells. The one or more cells may comprise one or more cells of a single cell type. For example, the sample may comprise a plurality of epithelial cells. A plurality of cells may comprise a plurality of different types of cells. For example, a sample may comprise a tissue comprising a plurality of cell types One or more light sources may be used to illuminate the one or more samples (e.g., a plurality of cells). The one or more light sources may each illuminate a sample of the one or more samples. The one or more light sources may be configured to collectively illuminate a sample of the one or more samples. For example, a plurality of cells may be illuminated by at least one light source. The one or more light sources may comprise at least about 1 light source to 10 light sources. The one or more light sources may comprise at least about 1 light source to 2 light sources, 1 light source to 3 light sources, 1 light source to 4 light sources, 1 light source to 5 light sources, 1 light source to 6 light sources, 1 light source to 7 light sources, 1 light source to 8 light sources, 1 light source to 9 light sources, 1 light source to 10 light sources, 2 light sources to 3 light sources, 2 light sources to 4 light sources, 2 light sources to 5 light sources, 2 light sources to 6 light sources, 2 light sources to 7 light sources, 2 light sources to 8 light sources, 2 light sources to 9 light sources, 2 light sources to 10 light sources, 3 light sources to 4 light sources, 3 light sources to 5 light sources, 3 light sources to 6 light sources, 3 light sources to 7 light sources, 3 light sources to 8 light sources, 3 light sources to 9 light sources, 3 light sources to 10 light sources, 4 light sources to 5 light sources, 4 light sources to 6 light sources, 4 light sources to 7 light sources, 4 light sources to 8 light sources, 4 light sources to 9 light sources, 4 light sources to 10 light sources, 5 light sources to 6 light sources, 5 light sources to 7 light sources, 5 light sources to 8 light sources, 5 light sources to 9 light sources, 5 light sources to 10 light sources, 6 light sources to 7 light sources, 6 light sources to 8 light sources, 6 light sources to 9 light sources, 6 light sources to 10 light sources, 7 light sources to 8 light sources, 7 light sources to 9 light sources, 7 light sources to 10 light sources, 8 light sources to 9 light sources, 8 light sources to 10 light sources, or 9 light sources to 10 light sources. The one or more light sources may comprise at least about 1 light source, 2 light sources, 3 light sources, 4 light sources, 5 light sources, 6 light sources, 7 light sources, 8 light sources, 9 light sources, 10 light sources, or more light sources. The one or more light sources may comprise at most about 10 light sources, 9 light sources, 8 light sources, 7 light sources, 6 light sources, 5 light sources, 4 light sources, 3 light sources, 2 light sources, or less light sources. The one or more light sources may comprise one or more laser light sources, incandescent light sources, light emitting diode (LED) light sources, halogen light sources, or arc lamp illumination light sources, or any combination thereof. The one or more light sources may provide one or more portions of a confocal illumination system (e.g., configured to provide confocal illumination to the one or more samples). The confocal illumination system may comprise one or more spinning disks. A plurality of spinning disks may be used to enable parallel illumination with a plurality of wavelength bands.

The one or more light sources may have a flux of at least about 100 milli-Watts (mW). The one or more light sources may have a flux of at most about 2 Watts. The one or more light sources may provide light sheet illumination (e.g., illumination perpendicular to the imaging axis of the system). The one or more light sources may be configured to provide illumination continuously or substantially continuously through a detection operation as described elsewhere herein. The one or more light sources may have an on/off fraction (e.g., a ratio of time that the one or more light sources are on and in use) of at least about 0.6, 0.65, 0.7, 0.75, 0.8, 0.85, 0.9, 0.95, 0.96, 0.97, 0.98, 0.99, 0.999, or more. The one or more light sources may have an on/off fraction of at most about 0.999, 0.99, 0.98, 0.97, 0.96, 0.95, 0.94, 0.93, 0.92, 0.91, 0.9, 0.85, 0.8, 0.75, 0.7, 0.65, 0.6, or less. The one or more light sources may have an on/off fraction from about 0.8 to about 0.9, from about 0.85 to about 0.95, or from about 0.9 to about 0.99. The one or more light sources may be operated at a same time or a substantially same time as one or more sensors. For example, the one or more light sources can illuminate the one or more samples while the one or more sensors are detecting light from the one or more samples. In some cases, the illuminating may occur prior to the detecting. In some cases, the detecting and the illuminating may occur simultaneously or substantially simultaneously (e.g., within a few nanoseconds of illumination).

In some cases, the one or more z-axis scanners may shift one or more object planes of the system through at least a portion of the one or more samples (e.g., a plurality of cells). The object plane may be a plane of the one or more samples detected by one or more sensors (e.g., a plane of the one or more samples that is sampled by one or more focal planes of the one or more sensors). For example, one or more object planes can be an optical plane of the one or more sensors. In another example, the object plane can be a skewed plane that is not orthogonal to the optical axis of the system. In this example, the object plane may be skewed due to use of one or more rolling shutter sensors. The shifting of the object plane may generate a voxel of one or more voxels associated with the one or more samples. In other cases, the object plane may be shifted through at least an additional portion of the one or more samples. The shifting through the at least the additional portion may generate an additional voxel of the one or more voxels associated with the one or more samples. The one or more z-axis scanners may shift the object plane through a shifting of the one or more sample holders, or a shifting of one or more optical elements disposed in the optical system (e.g., one or more lenses configured to adjust the object plane through focusing of light), or a combination thereof. The one or more z-axis scanners may comprise a motion element. Examples of motion elements include, but are not limited to, a motor, a stepper motor, a voice coil, a servo motor, a piezo electric actuator, a hydraulic actuator, a linear motor, or a pneumatic actuator, or any combination thereof. The one or more voxels may be associated with at least a portion of one or more cells. The one or more voxels may be associated with at least a portion of a plurality of cells. The one or more voxels may comprise one or more biomolecules (e.g., as a part of one or more cells). The one or more z-axis scanners may be configured to linearly move the object plane. The one or more z-axis scanner may be configured to move the object plane non-linearly (e.g., exponentially, logarithmically, etc.). The object plane may have a height (e.g., dimension in the optical axis of the system) of at most about 500 micrometers (μm), at most about 450 μm, at most about 400 μm, at most about 350 μm, at most about 300 μm, at most about 250 μm, at most about 200 μm, at most about 150 μm, at most about 100 μm, at most about 90 μm, at most about 80 μm, at most about 70 μm, at most about 60 μm, at most about 50 μm, at most about 40 μm, at most about 30 μm, at most about 20 μm, at most about 10 μm, at most about 9 μm, at most about 8 μm, at most about 7 μm, at most about 6 μm, at most about 5 μm, at most about 4 μm, at most about 3 μm, at most about 2 μm, at most about 1 μm, at most about 0.9 μm, at most about 0.8 μm, at most about 0.7 μm, at most about 0.6 μm, at most about 0.5 μm, at most about 0.4 μm, at most about 0.3 μm, at most about 0.2 μm, at most about 0.1 μm, or less. The object plane may have a height of at least about 0.1 μm, at least about 0.2 μm, at least about 0.3 μm, at least about 0.4 μm, at least about 0.5 μm, at least about 0.6 μm, at least about 0.7 μm, at least about 0.8 μm, at least about 0.9 μm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 150 μm, at least about 200 μm, at least about 250 μm, at least about 300 μm, at least about 350 μm, at least about 400 μm, at least about 450 μm, at least about 500 μm, or more. The object plane may have a height from about 1 micrometer to about 10 micrometers. In some cases, the one or more z-axis scanners may shift one or more object planes of the system through at least a portion of one or more cells. For example, the shifting of the object plane can generate one or more voxels comprising at least a portion of the one or more cells. In some cases, each voxel can comprise a single cell or one or more portions thereof. In some cases, each voxel can comprise a plurality of cells. In some cases, a voxel can comprise one or more portions of a plurality of cells.

The voxel or the object plane may have a resolution in the optical axis of the system, the plane orthogonal to the optical axis, or a combination thereof of at least about 0.01 μm, 0.02 μm, 0.03 μm, 0.04 μm, 0.05 μm, 0.06 μm, 0.07 μm, 0.08 μm, 0.09 μm, 0.1 μm, 0.2 μm, 0.3 μm, 0.4 μm, 0.5 μm, 0.6 μm, 0.7 μm, 0.8 μm, 0.9 μm, 1 μm, 2 μm, 3 μm, 4 μm, 5 μm, 6 μm, 7 μm, 8 μm, 9 μm, 10 μm, or more. The voxel or the object plane may have a resolution in the optical axis of the system, the plane orthogonal to the optical axis, or a combination thereof of at most about 10 μm, 9 μm, 8 μm, 7 μm, 6 μm, 5 μm, 4 μm, 3 μm, 2 μm, 1 μm, 0.9 μm, 0.8 μm, 0.7 μm, 0.6 μm, 0.5 μm, 0.4 μm, 0.3 μm, 0.2 μm, 0.1 μm, 0.09 μm, 0.08 μm, 0.07 μm, 0.06 μm, 0.05 μm, 0.04 μm, 0.03 μm, 0.02 μm, 0.01 μm, or less. The voxel or the object plane may have a resolution in the optical axis of the system of about 0.1 micrometer to about 10 micrometers. In some cases, the voxel size is approximately 0.1 μm in the x-direction, 0.1 μm in the y-direction, and 0.5 μm in the z-direction.

In some cases, one or more sensors may be used to detect one or more signals associated with the one or more samples. The one or more sensors may be used to detect one or more signals associated with a plurality of cells. The one or more sensors may be configured to detect one or more signals associated with the one or more voxels. For example, the one or more sensors can detect signals from within the one or more voxels. The one or more sensors may comprise, for example, one or more rolling shutter sensors, or one or more global shutter sensors, or a combination thereof. In an example, as a rolling shutter sensor is used, the rows of pixels of the rolling shutter sensor can be sequentially read as, for example, the object plane is moved through the sample. The one or more sensors may comprise one or one or more complementary metal oxide semiconductor (CMOS) sensors, or a combination thereof. The one or more sensors may be configured to detect a fluorescent signal, or a non-fluorescent signal, or a combination thereof. Examples of signals may include, but are not limited to, light intensity, wavelength, fluorescent lifetime, absorption, cross-section or absorption lifetime. The one or more sensors may be configured to be continuously (e.g., read without whole sensor dead time on the one or more sensors) or substantially continuously read (e.g., read with partial sensor dead time on the one or more sensors due to, for example, readout time). For example, for a sensor comprising a plurality of pixel bins, the bins may be configured to be read any time the bins are not integrating. The one or more sensors may independently have a duty cycle (e.g., a ratio of detecting time to readout time) of at least about 50%, at least about 60%, at least about 70%, at least about 80%, at least about 90%, at least about 95%, at least about 99%, at least about 99.5%, or at least about 99.9%. The one or more sensors may have a duty cycle from about 95% to about 99.9%. The detecting may comprise no or substantially no settling time (e.g., time spent not detecting to decrease artifacts generated by system movement). For example, the system may not settle before using the one or more sensors to detect the one or more signals. The settling may be settling to reduce or remove artifacts induced by system acceleration or deceleration.

The one or more samples may be imaged using the one or more sensors or the one or more z-axis scanners. In some cases, the imaging may generate one or more images associated with the one or more samples. In other cases, the imaging may generate one or more signals associated with the one or more samples. For example, a plurality of cells may be imaged and the data generated by the imaging can comprise the one or more signals. In this example, the one or more signals may comprise raw data from the imaging. The imaging may then generate a plurality of images or a plurality of signals. In some cases, the voxel or the additional voxel may be imaged. The imaging may be continuous or substantially continuous (e.g., with a duty cycle as described elsewhere herein). The one or more images may comprise one or more two-dimensional images, or one or more three-dimensional images, or a combination thereof. The one or more images may comprise, for example, optical microscopy images of the one or more samples.

The system may comprise or be operably coupled to one or more computer processors. The one or more computer processors may perform processing on the one or more signals or the one or more images. The processing may comprise post-processing (e.g., processing the one or more signals or one or more images after acquisition). In some cases, the one or more signals may be used to determine an identity of one or more biomolecules associated with the one or more samples. Examples of processing may include, but is not limited to, background correction (e.g., removal of background signal), baseline correction (e.g., removal of baseline signal), removal of optical aberration (e.g., removal of chromatic aberration, diffraction, etc.), calibration (e.g., application of one or more calibration curves to the one or more signals), removal of imaging artifacts (e.g., removal of dead pixels, dust artifacts, etc.), removal of optical skew (e.g., skew relative to the optical axis of the system), denoising (e.g., application of one or more noise filters), or normalization (e.g., normalization of the one or more signals to an internal or external signal), registration to reference coordinates, resampling, de-warping or any combination thereof. The background or baseline (e.g., dark state measurements) may be taken prior to the one or more signals or the one or more images. The background or baseline may be taken after the one or more signals or the one or more images.

The one or more signals or the one or more images may be used to determine one or more labels associated with the one or more samples, one or more properties of the one or more samples, or one or more identities of one or more biomolecules of the one or more samples, or any combination thereof. The one or more signals may be processed to determine an identity of a label within the one or more samples. For example, a fluorescent label can be identified based on the wavelength of the center of the peak of the fluorescent label. Alternatively, a fluorescent label may be identified by the ratios of signals between two or more imaging passbands. The identity of one or more labels may be used to determine one or more identities or one or more properties of one or more biomolecules in the one or more samples. For example, using an identity of the label or sequence of labels can enable a lookup of the biomolecule the label is configured to associated with in a reference database. In this example, the presence of the label can identify the presence of the biomolecule it is associated with. For one or more samples comprising a plurality of labels, a plurality of signals can identify each label of the plurality of labels. Examples of properties include, but are not limited to, a mutation or wildtype status of one or more biomolecules, a presence or absence of one or more biomolecules, a sequence of one or more biomolecules, or a gene status for a gene panel. The gene panel may comprise at least about 8 genes, 24 genes, 100 genes, 250 genes, 500 genes, 600 genes, 700 genes, 800 genes, 900 genes, 1,000 genes, 2,000 genes, 4,000 genes, 6,000 genes, 10,000 genes, 15,000 genes, 20,000 genes, or more. The gene panel may comprise at most about 1,000 genes, 900 genes, 800 genes, 700 genes, 600 genes, 500 genes, 250 genes, 100 genes, 50 genes, 24 genes, 8 genes or less genes. The gene panel may be a panel configured to determine a status of a plurality of genes in the one or more samples.

The plurality of cells may comprise at least about 50,000 cells, 100,000 cells, 150,000 cells, 200,000 cells, 250,000 cells, 300,000 cells, 350,000 cells, 450,000 cells, 500,000 cells, 550,000 cells, 600,000 cells, 650,000 cells, 700,000 cells, 750,000 cells, 800,000 cells, 850,000 cells, 900,000 cells, 950,000 cells, 1,000,000 cells, 1,100,000 cells, 1,200,000 cells, 1,300,000 cells, 1,400,000 cells, 1,500,000 cells, 1,600,000 cells, 1,700,000 cells, 1,800,000 cells, 1,900,000 cells, 2,000,000 cells, or more. The plurality of cells may comprise at most about 2,000,000 cells, 1,900,000 cells, 1,800,000 cells, 1,700,000 cells, 1,600,000 cells, 1,500,000 cells, 1,400,000 cells, 1,300,000 cells, 1,200,000 cells, 1,100,000 cells, 1,000,000 cells, 950,000 cells, 900,000 cells, 850,000 cells, 800,000 cells, 750,000 cells, 700,000 cells, 650,000 cells, 600,000 cells, 550,000 cells, 500,000 cells, 450,000 cells, 400,000 cells, 350,000 cells, 300,000 cells, 250,000 cells, 200,000 cells, 150,000 cells, 100,000 cells, 50,000 cells, or less. The imaging may be performed on the one or more samples in a time period of at most about 72 hours, 60 hours, 48 hours, 36 hours, 35 hours, 34 hours, 33 hours, 32 hours, 31 hours, 30 hours, 29 hours, 28 hours, 27 hours, 26 hours, 25 hours, 24 hours, 23 hours, 22 hours, 21 hours, 20 hours, 19 hours, 18 hours, 17 hours, 16 hours, 15 hours, 14 hours, 13 hours, 12 hours, 11 hours, 10 hours, 9 hours, 8 hours, 7 hours, 6 hours, 5 hours, 4 hours, 3 hours, 2 hours, 1 hours, 0.5 hours, 0.1 hours, or less. The imaging may be performed on the one or more samples in a time period of at least about 0.1 hours, 0.5 hours, 1 hours, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 25 hours, 26 hours, 27 hours, 28 hours, 29 hours, 30 hours, 31 hours, 32 hours, 33 hours, 34 hours, 35 hours, 36 hours, 48 hours, 60 hours, 72 hours, or more. The imaging may be performed on the one or more samples in a time period from about 2 hours to about 36 hours, from about 18 hours to about 30 hours, or from about 22 hours to about 26 hours.

In another aspect, the present disclosure provides a method using one or more sensors. The one or more sensors may be used to integrate (e.g., substantially continuously integrate) through one or more object planes of one or more samples. The integration may generate one or more volumetric measurements of the one or more samples. One or more z-axis scanners may shift the one or more object planes through the one or more samples. During the shifting of the one or more object planes, the one or more sensors may integrate to generate the one or more volumetric measurements of the one or more samples.

The volumetric measurement may be of one or more voxels as described elsewhere herein. For example, the volumetric measurement may be of a volume comprising one or more samples. The volumetric measurement may comprise one or more images as described elsewhere herein, or one or more signals as described elsewhere herein, or a combination thereof. The volumetric measurement may comprise the one or more object planes. For example, the one or more object planes within the sample may be combined to form the volumetric measurement.

The one or more object planes may be illuminated by one or more light sources as described elsewhere herein. The one or more sensors may be as described elsewhere herein. The one or more sensors may detect one or more signals or one or more images from the one or more samples planes. The one or more images or one or more signals may form the volumetric measurement. The one or more sensors may be configured to detect one or more passbands (e.g., wavelength ranges). For example, each sensor of the one or more sensors may be configured to image a different passband of the one or more passbands. The use of a plurality of passbands can parallelize the detecting of a plurality of, for example, labels, which can increase system throughput.

Using one or more rolling shutter sensors can impart skew to the one or more object planes. The one or more object planes may be at a skew relative to an imaging axis (e.g., optical axis of the one or more sensors) of the one or more sensors. For example, one or more object planes can be parallel to one another and not perpendicular to the optical axis of the system. The one or more object planes may be skewed from the optical axis of the system by at least about 0.01 milliradians, 0.05 milliradians, 0.1 milliradians, 0.2 milliradians, 0.3 milliradians, 0.4 milliradians, 0.5 milliradians, 0.6 milliradians, 0.7 milliradians, 0.8 milliradians, 0.9 milliradians, 1 milliradians, 2 milliradians, 3 milliradians, 4 milliradians, 5 milliradians, 6 milliradians, 7 milliradians, 8 milliradians, 9 milliradians, or more. The one or more object planes may be skewed from the optical axis of the system by at most about 9 milliradians, 8 milliradians, 7 milliradians, 6 milliradians, 5 milliradians, 4 milliradians, 3 milliradians, 2 milliradians, 1 milliradians, 0.9 milliradians, 0.8 milliradians, 0.7 milliradians, 0.6 milliradians, 0.5 milliradians, 0.4 milliradians, 0.3 milliradians, 0.2 milliradians, 0.1 milliradians, 0.05 milliradians, 0.01 milliradians, or less. The skew may be from about 0.1 milliradians to about 10 milliradians. The one or more object planes may all have a same skew from the optical axis. The one or more object planes may have a plurality of different skew values. The skew of the one or more object planes may be removed in one or more post processing operations on the one or more volumetric measurements. The skew may be removed to enable mapping of the one or more object planes into three-dimensions. The one or more volumetric measurements may be processed as described elsewhere herein. The one or more volumetric measurements may be used to generate one or more signals associated with the one or more samples, or one or more images of the one or more samples, or a combination thereof. For example, the volumetric measurement may comprise a measurement of one or more signals (i.e., labels) within the volume of the volumetric measurement. In this example, the one or more signals can be extracted or processed as described elsewhere herein to generate the one or more signals.

The plurality of sensors can acquire a plurality of passbands. For example, the plurality of sensors can be configured to each image a different passband (e.g., spectral wavelength range). In this example, the parallelization of the spectral acquisition can improve the speed and throughput of the system. The plurality of sensors may be one or more portions of a confocal microscopy system. For example, the plurality of sensors can be the detection apparatus of a confocal microscopy system. The plurality of sensors may be configured to image a same object plane. For example, the plurality of sensors can be configured to have a same focal depth. The plurality of sensors may be configured to image a plurality of different object planes. For example, each sensor of the plurality of sensors can be configured to image a different object plane.

The volumetric measurement of the sample may be generated by a continuous integration through the sample. For example, the volumetric measurement can be formed by use of continuous integration through the sample. In this example, the continuous integration through the sample can generate a measurement of the sample that is spread through the volume of the sample. The volumetric measurement of the sample may be a substantially continuous integration through the sample. For example, the volumetric measurement may be continuous except for a readout of a sensor. In this example, the volumetric measurement may be of a volume of the sample detected by the sensor except for the portion of the volume where the sensor readout occurs. The plurality of sensors may each independently have a frame rate of at least about 1, 5, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, 1,000, or more milliseconds. The plurality of sensors may each independently have a frame rate of at most about 1,000, 950, 900, 850, 800, 750, 700, 650, 600, 550, 500, 450, 400, 350, 300, 250, 200, 150, 100, 95, 90, 85, 80, 75, 70, 65, 60, 55, 50, 45, 40, 35, 30, 25, 20, 15, 10, 5, 1, or less milliseconds. The frame rate may represent a refresh time of the sensor (e.g., a time between when imaging ends and the sensor is available again for imaging). For example, the frame rate may represent a fastest time between integration cycles of the sensor. In this example, a sensor with a frame rate of 100 milliseconds may have a 100 millisecond time between integrations. A volumetric measurement may be a measurement of a volume of one or more samples. The volumetric measurement may contain spatially encoded data from the one or more samples, which can provide information about not only a presence or absence of a biomolecule, but also the location of the biomolecule within the one or more samples.

The series of images can be acquired at a rate of at least about 100,000,000 voxels/second on each of two or more wavelength channels.

The series of images may comprise at least 50 images, at least 100 images, at least 500 images, at least 1000 images, at least 5000 images, or at least 10,000 images.

ADDITIONAL EMBODIMENTS

Conventional 3D volume microscopy may require a process in which two-dimensional (x-y) images are taken at a series of discrete z-positions (focus). To prevent crosstalk between z-steps one typically may use a method to reject out of (x-y) plane features such as confocal or light sheet microscopy. For thin samples, a few layers can be assembled into a volume by just using depth of focus as a rejection mechanism although this still captures out of plane light as background.

In general, between each image acquisition, the system may make a step that is of order the depth of focus (or the thickness of the lightsheet). For a high numerical aperture (NA) confocal system the z-steps can be as small as 100 nm while for a light sheet system the steps can be 10 μm or larger. After each move, the system may stabilize (settle) before the next image is acquired. After each image, the camera(s) may readout and prepare for the next acquisition. The move and readout times may sometimes be concurrent but there may be dead time in the acquisition cycle.

The disclosure provided herein may largely eliminate the dead times of camera read out and z-motion during an image stack acquisition by acquiring data while the system is in continuous z-motion. This may be accomplished by operating the camera in a continuous video mode (e.g. rolling shutter or global shutter video) while making a continuous and coordinated movement z-direction. To maximize throughput, the coordinated movement in the z-direction may be at a velocity such that a frame of video is acquired over a desired z sampling. For example, if sampling at 500 nm in z (i.e., z-voxel size of 500 nm) with a 20 Hz video rate, the coordinated z velocity may be 500 nm×20 Hz=10 μm per second. If imaging with multiple cameras (and passbands) simultaneously, the video frames can be synchronized between the cameras, but it is not required.

In some aspects, the systems and methods described herein may utilize one or more types of microscopy (e.g., a microscope device). In some cases, the systems and methods described herein may utilize a type of microscopy selected from brightfield microscopy, dark field microscopy, phase contrast microscopy, differential interference contrast microscopy, fluorescence microscopy, confocal fluorescence microscopy, or lightsheet fluorescence microscopy.

Various methods exist for imaging samples (e.g., tissue, e.g., biological tissue) on microscopic length scales. These methods may include, inter alia, brightfield microscopy, dark field microscopy, phase contrast microscopy, differential interference contrast microscopy, fluorescence microscopy, confocal fluorescence microscopy, or lightsheet fluorescence microscopy. In traditional brightfield or epifluorescence microscopy, the entire sample may be irradiated with light and viewed through an eye piece or as a digital image. The viewed image may comprise signal from many focal planes of the sample and is therefore not spatially resolved. While these techniques have many benefits, including low cost and ease of operation, it may not be suitable for applications that require knowledge of the origin of the signal.

Confocal microscopy may be a microscopy technique which, in its original conception, focuses light through an aperture (e.g., a pinhole) to illuminate a small region of a sample. Emitted light from a sample may be blocked by an aperture placed in front of a sensor. The blocking of out-of-focus light by the aperture may force only light from a small region of the sample to be recorded. This process can be continued by scanning the sample in the XY plane or Z direction to form a 2D and/or 3D image of the sample.

While original confocal systems may employe the use of dual apertures to spatially resolve a sample, modern techniques often rely on a laser source. Laser scanning confocal microscopy (LSCM) is a technique wherein a laser light spot, directed by a series of mirrors, may scan the sample point by point. The light detected by the sensor as the laser is then rastered across the sample may then be assembled into an overall image of the specimen.

Background information on laser scanning confocal microscopy can be found, inter alia, in Molecular Biotechnology 16 (2000): 127-149 or Biotechniques 39.6 (2005): S2-S5.

Spinning disk confocal microscopy (e.g., with a Nipkow disk) may use a series of moving pinholes to scan an area of a sample in parallel. In general, this may reduce the amount of time required to scan.

Background information on spinning disk confocal microscopy can be found, inter alia, in Current protocols in cytometry 92.1 (2020): e68 or Journal of biomolecular techniques: JBT 26.2 (2015): 54.

Rolling shutter may generally refer to a video mode of some digital cameras whereby each row of the image sensor is read out and reset in quick succession. Rolling shutter is a common video mode on consumer and commercial cameras, particularly inexpensive cameras. When the whole sensor has been read, e.g., top to bottom, the process may begin again at the top. For a 20 Hz frame rate on a camera having 1000 rows, the line read rate may be 20 Hz×1000=20 kHz, for example. This video mode may have the feature that each row integrates a slightly shifted time interval. In the example just given, each row may integrate for 50 millisecond (ms) but the first row of the image integrates an interval that is almost 50 ms earlier than the last row. This can create startling effects when taking video with high-speed x-y motion in the frame. In this application where motion is relatively slow and in the z-axis, the primary artifacts may be z-blurring and tilt of the sample x-y plane relative the z-axis normal. If the row direction is "x" then the effective "y" axis may be tilted by one z sample distance divided by the sensor height (number of rows×pixel size). If the pixel scale at the image is 100 nm and the z-step is 500 nm, then the tilt may be 500 nm/(1000 rows×100 nm)=0.005 radians or 0.29°. In some cases, this angle is about 0.10 or less. An additional artifact may be to slightly blur the z-dimension of the volumetric image by a fraction of the z-voxel size. This can be reduced by adjusting the z-voxel size.

The present disclosure provides methods and systems for producing high-throughput volumetric images of a sample (e.g., tissue, e.g., biological tissue).

In one aspect, the present disclosure provides a method of volumetric imaging of a sample (e.g., a tissue, e.g., biological tissue), the method may comprise: acquiring a series of video frames (e.g., fluorescence images) of the sample while under continuous motion in the z-direction; and, assembling the video frames, thereby forming a volumetric image of the sample. In some cases, e.g., with rolling shutter video, the volumetric image produced is skewed. In some cases, the video rate (i.e., frame rate) and velocity in the z-direction are coordinated such that $$\frac{z-\text{velocity }(\mu m\ s^{-1})}{\text{frame rate (Hz)}} = \text{desired voxel } z\ (\mu m).$$

In some instances, the sensor height of the camera and z-voxel size are chosen such that $$\tan^{-1}\left(\frac{\text{voxel } z\,(\mu m)}{\text{projected sensor height }(\mu m)}\right) \leq 0.1°$$

for a given video rate. In some cases, the continuous video integration will induce a z blur of approximately ½ the z voxel size, analogous to transverse blur in time delay integration (TDI) scanning systems. To reduce this blurring one can pick the z-voxel size to 100%, 80%, 50%, 25% or 10% of the system depth of focus.

In some cases, the rolling shutter videos frames have a volumetric skew angle (i.e., angle of sample x-y plane relative to the z-direction) of about 0.10 or less (e.g., about 0.09°, 0.08°, 0.07°, 0.06°, 0.05°, 0.04°, 0.03°, 0.02°, 0.010 or less). In some instances, the skew angle is less than about 0.2°.

In some instances, the z-voxel size is greater than 100 nm (e.g., greater than about 200 nm, 400 nm, 1,000 nm, 2,000 nm, or 4,000 nm).

In some cases, the method further comprises the use of image processing software. In some instances, the method further comprises an image correction step (i.e., correcting for a skew angle). In some cases, the skewed volumetric image is digitally transformed to rectilinear using a linear transform, affine transform or other non-linear transform.

In another aspect, the disclosure provides a method for correcting rolling shutter volumetric data, the method may comprise: acquiring data (i.e., fluorescence images) of a sample under rolling shutter video acquisition, while continuously moving in the z-direction; and, resampling the data into a rectilinear space by removing a skew induced by rolling shutter video acquisition; thereby correcting rolling shutter volumetric data.

In another aspect, the disclosure provides a method for stitching adjacent rolling shutter volumetric data, the method may comprise: acquiring data (i.e., fluorescence images) of a sample under rolling shutter video acquisition, while continuously moving in the z-direction; and, removing a skew induced by rolling shutter video acquisition while in continuous motion for each field thereby creating a combined volume resampled in a rectilinear coordinate system.

In another aspect, the present disclosure provides systems for volumetric imaging of a sample (e.g., tissue, e.g., biological tissue), where the systems may comprise: a visualization device; a device or system for motion in the z-direction; and a control unit. In some cases, the motion in the z-direction may be provided by a z-axis scanner. In some cases, the sample is a biological tissue. In some instances, the sample is greater than 50 μm in the z-direction (e.g., at least 50 μm, 60 μm, 70 μm, 80 μm, 90 μm, 100 μm, 120 μm, 140 μm, 160 μm, 180 μm, 200 μm, 250 μm). In some instances, the sample further comprises a detection tag.

In another aspect, the present disclosure provides systems for volumetric imaging of a sample (e.g., tissue, e.g., biological tissue), where the system may comprise: a microscope device; a sensor; a device or system for motion in the z-direction; and a control unit. In some cases, the motion in the z-direction may be provided by a z-axis scanner. In some cases, the microscope device is a confocal microscope device or a lightsheet microscope device (e.g. a microscope device as described herein). In some instances, the objective lens is moved continuously in the z-direction. In some instances, the stage is capable of continuous movement in the z-direction. In some cases, the stage is capable of movement in x, y, or z directions. In some cases, the stage is capable of movement in the z-direction. In some cases, the stage is capable of movement in the z direction at a constant velocity.

In some cases, the sensor comprises a complementary metal-oxide-semiconductor (CMOS) sensor, scientific complementary metal-oxide-semiconductor (sCMOS), or charge-coupled device (CCD). In some cases, the sensor comprises a rolling shutter functionality (e.g., a rolling shutter functionality as described herein) or other continuous integration modality (e.g. global shutter video). In some cases, the global shutter video may rely on a secondary readout array allowing for substantially continuous integration, e.g., greater than 90%, 95% 98% 99%, 99.5%, 99.9% integration duty cycle.

In another aspect, the present disclosure provides methods for volumetric imaging of a sample (e.g., tissue, biological tissue, or cleared and stabilized biological tissue), the method may comprise: providing a system for volumetric imaging of a sample (e.g., a system described herein); providing a sample comprising a detection tag; acquiring a continuous series of fluorescence images of the sample while under motion in the z-direction; and, assembling the images, thereby forming a volumetric image of the sample.

Lightsheet fluorescence microscopy may be characterized by the use of a "lightsheet," a laser beam with a width of approximately a few hundred nanometers to a few micrometers, to irradiate a sample in a plane perpendicular to the direction of the imaging or observation direction.

Background information on spinning disk confocal microscopy can be found, inter alia, in Journal of Histochemistry & Cytochemistry 59.2 (2011): 129-138 or Nature methods 14.4 (2017): 360-373.

In one aspect, the present invention provides systems for volumetric imaging of a sample (e.g., tissue, e.g., biological tissue), where the systems may comprise: (i) a microscope device; (ii) a sensor comprising a rolling shutter functionality; (iii) a stage capable of motion in the z-direction; and (iv) a control unit; optionally, wherein the tissue comprises one or more detection tags.

In some instances, the sample is a tissue. In some cases, the sample is a biological tissue. In some instances, the sample is a biological tissue comprising epithelial tissue, connective tissue, muscle tissue, or nervous tissue. In some cases, the sample comprises epithelial tissue. In some instances, the sample comprises connective tissue. In some cases, the sample comprises muscle tissue. In some instances, the sample comprises nervous tissue.

In some instances, the sample comprises a single cell type. In some cases, the sample comprises a plurality of cell types. In some cases, the sample comprises neuronal (e.g., excitatory or inhibitory) cells or non-neuronal cells. In some cases, the sample comprises neuronal (e.g., excitatory or inhibitory) cells and non-neuronal cells. In some instances, the sample comprises neuronal cells (e.g., excitatory or inhibitory neurons). In some instances, the sample comprises glial cells. In some cases, the sample comprises oligodendrocytes. In some cases, the sample comprises astrocytes.

In some instances, the sample includes brain tissue (e.g., visual cortex slices). In some instances, the sample comprises smooth muscle cells. In some cases, the sample comprises endothelial cells.

In some instances, the sample is a known tissue region (e.g., a tissue region based on the Allen Mouse Brain Reference Atlas). In some cases, the tissue region is selected from: anterior cingulate area; agranular insular area; agranular insular area, posterior part; alveus; accessory olfactory bulb, granule layer; anterior olfactory nucleus; anterior olfactory nucleus, medial part; cerebral aqueduct; arcuate hypothalamic nucleus; auditory area; basolateral amygdalar nucleus; basomedial amygdalar nucleus; bed nuclei of the stria terminalis anterior division ventral nucleus; bed nuclei of the stria terminalis posterior division dorsal nucleus; field CA1, pyramidal layer; field CA2, pyramidal layer; field CA3, pyramidal layer; cerebellar cortex, dorsal part, granular layer; cerebellar cortex, molecular layer; cerebellar cortex, Purkinje layer; cerebellar cortex, ventral part, granular layer; corpus callosum; central amygdalar nucleus; central amygdalar nucleus, lateral part; choroid plexus; cingulum bundle; claustrum; cortical amygdalar area, anterior part; cortical amygdalar area, posterior part; caudoputamen; CTX, cerebral cortex; cortical subplate; dorsal fornix; dentate gyrus; 4 dentate gyrus, dorsal part, granule cell layer; dentate gyrus, molecular layer/polymorph layer; dentate gyrus, ventral part, granule cell layer; dorsomedial nucleus of the hypothalamus; dorsal motor nucleus of the vagus nerve; dorsal nucleus raphe; ectorhinal area; entorhinal area, lateral part; entorhinal area, medial part; endopiriform nucleus; Edinger-Westphal nucleus; forebrain; fiber tracts; *Fasciola cinerea*; fimbria; hindbrain; hindbrain lateral part; hippocampal formation; hippocampal formation *Stratum lacunosum*-moleculare/*Stratum radiatum*/*Stratum oriens*; hypothalamus, anterior-lateral enriched; HYam, hypothalamus, anterior medial enriched; hypothalamus, posterior-medial part enriched; IA, intercalated amygdalar nucleus; IC, inferior colliculus; IG, indusium griseum; III, oculomotor nucleus; ILA, infralimbic area; int, internal capsule; IO, inferior olivary complex; IPN, interpeduncular nucleus; L11, cerebral cortical layer 1, lateral part; Llm, cerebral cortical layer 1, medial part; L2/3, layer 2/3; L4, layer 4; L5, layer 5; L6, layer 6; L6a, layer 6a; L6b, layer 6b; LA, lateral amygdalar nucleus; locus coeruleus; laterodorsal tegmental nucleus; LH, lateral habenula; lateral hypothalamic area; lateral septal nucleus; medial amygdalar nucleus; medial habenula; medial habenula, dorsal part; medial habenula, ventral part; medial mammillary nucleus, anterior part; medial mammillary nucleus, posterior part; meninges; mo, molecular layer; somatomotor areas; primary motor area;

main olfactory bulb, granule layer; medial prefrontal cortex; medulla, anterior enriched; medulla, dorsal part; medulla, medial enriched; medulla, posterior enriched; medial vestibular nucleus; nucleus of the solitary tract; olfactory bulb, glomerular layer; olfactory bulb, mitral layer; olfactory bulb, outer plexiform layer; olfactory nerve layer of main olfactory bulb; pons; posterior amygdalar nucleus; pallidum, dorsal region; pallidum, medial region; pallidum, ventral region; periaqueductal gray, dorsal part enriched; periaqueductal gray, posterior ventral part; pontine central gray; perirhinal area; piriform area; prelimbic area; pons, medial part; pedunculopontine nucleus; polymorph layer; postsubiculum; presubiculum; principal sensory nucleus of the trigeminal; paraventricular hypothalamic nucleus; periventricular hypothalamic nucleus, posterior part; nucleus of reuniens; nucleus raphe obscurus; nucleus raphe pallidus; midbrain reticular nucleus, retrorubral area; retrosplenial cortex; reticular nucleus of the thalamus; striatum-like amygdalar nuclei; superior colliculus; suprachiasmatic nucleus; subcommissural organ; subependymal zone; subfornical organ; granule cell layer; stratum lacunosummoleculare; substantia nigra, compact part; substantia nigra, reticular part; stratum oriens; pyramidal layer; spinal nucleus of the trigeminal; *Stratum radiatum*; somatosensory area; primary SS; secondary SS; subthalamus nucleus; striatum; periventricular area of striatum; dorsal striatum, anterior-lateral enriched; dorsal striatum, posterior-medial enriched; striatum ventral region; ventral striatum, anterior-lateral enriched; ventral striatum, islands of Calleja; ventral striatum, olfactory tubercle; ventral striatum, posterior-medial enriched; subiculum, pyramidal layer; subiculum *Stratum radiatum*; temporal association area; thalamus; lateral TH; anterior-medial TH; thalamus medial part; posterior medial TH; tuberomammillary nucleus; triangular nucleus of septum; *Taenia tecta*, dorsal part; *Taenia tecta*, ventral part; motor nucleus of 5 trigeminal; third ventricle; facial motor nucleus; visual area; visceral area; lateral ventricle; ventromedial hypothalamic nucleus; ventral tegmental area; ventricular wall; or zona incerta.

In some instances, the sample comprises or is derived from a naturally occurring cell (e.g., cells from a primary source) or naturally occurring cell populations. In some cases, the sample comprises a genetically engineered cell or cell lines. In some cases, the sample comprises cells derived from a transgenic animal or animals. In some instances, the sample comprises bacterial, fungal, plant or animal cells. In some instances, the sample comprises mammalian cells. In some cases, the sample comprises cells or tissue derived from blood, bone marrow, liver, pancreas, neural tissue, bone marrow, or skin. In some instances, the sample comprises cultured cells.

In some cases, the sample has a length in the z-direction of about 5 micrometers (μm), 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 510 μm, 520 μm, 530 μm, 540 μm, 550 μm, 560 μm, 570 μm, 580 μm, 590 μm, 600 μm, 610 μm, 620 μm, 630 μm, 640 μm, 650 μm, 660 μm, 670 μm, 680 μm, 690 μm, 700 μm, 710 μm, 720 μm, 730 μm, 740 μm, 750 μm, 760 μm, 770 μm, 780 μm, 790 μm, 800 μm, 810 μm, 820 μm, 830 μm, 840 μm, 850 μm, 860 μm, 870 μm, 880 μm, 890 μm, 900 μm, 910 μm, 920 μm, 930 μm, 940 μm, 950 μm, 960 μm, 970 μm, 980 μm, 990 μm, or 1000 μm.

In some cases, the sample has a length in the z-direction of less than 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 510 μm, 520 μm, 530 μm, 540 μm, 550 μm, 560 μm, 570 μm, 580 μm, 590 μm, 600 μm, 610 μm, 620 μm, 630 μm, 640 μm, 650 μm, 660 μm, 670 μm, 680 μm, 690 μm, 700 μm, 710 μm, 720 μm, 730 μm, 740 μm, 750 μm, 760 μm, 770 μm, 780 μm, 790 μm, 800 μm, 810 μm, 820 μm, 830 μm, 840 μm, 850 μm, 860 μm, 870 μm, 880 μm, 890 μm, 900 μm, 910 μm, 920 μm, 930 μm, 940 μm, 950 μm, 960 μm, 970 μm, 980 μm, 990 μm, or 1000 μm.

In some instances, the sample has a length in the z-direction of greater than 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 510 μm, 520 μm, 530 μm, 540 μm, 550 μm, 560 μm, 570 μm, 580 μm, 590 μm, 600 μm, 610 μm, 620 μm, 630 μm, 640 μm, 650 μm, 660 μm, 670 μm, 680 μm, 690 μm, 700 μm, 710 μm, 720 μm, 730 μm, 740 μm, 750 μm, 760 μm, 770 μm, 780 μm, 790 μm, 800 μm, 810 μm, 820 μm, 830 μm, 840 μm, 850 μm, 860 μm, 870 μm, 880 μm, 890 μm, 900 μm, 910 μm, 920 μm, 930 μm, 940 μm, 950 μm, 960 μm, 970 μm, 980 μm, 990 μm, or 1000 μm.

In some instances, the sample is a tissue with a thickness of 5-20 μm. In some instances, the sample is a tissue with a thickness of 50-200 μm.

In some instances, the sample (e.g., tissue) is preserved prior to analysis, visualization, or imaging. In some instances, the sample (e.g., tissue) is stored prior to analysis, visualization, or imaging.

In some instances, the sample is treated by one or more methods known in the art.

In some instances, the sample is fixed, permeabilized, gelled, or immunotreated. In some cases, the sample is fixed. In some cases, the sample is permeabilized. In some instances, the sample is gelled. In some instances, the sample is fixed immunotreated.

In some cases, the sample comprises an enzymatic reaction or the products of an enzymatic reaction.

In some cases, the sample is treated by a method disclosed in US Patent Publication No.: 20210164039, PCT Publication No.: WO2023278409, or PCT Publication No.: WO2023018756, each of which is incorporated herein by reference in its entirety.

In some instances, the sample is treated to detect the expression of a gene. In some cases, the sample is treated to detect the expression of a nucleic acid (e.g., RNA, e.g., mRNA).

In some cases, the sample is treated to detect the expression of a gene selected from: Aak1, Abat, Ablim2, Acsl4, Acsl6, Ahi1, AK010878, Anapc11, Ank2, Ank3, Anks1b, Ap1p2, Arhgap32, Arpc4, Arpp21, Asic2, Asph, Atf2, Atp2b2, Atp2b4, Atp2c1, Atp5g1, Atp6v0a1, Bcat1, Bclaf1, Bdnf, Bicd1, Brinp3, Btrc, Cacnb4, Cadps, Cadps2, Caln1, Caly, Camk2b, Camk2d, Camk2g, Canx, Capzb, Cbx5, Ccdc85a, Ccl27a, Ccnc, Ccser2, Cdc42, Cdkl2, Celf2, Celf4, Chid1, Clcn3, Cldn25, Cnot4, Cntn1, Cntnap2, Comt, Cpne8, Ctnna2, Ctsa, Cttn, Cuedc2, Cyfip1, Dclk1, Dcun1d4, Degs2, Dlg1, Dlg2, Dlgap1, Dmtn, Dnaja1, Dnajc19, Dnm1l, Dpp6, Dtna, Dync1i2, Eftud2, Eif4a2, Eif4g2, Elavl2, Elavl4, Elmo1, Emc1, Epha7, Epn2, Etl4, Etv1, Extl2, Fam13c, Fam49a, Fam65b, Fbxo44, Fbxw7, Fhl1, Fis1, Foxp1, Ftx, Fyco1, Fyn, G3bp2, Gaa, Gabrg2, Gfm2, Gls, Gm12940, Gm21975, Gnao1, Gnas, Gnb1, Gnl31, Gpm6b, Gpr56, Gprasp1, Gria1, Gria2, Gria4, Grik2, Grin1, Grm5, Hk1, Hnrnpa1, Hnrnpa2b1, Homer1, Igf1, Il1rap, Immt, Ipcef1, Kalrn, Kcnip3, Kcnip4, Kcnma1, Klhl7, Knop1, Lamp2, Lcorl, Lgals9, Lhx6, Lifr, Lin7a, Lmo4, Lrif1, Lrrc57, Lsm6, Magi2, Map1a, Map1lc3a, Map4, Mapk10, Mapre2, Mapt, Mat2b, Mbp, Mef2c, Meg3, Mfsd4, Mgll, Mkl2, Mocs2, Morf4l1, Morf4l2, Mprip, Mrp148, Myef2, Myt1l, N6amt1, Ncald, Ncam1, Ndrg2, Ndrg3, Ndrg4, Negr1, Nfasc, Nfib, Nfix, Nip7, Nkain4, Nol4, Nosip, Npm1, Nr2f2, Nrcam, Nrxn1, Nrxn3, Nsmce2, Ntrk2, Ntrk3, Ociad1, Ogdh, Olfm1, Osbpl1a, Oxr1, Pafah1b1, Pak3, Pcdh10, Pcdh7, Pcdha2, Pcdhga9, Pde4b, Pdp1, Pex2, Pex51, Pfkfb2, Pfkm, Phka2, Pigp, Pik3r1, Pja2, Pkm, Pld5, Pnkd, Ppfibp2, Ppp2r2b, Ppp2r5c, Prep1, Prickle2, Prkacb, Prkar1b, Prorsd1, Psap, Psd3, Psmd2, Ptk2, Ptp4a3, Ptprr, Puf60, Qk, R3hdm2, Rab3a, Rabgap1l, Ralgapa1, Ralgds, Rangap1, Rap1gds1, Rapgef4, Rasgrf1, Rbfox1, Rbm10, Rbm3, Rbmx, Rcan2, Rnf14, Rnf144b, Rnf6, Rnps1, Rorb, Rps24, Rps6kb1, Rrp8, Rtn1, Rtn3, Rtn4, Sars, Schip1, Sec14l1, Sfpq, Sgce, Sgk1, Sipa1l1, Slc24a2, Slc25a44, Slc38a1, Slc4a10, Slc4a4, Slu7, Smarca2, Snca, Snrpn, Sorbs1, Sorcs1, Sox6, Spag9, Sptan1, Srr, Srsf10, Srsf3, Srsf5, Srsf9, Ssbp2, Stxbp1, Sv2b, Sybu, Syngr1, Synj1, Synpr, Syt1, Taf9, Tardbp, Tbc1d24, Tcf4, Tcf7l2, Tecr, Timm22, Tmbim6, Tmod2, Tor1aip2, Tpd52, Tpgs2, Tpm1, Tpm3, Trappc13, Tsc22d3, Ttyh1, Tulp4, Txnl4a, Ubap2l, Ubxn11, Usp14, Vcan, Wdr37, Whsc1l1, Ywhaz, Zfp207, Zfp277, Zfp385b, or Zmynd8.

In some cases, the sample (e.g., biological tissue) comprises a detection tag. In some instances, the sample (e.g., biological tissue) comprises a plurality of detection tags.

In some instances, the detection tag is a fluorescent label.

In some cases, the fluorescent label is selected from: 6-carboxyfluorescein, 7'-dimethoxyfluorescein, 7-aminocoumarin, 8-difluoro-7-hydroxycoumarin fluorophore, AlexaFluor 350, AlexaFluor 488, AlexaFluor 532, AlexaFluor 546, AlexaFluor 568, AlexaFluor 594, AlexaFluor 633, AlexaFluor 660, AlexaFluor 680, AlexaFluor dyes, alkoxycoumarin derivatives, aminomethylcoumarin, aminonaphthalene-based dyes, bimane dyes, bimane mercaptoacetic acid, Bodipy 530/550, Bodipy 558/568, Bodipy 564/570, Bodipy 576/589, Bodipy 581/591, Bodipy 630/650, Bodipy 650/665, Bodipy dyes, Bodipy fl, Bodipy r6g, Bodipy tmr, Bodipy tr, carbocyanine, carboxyrhodamine 6g, carboxytetramethyl-rhodamine, carboxy-x-rhodamine, coumarin, coumarin dyes, Cy-3, Cy-3.5, Cy-5, Cy5.5, Cy-5.5, cyanine dyes, dapoxyl dye, dialkylaminocoumarin, dialkylaminocoumarin, DAPI, Dylight-680, Dylight-750, Dylight-800, eosin, fitc, fluorescein isothiocyanineo rf itc, hydroxycoumarin, gfp, hydroxycoumarin derivatives ird 700, ird 800, ird40, irdye-800, irdyes, lissamine rhodamine b, merocyanine, methoxycoumarin, naphthofluorescein, nbd dye, oregon green 488, oregon green 500, oregon green 514, oregon green dyes, oxonol dyes, phycoerythrin, rhodamine 6g, rhodamine dyes, rhodamine green, rhodamine red, rythrosine, styryl dyes, tetramethylrhodamine, Texas Red, Texas Red-x, Vivotag-680, Vivotag-750, and YFP.

In some cases, the fluorescent label is selected from: DAPI, FITC, GFP, Alexa 488, Cy2, TRITC, Cy3, Alexa 546, Texas Red, Cy5, and YFP.

In some instances, the sample comprises a plurality of fluorescent labels.

The system described herein may comprise a visualization device suitable for imaging a sample (e.g., a sample described herein). In some instances, the visualization device is a microscope device.

In some cases, the microscope device is a confocal microscope device or a lightsheet microscope device. In some cases, the microscope device is a confocal microscope device. In some instances, the microscope device is a light sheet microscope device.

In some instances, the microscope device is a laser scanning confocal microscope device, a spinning disk confocal microscope device, or a line-confocal microscope device. In some cases, the microscope device is a laser scanning confocal microscope device. In some instances, the microscope device is a spinning disk confocal microscope device. In some cases, the microscope device is r a line-confocal microscope device.

In some cases, the systems herein comprise (e.g., are combined with or integrated into) an existing microscope system (e.g., a confocal microscope system, e.g., a light sheet microscope system). In some cases, the systems herein comprise (e.g., are combined with or integrated into) an existing microscope system selected from: Nikon AX R MP, Nikon AX/AX R, Nikon AX NIR, Nikon CSU-X1, Nikon CSU-W1, Nikon CSUW1 SoRa, Crest X-Light V2, Crest X-Light V3, Crest X-Light V3/DeepSIM, ThorLabs Veneto, ThorLabs Cerna, Zeiss Axio Observer Z1, Zeiss Axiovert 40, Leica Stellaris 5, Leica Stellaris 8, Leica TCS SP8, Olympus BX61, Olympus FV3000, Olympus FVMPE-RS, Oxford Dragonfly 200, or Oxford Dragonfly 600.

In some instances, the microscope device comprises a light source, illumination optics, or imaging optics. In some instances, the microscope device comprises a light source. In some cases, the microscope device comprises illumination optics. In some cases, the microscope device comprises imaging optics.

In some cases, the light source illuminates a region on the sample after interaction with one or more of the objective lens and illumination optics. The microscope objective may then capture and magnify emitted light from the sample, which is captured by a sensor (e.g., a sensor as described herein), optionally after interaction with imaging optics.

In some cases, the confocal microscope device comprises an objective, a light source, and additional optical elements.

In some instances, the microscope device comprises a feature or optical element disclosed in U.S. Pat. Nos. 5,535,052; 5,612,818; 6,094,300; 7,335,898; each of which is incorporated herein by reference in their entirety.

In some instances, the microscope device comprises a feature or optical element disclosed in U.S. Pat. No. 5,067,805, which is incorporated herein by reference in its entirety.

In some cases, the visualization device (e.g., microscope device) described herein comprises an objective lens. The objective lens may be generally considered the most important optical component of the microscope, and may be responsible for the information content (e.g., resolution) of the resulting image.

In some cases, the objective lens is a high-performance objective suitable for use with a laser or non-coherent light source (e.g., a light source described herein).

In some cases, the objective lens is highly corrected for geometric and chromatic aberrations over the desired field of view.

In some cases, the objective lens transmits light from at least the near ultraviolet to the near infrared range.

In some instances, the objective lens has a suitable numerical aperture. The numerical aperture of an objective may be dimensionless unit that quantifies the objective's ability to gather light, and may directly relate to the ability of the objective to resolve details in the sample (e.g., a sample described herein).

In some instances, the objective lens has a numerical aperture of about 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1, 1.05, 1.10, 1.15, 1.20, 1.25, 1.30, 1.35, 1.40, 1.45, or 1.50.

In some cases, the objective lens has a numerical aperture of about 0.60, 0.65, 0.70, 0.75, 0.80, 0.85, 0.90, 0.95, 1, 1.05, 1.10, 1.15, 1.20, 1.25, 1.30, 1.35, 1.40, 1.45, or 1.50.

In some instances, the objective lens is an achromat, plan achromat, fluor, or apochromat objective. The objective lens may have any magnification suitable for the sample (e.g., a sample described herein). In some cases, the objective lens has a magnification selected from: 4×, 10×, 20×, 40×, 60× or 100×.

In some instances, the objective lens is a water-immersion lens, glycerol immersion lens, oil immersion lens, or silicone immersion lens.

In some cases, the objective lens has a working distance (i.e., the distance between the top surface of the cover glass and the front lens element when a specimen plane in contact with the cover glass is in focus) suitable for confocal microscopy.

In some instances, the objective lens has a working distance of about 1 mm. In some instances, the objective lens has a working distance of less than 1 mm.

In some cases, the objective lens has a working distance of about 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, or 950 μm. In some cases, the objective lens has a working distance of less than 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, or 950 μm. In some instances, the objective lens has a working distance of greater than 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, or 950 μm.

In some cases, the objective lens has a working distance of about 950 μm. In some instances, the objective lens has a working distance of about 800 μm. In some cases, the objective lens has a working distance of about 600 μm. In some cases, the objective lens has a working distance of about 300 μm. In some instances, the objective lens has a working distance of about 290 μm. In some instances, the objective lens has a working distance of about 170 μm. In some cases, the objective lens has a working distance of about 150 μm. In some cases, the objective lens has a working distance of about 130 μm. In some instances, the objective has a resolution of less than 2.00 μm at a relevant wavelength of light. In some cases, the objective has a resolution of about 0.20 μm, 0.30 μm, 0.40 μm, 0.50 μm, 0.60 μm, 0.70 μm, 0.80 μm, 0.90 μm, 1.00 μm, 1.10 μm, 1.20 μm, 1.30 μm, or 1.40 μm at a relevant wavelength of light. In some instances, the objective has a resolution of less than 0.20 μm, 0.30 μm, 0.40 μm, 0.50 μm, 0.60 μm, 0.70 μm, 0.80 μm, 0.90 μm, 1.00 μm, 1.10 μm, 1.20 μm, 1.30 μm, or 1.40 μm at a relevant wavelength of light. In some cases, the objective has a resolution of greater than 0.20 μm, 0.30 μm, 0.40 μm, 0.50 μm, 0.60 μm, 0.70 μm, 0.80 μm, 0.90 μm, 1.00 μm, 1.10 μm, 1.20 μm, 1.30 μm, or 1.40 μm at a relevant wavelength of light.

In some instances, the objective lens is selected from: CFI75 Apochromat LWD 20XCW, CFI Apochromat Lambda S 40XCWI, CFI75 LWD 16XW, CFI Apochromat NIR 60XW, CFI75 Apochromat 25XCW 1300, CFI Apochromat LWD Lambda S 20XCWI, CFI Apochromat NIR 40XW, CFI Plan Apochromat 10XC Glyc, CFI90 20XC Glyc, CFI Plan Fluor 20XCMI, CFI Plan Apochromat Lambda D 10X, or CFI Plan Apochromat Lambda S 25XC Sil, CFI Plan Apochromat Lambda S 40XC Sil.

In some cases, the visualization device (e.g., microscope device) described herein comprises a light source. The light source may be any source capable of delivering light of the relevant excitation wavelength to the sample.

In some cases, the light source is a laser source or a non-coherent source.

In some instances, the light source comprises a laser source. In some instances, the light source comprises a plurality of laser sources. In some cases, the light source comprises lasers covering the optical spectrum from the near IR to the near UV.

In some cases, the light source is an argon-ion laser.

In some cases the light is delivered as a collimated beam with a specified beam diameter.

In some instances, the light source is a non-coherent source. In some cases, the light source is an arc discharge lamp. In some instances, the light source is a broadband source.

In some instances, the light source is selected from: a xenon lamp, a mercury lamp, a light-emitting diode (LED), or a halogen lamp.

In some cases, the light source is an LED with a peak wavelength selected from: 365 nm, 400 nm, 450 nm, and 520 nm.

In some cases, the light source is an LED with a peak wavelength selected from: 395 nm, 430 nm, 470 nm, 555 nm, 585 nm 605 nm, 612 nm, 633 nm, 660 nm, and 880 nm.

In some instances, the light source is filtered (e.g., with a bandpass filter). In some cases, the light source is unfiltered.

In some instances, the visualization device (e.g., microscope device) described herein comprises an additional optical element.

In some instances, the microscope device comprises an optical filter. In some instances, the optical filter is an excitation filter, an emission filter, or a dichroic filter.

In some cases, the optical filter is a neutral-density filter, a polarizing filter, a UV-filter, or a near-IR filter.

In some cases, the optical filter efficiently transmits fluorescent light, while blocking the wavelength of the light source. In some instances, the optical filter ensures the illumination is near monochromatic and at the correct wavelength.

In some cases, the microscope device comprises an optical filter specific to the detection tag (e.g., fluorescent label) of the sample.

In some instances, the microscope device comprises an emission filter. In some instances, the emission filter efficiently transmits the fluorescent light while attenuating light at other wavelengths. In some instances, the optical filter blocks ambient light. In some cases, emission filter ensures none of the excitation light source reaches the detector.

In some cases, the microscope device comprises a single dichroic mirror which performs the function of both the excitation filter and the emission filter. In some cases, the microscope device comprises several dichroics, excitation sources and cameras configured for concurrent operation.

In some instances, the microscope device comprises a linear variable filter. In some instances, the microscope device comprises a filter cube. In some instances, the microscope device comprises a plurality of optical filters. In some cases, the microscope device does not comprise a filter.

In some cases, the microscope device comprises a photomultiplier tube (PMT).

The systems of the present invention comprise one or more sensors capable of detecting a signal (e.g., light) from a sample.

In some instances, the sensor comprises a charge-coupled device (CCD), an electron multiplying charge coupled device (EECCD), a complementary metal-oxide-semiconductor (CMOS) sensor or a scientific complementary metal-oxide-semiconductor (sCMOS). In some cases, the sensor comprises a charge-coupled device (CCD). In some cases, the sensor comprises an electron multiplying charge coupled device (EECCD). In some instances, the sensor comprises a complementary metal-oxide-semiconductor (CMOS). In some instances, the sensor comprises a scientific complementary metal-oxide-semiconductor (sCMOS).

In some instances, the sensor comprises a rolling shutter functionality. That is, the sensor may be capable of rolling shutter video. Rolling shutter detectors may start the exposure of each pixel row at a slightly different time. If, for example, the sample is moving rapidly (e.g., rapidly compared to the frame rate of the sensor), then image distortion can occur.

In some cases, fluorescence emission from a sample (e.g., a sample described herein) is focused on a CMOS or sCMOS detector comprising a rolling shutter functionality.

In some cases, the timing between the sample illumination and the rolling shutter exposure are synchronized (e.g., synchronized by methods known in the art).

In some cases, the rolling shutter expose pixels in a row-by-row fashion during a frame exposure.

In some instances, the rolling shutter is linear (i.e., exposes pixels in one direction).

In some cases, the sensor comprises a global shutter functionality. In the global shutter method of detection, all pixels may be exposed to light simultaneously. In some cases, the sensor does not comprise a global shutter functionality.

In some cases, the sensor has a diagonal length of about 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm 28 mm, 29 mm, or 30 mm.

In some cases, the sensor has a diagonal length less than about 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm 28 mm, 29 mm, 30 mm, or 50 mm.

In some instances, the sensor has a diagonal length greater than about 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm 28 mm, 29 mm, or 30 mm, or 50 mm.

In some cases, the sensor comprises pixels of about 1 $\mu m^2$, 2 $\mu m^2$, 3 $\mu m^2$, 4 $\mu m^2$, 5 $\mu m^2$, 6 $\mu m^2$, 7 $\mu m^2$, 8 $\mu m^2$, 9 $\mu m^2$, 10 $\mu m^2$, 11 $\mu m^2$, 12 $\mu m^2$, 13 $\mu m^2$, 14 $\mu m^2$, 15 $\mu m^2$, 16 $\mu m^2$ 17 $\mu m^2$, 18 $\mu m^2$, 19 $\mu m^2$, 20 $\mu m^2$, 21 $\mu m^2$, 22 $\mu m^2$, 23 $\mu m^2$, 24 $\mu m^2$, 25 $\mu m^2$, 26 $\mu m^2$, 27 $\mu m^2$, 28 $\mu m^2$, 29 $\mu m^2$, 30 $\mu m^2$, 31 $\mu m^2$, 32 $\mu m^2$, 33 $\mu m^2$, 34 $\mu m^2$, 35 $\mu m^2$, 36 $\mu m^2$, 37 $\mu m^2$, 38 $\mu m^2$, 39 $\mu m^2$, or 40 $\mu m^2$.

In some instances, the sensor has a pixel size of less than 2 $\mu m^2$, 3 $\mu m^2$, 4 $\mu m^2$, 5 $\mu m^2$, 6 $\mu m^2$, 7 $\mu m^2$, 8 $\mu m^2$, 9 $\mu m^2$, 10 $\mu m^2$, 11 $\mu m^2$, 12 $\mu m^2$, 13 $\mu m^2$, 14 $\mu m^2$, 15 $\mu m^2$, 16 $\mu m^2$, 17 $\mu m^2$ 18 $\mu m^2$, 19 $\mu m^2$, 20 $\mu m^2$, 21 $\mu m^2$, 22 $\mu m^2$, 23 $\mu m^2$, 24 $\mu m^2$, 25 $\mu m^2$, 26 $\mu m^2$, 27 $\mu m^2$, 28 $\mu m^2$, 29 $\mu m^2$, 30 $\mu m^2$, 31 $\mu m^2$, 32 $\mu m^2$, 33 $\mu m^2$, 34 $\mu m^2$, 35 $\mu m^2$, 36 $\mu m^2$, 37 $\mu m^2$, 38 $\mu m^2$, 39 $\mu m^2$, or 40 $\mu m^2$.

In some cases, the sensor has a pixel size of greater than 2 $\mu m^2$, 3 $\mu m^2$, 4 $\mu m^2$, 5 $\mu m^2$, 6 $\mu m^2$, 7 $\mu m^2$, 8 $\mu m^2$, 9 $\mu m^2$, 10 $\mu m^2$, 11 $\mu m^2$, 12 $\mu m^2$, 13 $\mu m^2$, 14 $\mu m^2$, 15 $\mu m^2$, 16 $\mu m^2$, 17 $\mu m^2$ 18 $\mu m^2$, 19 $\mu m^2$, 20 $\mu m^2$, 21 $\mu m^2$, 22 $\mu m^2$, 23 $\mu m^2$, 24 $\mu m^2$, 25 $\mu m^2$, 26 $\mu m^2$, 27 $\mu m^2$, 28 $\mu m^2$, 29 $\mu m^2$, 30 $\mu m^2$, 31 $\mu m^2$, 32 $\mu m^2$, 33 $\mu m^2$, 34 $\mu m^2$, 35 $\mu m^2$, 36 $\mu m^2$, 37 $\mu m^2$, 38 $\mu m^2$, 39 $\mu m^2$, 40 $\mu m^2$, 41 $\mu m^2$, 42 $\mu m^2$, 43 $\mu m^2$, 44 $\mu m^2$, 45 $\mu m^2$, 46 $\mu m^2$, 47 $\mu m^2$, 48 $\mu m^2$, 49 $\mu m^2$, or 50 $\mu m^2$.

In some cases, the sensor has a pixel size of about 14 $\mu m^2$. In some instances, the sensor has a pixel size of about 25 $\mu m^2$. In some cases, the sensor has a pixel size of about 30 $\mu m^2$. In some instances, the sensor has a pixel size of about 35 $\mu m^2$. In some instances, the sensor has a pixel size of about 40 $\mu m^2$. In some instances, the sensor has a pixel size of about 42 $\mu m^2$. In some cases, the sensor has a pixel size of about 56 $\mu m^2$.

In some instances, the sensor has a pixel size of less than 25 $\mu m^2$. In some cases, the sensor has a pixel size of less than 30 $\mu m^2$. In some instances, the sensor has a pixel size of less than 35 $\mu m^2$. In some instances, the sensor has a pixel size of less than 40 $\mu m^2$. In some cases, the sensor has a pixel size of less than 42 $\mu m^2$. In some instances, the sensor has a pixel size of less than 45 $\mu m^2$.

In some instances, the sensor has a pixel size of greater than 25 $\mu m^2$. In some cases, the sensor has a pixel size of greater than 30 $\mu m^2$. In some instances, the sensor has a pixel size of greater than 35 $\mu m^2$. In some cases, the sensor has a pixel size of greater than 40 $\mu m^2$. In some instances, the sensor has a pixel size of greater than 42 $\mu m^2$. In some instances, the sensor has a pixel size of greater than 45 $\mu m^2$.

In some cases, the sensor height on the sample is about 200 μm, 400 μm, 1,000 μm, 2,000 μm, or 4,000 μm. In some cases, the sensor height on the sample is less than about 200 μm, 400 μm, 1,000 μm, 2,000 μm, or 4,000 μm. In some instances, the sensor height on the sample is greater than about 200 μm, 400 μm, 1,000 μm, 2,000 μm, or 4,000 μm.

In some cases, the sensor has a surface area of about 20 $mm^2$, 22 $mm^2$, 24 $mm^2$, 26 $mm^2$, 28 $mm^2$, 30 $mm^2$, 32 $mm^2$, 34 $mm^2$, 36 $mm^2$, 38 $mm^2$, 40 $mm^2$, 42 $mm^2$, 44 $mm^2$, 46 $mm^2$, 48 $mm^2$, 50 $mm^2$, 52 $mm^2$, 54 $mm^2$, 56 $mm^2$, 58 $mm^2$, 60 $mm^2$, 62 $mm^2$, 64 $mm^2$, 66 $mm^2$, 68 $mm^2$ 70 $mm^2$, 72 $mm^2$, 74 $mm^2$, 76 $mm^2$, 78 $mm^2$, 80 $mm^2$, 82 $mm^2$, 84 $mm^2$, 86 $mm^2$, 88 $mm^2$, 90 mm 2, 92 $mm^2$, 94 $mm^2$, 96 $mm^2$, 98 $mm^2$, 100 $mm^2$, 105 $mm^2$, 110 $mm^2$, 115 $mm^2$, 120 $mm^2$, 125 $mm^2$, 130 $mm^2$, 135 $mm^2$, 140 $mm^2$, 145 $mm^2$, 150 $mm^2$, 155 $mm^2$, 160 $mm^2$, 165 $mm^2$, 170 $mm^2$, 175 $mm^2$, 180 $mm^2$, 185 $mm^2$, 190 $mm^2$, 195 $mm^2$, 200 $mm^2$, 500 $mm^2$, 1000 $mm^2$, 1500 $mm^2$, 2000 $mm^2$, or 2500 $mm^2$.

In some instances, the sensor has a surface area of less than 20 $mm^2$, 22 $mm^2$, 24 $mm^2$, 26 $mm^2$, 28 $mm^2$, 30 $mm^2$, 32 $mm^2$, 34 $mm^2$, 36 $mm^2$, 38 $mm^2$, 40 $mm^2$, 42 $mm^2$, 44 $mm^2$, 46 $mm^2$ 48 $mm^2$, 50 $mm^2$, 52 $mm^2$, 54 $mm^2$, 56 $mm^2$, 58 $mm^2$, 60 $mm^2$, 62 $mm^2$, 64 $mm^2$, 66 $mm^2$, 68 $mm^2$, 70 $mm^2$, 72 $mm^2$, 74 $mm^2$, 76 $mm^2$, 78 $mm^2$, 80 $mm^2$, 82 $mm^2$, 84 $mm^2$, 86 $mm^2$, 88 $mm^2$ 90 $mm^2$, 92 $mm^2$, 94 $mm^2$, 96 $mm^2$, 98 $mm^2$, 100 $mm^2$, 105 $mm^2$, 110 $mm^2$, 115 $mm^2$, 120 $mm^2$, 125 $mm^2$, 130 $mm^2$, 135 $mm^2$, 140 $mm^2$, 145 $mm^2$, 150 $mm^2$, 155 $mm^2$, 160 $mm^2$, 165 $mm^2$, 170 $mm^2$, 175 $mm^2$, 180 $mm^2$, 185 $mm^2$, 190 $mm^2$, 195 $mm^2$, 200 $mm^2$, 500 $mm^2$, 1000 $mm^2$, 1500 $mm^2$, 2000 $mm^2$, or 2500 $mm^2$.

In some instances, the sensor has a surface area of greater than 20 $mm^2$, 22 $mm^2$, 24 $mm^2$, 26 $mm^2$, 28 $mm^2$, 30 $mm^2$, 32 $mm^2$, 34 $mm^2$, 36 $mm^2$, 38 $mm^2$, 40 $mm^2$, 42 $mm^2$, 44 $mm^2$, 46 $mm^2$, 48 $mm^2$, 50 $mm^2$, 52 $mm^2$, 54 $mm^2$, 56 $mm^2$, 58 $mm^2$, 60 $mm^2$, 62 $mm^2$, 64 $mm^2$, 66 $mm^2$ 68 $mm^2$, 70 $mm^2$, 72 $mm^2$, 74 $mm^2$, 76 $mm^2$, 78 $mm^2$, 80 $mm^2$, 82 $mm^2$, 84 $mm^2$, 86 $mm^2$, 88 mm 2, 90 $mm^2$, 92 $mm^2$, 94 $mm^2$, 96 $mm^2$, 98 $mm^2$, 100 $mm^2$, 105 $mm^2$, 110 $mm^2$, 115 $mm^2$, 120 mm 2, 125 $mm^2$, 130 $mm^2$, 135 $mm^2$, 140 $mm^2$, 145 $mm^2$, 150 $mm^2$, 155 $mm^2$, 160 $mm^2$, 165 $mm^2$, 170 $mm^2$, 175 $mm^2$, 180 $mm^2$, 185 $mm^2$, 190 $mm^2$, 195 $mm^2$, or 200 $mm^2$.

In some cases, the sensor has a surface area of about 46 $mm^2$. In some instances, the sensor has a surface area of about 52 $mm^2$. In some cases, the sensor has a surface area of about 56 $mm^2$. In some instances, the sensor has a surface area of about 170 $mm^2$. In some cases, the sensor has a surface area of about 175 $mm^2$.

In some cases, the sensor has a maximum frame rate (i.e., frame rate over the entire sensor) of about 5 Hz, 10 Hz, 20 Hz, 25 Hz, 30 Hz, 35 Hz, 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, 110 Hz, 120 Hz, 130 Hz, 140 Hz, 150 Hz, 160 Hz, 170 Hz, 180 Hz, 119 Hz, 200 Hz, 210 Hz, 220 Hz, 230 Hz, 240 Hz, 250 Hz, 260 Hz, 270 Hz, 280 Hz, 290 Hz, 300 Hz, 350 Hz, or 500 Hz at an exposure time of 1 ms.

In some instances, the sensor has a maximum frame rate (i.e., frame rate over the entire sensor) of less than 5 Hz, 10 Hz, 20 Hz, 25 Hz, 30 Hz, 35 Hz, 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, 110 Hz, 120 Hz, 130 Hz, 140 Hz, 150 Hz, 160 Hz, 170 Hz, 180 Hz, 119 Hz, 200 Hz, 210 Hz, 220 Hz, 230 Hz, 240 Hz, 250 Hz, 260 Hz, 270 Hz, 280 Hz, 290 Hz, 300 Hz, 350 Hz, or 500 Hz at an exposure time of 1 ms.

In some instances, the sensor has a maximum frame rate (i.e., frame rate over the entire detector) of greater than 5 Hz, 10 Hz, 20 Hz, 25 Hz, 30 Hz, 35 Hz, 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, 110 Hz, 120 Hz, 130 Hz, 140 Hz, 150 Hz, 160 Hz, 170 Hz, 180 Hz, 119 Hz, 200 Hz, 210 Hz, 220 Hz, 230 Hz, 240 Hz, 250 Hz, 260 Hz, 270 Hz, 280 Hz, 290 Hz, 300 Hz, 350 Hz, or 500 Hz at an exposure time of 1 ms.

In some instances, the sensor has a maximum frame rate (i.e., frame rate over the entire sensor) of about 30 Hz at an exposure time of approximately 33 ms. In some cases, the sensor has a maximum frame rate (i.e., frame rate over the entire sensor) of about 50 Hz at an exposure time of 20 ms.

In some cases, the sensor has an exposure time of about 0.1 ms, 0.2 ms, 0.3, ms, 0.4 ms, 0.5 ms, 0.6 ms, 0.7 ms, 0.8 ms, 0.9 ms, 1.0 ms, 1.1 ms, 1.2 ms, 1.3 ms, 1.4 ms, 1.5 ms, 1.6 ms, 1.7 ms, 1.8 ms, 1.9 ms, 2 ms, 3 ms, 4 ms, 5 ms, 6 ms, 7 ms, 8 ms, 9 ms, 10 ms, 12 ms, 14 ms, 16 ms, 18 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 110 ms, 120 ms, 130 ms, 140 ms, 150 ms, 160 ms, 170 ms, 180 ms, 190 ms, 200 ms, 220 ms, 240 ms, 260 ms, 280 ms, 300 ms, 320 ms, 340 ms, 360 ms, 380 ms, 400 ms, 420 ms, 440 ms, 460 ms, 480 ms, or 500 ms.

In some cases, the sensor has an exposure time of less than 0.1 ms, 0.2 ms, 0.3, ms, 0.4 ms, 0.5 ms, 0.6 ms, 0.7 ms, 0.8 ms, 0.9 ms, 1.0 ms, 1.1 ms, 1.2 ms, 1.3 ms, 1.4 ms, 1.5 ms, 1.6 ms, 1.7 ms, 1.8 ms, 1.9 ms, 2 ms, 3 ms, 4 ms, 5 ms, 6 ms, 7 ms, 8 ms, 9 ms, 10 ms, 12 ms, 14 ms, 16 ms, 18 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 110 ms, 120 ms, 130 ms, 140 ms, 150 ms, 160 ms, 170 ms, 180 ms, 190 ms, 200 ms, 220 ms, 240 ms, 260 ms, 280 ms, 300 ms, 320 ms, 340 ms, 360 ms, 380 ms, 400 ms, 420 ms, 440 ms, 460 ms, 480 ms, or 500 ms.

In some instances, the sensor has an exposure time of greater than 0.1 ms, 0.2 ms, 0.3, ms, 0.4 ms, 0.5 ms, 0.6 ms, 0.7 ms, 0.8 ms, 0.9 ms, 1.0 ms, 1.1 ms, 1.2 ms, 1.3 ms, 1.4 ms, 1.5 ms, 1.6 ms, 1.7 ms, 1.8 ms, 1.9 ms, 2 ms, 3 ms, 4 ms, 5 ms, 6 ms, 7 ms, 8 ms, 9 ms, 10 ms, 12 ms, 14 ms, 16 ms, 18 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 110 ms, 120 ms, 130 ms, 140 ms, 150 ms, 160 ms, 170 ms, 180 ms, 190 ms, 200 ms, 220 ms, 240 ms, 260 ms, 280 ms, 300 ms, 320 ms, 340 ms, 360 ms, 380 ms, 400 ms, 420 ms, 440 ms, 460 ms, 480 ms, or 500 ms.

In some cases, the sensor is a Zyla 4.2PLUS, Zyla Sona-6, Zyla Sona-12, Andor Neo, pco.edge 26 CLHS, pco.edge 10 bi CLHS, pco.edge 10 bi LT CLHS, pco.edge 5.5 CLHS, pco.edge 4.2 CLHS, Thorlabs CC215MU, or Hamamatsu ORCA-Flash4.0 V3.

In some instances, the sensor is a Sony IMX571BLR-J.

In some instances, the sensor is a Teledyne Kinetix sensor.

In some instances, systems of the present disclosure comprise a stage device that provides or is capable of continuous motion in the z-direction. In some cases, the system may comprise a stage to provide continuous motion in the z-direction. In some instances, the stage is capable of continuous motion in the z-direction. In some instances, the objective lens is capable of continuous motion in the z-direction. The continuous motion of the stage or objective may allow for constant imaging acquisition, eliminating the dead time typically required in volumetric imaging.

In some cases, the stage or objective is capable of continuous motion in the z-direction at a velocity of about 0.5 $\mu m\ s^{-1}$, 1 $\mu m\ s^{-1}$, 2 $\mu m\ s^{-1}$, 3 $\mu m\ s^{-1}$, 4 $\mu m\ s^{-1}$, 5 $\mu m\ s^{-1}$, 6 $\mu m\ s^{-1}$, 7 $\mu m\ s^{-1}$, 8 $\mu m\ s^{-1}$, 9 $\mu m\ s^{-1}$, 10 $\mu m\ s^{-1}$, 11 $\mu m\ s^{-1}$, 12 $\mu m\ s^{-1}$, 13 $\mu m\ s^{-1}$, 14 $\mu m\ s^{-1}$, 15 $\mu m\ s^{-1}$, 16 $\mu m\ s^{-1}$, 17 $\mu m\ s^{-1}$, 18 $\mu m\ s^{-1}$, 19 $\mu m\ s^{-1}$, 20 $\mu m\ s^{-1}$, 25 $\mu m\ s^{-1}$, 30 $\mu m\ s^{-1}$, 35 $\mu m\ s^{-1}$, 40 $\mu m\ s^{-1}$, 45 $\mu m\ s^{-1}$, 50 $\mu m\ s^{-1}$, 55 $\mu m\ s^{-1}$, 60 $\mu m\ s^{-1}$, 65 $\mu m\ s^{-1}$, 70 $\mu m\ s^{-1}$, 75 $\mu m\ s^{-1}$, 80 $\mu m\ s^{-1}$, 90 $\mu m\ s^{-1}$, 95 $\mu m\ s^{-1}$, 100 $\mu m\ s^{-1}$, 110 $\mu m\ s^{-1}$, 120 $\mu m\ s^{-1}$, 130 $\mu m\ s^{-1}$, 140 $\mu m\ s^{-1}$, 150 $\mu m\ s^{-1}$, 160 $\mu m\ s^{-1}$, 170 $\mu m\ s^{-1}$, 180 $\mu m\ s^{-1}$, 190 $\mu m\ s^{-1}$, or 200 $\mu m\ s^{-1}$.

In some cases, the stage or objective is capable of continuous motion in the z-direction at a velocity of less than 0.5 $\mu m\ s^{-1}$, 1 $\mu m\ s^{-1}$, 2 $\mu m\ s^{-1}$, 3 $\mu m\ s^{-1}$, 4 $\mu m\ s^{-1}$, 5 $\mu m\ s^{-1}$, 6 $\mu m\ s^{-1}$, 7 $\mu m\ s^{-1}$, 8 $\mu m\ s^{-1}$, 9 $\mu m\ s^{-1}$, 10 $\mu m\ s^{-1}$, 11 $\mu m\ s^{-1}$, 12 $\mu m\ s^{-1}$, 13 $\mu m\ s^{-1}$, 14 $\mu m\ s^{-1}$, 15 $\mu m\ s^{-1}$, 16 $\mu m\ s^{-1}$, 17 $\mu m\ s^{-1}$, 18 $\mu m\ s^{-1}$, 19 $\mu m\ s^{-1}$, 20 $\mu m\ s^{-1}$, 25 $\mu m\ s^{-1}$, 30 $\mu m\ s^{-1}$, 35 $\mu m\ s^{-1}$, 40 $\mu m\ s^{-1}$, 45 $\mu m\ s^{-1}$, 50 $\mu m\ s^{-1}$, 55 $\mu m\ s^{-1}$, 60 $\mu m\ s^{-1}$, 65 $\mu m\ s^{-1}$, 70 $\mu m\ s^{-1}$, 75 $\mu m\ s^{-1}$, 80 $\mu m\ s^{-1}$, 90 $\mu m\ s^{-1}$, 95 $\mu m\ s^{-1}$, 100 $\mu m\ s^{-1}$, 110 $\mu m\ s^{-1}$, 120 $\mu m\ s^{-1}$, 130 $\mu m\ s^{-1}$, 140 $\mu m\ s^{-1}$, 150 $\mu m\ s^{-1}$, 160 $\mu m\ s^{-1}$, 170 $\mu m\ s^{-1}$ 180 $\mu m\ s^{-1}$, 190 $\mu m\ s^{-1}$, or 200 $\mu m\ s^{-1}$.

In some cases, the stage or objective is capable of continuous motion in the z-direction at a velocity of greater than 0.5 $\mu m\ s^{-1}$, 1 $\mu m\ s^{-1}$, 2 $\mu m\ s^{-1}$, 3 $\mu m\ s^{-1}$, 4 $\mu m\ s^{-1}$, 5 $\mu m\ s^{-1}$, 6 $\mu m\ s^{-1}$, 7 $\mu m\ s^{-1}$, 8 $\mu m\ s^{-1}$, 9 $\mu m\ s^{-1}$, 10 $\mu m\ s^{-1}$, 11 $\mu m\ s^{-1}$, 12 $\mu m\ s^{-1}$, 13 $\mu m\ s^{-1}$, 14 $\mu m\ s^{-1}$, 15 $\mu m\ s^{-1}$, 16 $\mu m\ s^{-1}$, 17 $\mu m\ s^{-1}$, 18 $\mu m\ s^{-1}$, 19 $\mu m\ s^{-1}$, 20 $\mu m\ s^{-1}$, 25 $\mu m\ s^{-1}$, 30 $\mu m\ s^{-1}$, 35 $\mu m\ s^{-1}$, 40 $\mu m\ s^{-1}$, 45 $\mu m\ s^{-1}$, 50 $\mu m\ s^{-1}$, 55 $\mu m\ s^{-1}$, 60 $\mu m\ s^{-1}$, 65 $\mu m\ s^{-1}$, 70 $\mu m\ s^{-1}$, 75 $\mu m\ s^{-1}$, 80 $\mu m\ s^{-1}$, 90 $\mu m\ s^{-1}$, 95 $\mu m\ s^{-1}$, 100 $\mu m\ s^{-1}$, 110 $\mu m\ s^{-1}$, 120 $\mu m\ s^{-1}$, 130 $\mu m\ s^{-1}$, 140 $\mu m\ s^{-1}$, 150 $\mu m\ s^{-1}$, 160 $\mu m\ s^{-1}$, 170 $\mu m\ s^{-1}$, 180 $\mu m\ s^{-1}$, 190 $\mu m\ s^{-1}$, or 200 $\mu m\ s^{-1}$.

In some cases, the stage or objective is capable of continuous motion in the z-direction at a velocity of about 10

μm $s^{-1}$. In some cases, the stage is capable of continuous motion in the z-direction at a velocity of about 100 μm $s^{-1}$.

In some instances, the stage or objective is capable of continuous motion in the z-direction at a velocity of greater than 10 μm $s^{-1}$. In some instances, the stage is capable of continuous motion in the z-direction at a velocity of greater than 100 μm $s^{-1}$.

In some instances, the stage or objective has a z-range (i.e., total movable distance in the z-direction) of about 100 μm, 200 μm, 300 μm, 400 μm, 500 μm, 600 μm, 700 μm, 800 μm, 900 μm, 1000 μm, 1200 μm, 1400 μm, 1600 μm, 1800 μm, 2000 μm, 2500 μm, or 3000 μm.

In some cases, the stage or objective has a z-range (i.e., total movable distance in the z-direction) of less than 100 μm, 200 μm, 300 μm, 400 μm, 500 μm, 600 μm, 700 μm, 800 μm, 900 μm, 1000 μm, 1200 μm, 1400 μm, 1600 μm, 1800 μm, 2000 μm, 2500 μm, or 3000 μm.

In some instances, the objective stage has a z-range (i.e., total movable distance in the z-direction) of greater than 100 μm, 200 μm, 300 μm, 400 μm, 500 μm, 600 μm, 700 μm, 800 μm, 900 μm, 1000 μm, 1200 μm, 1400 μm, 1600 μm, 1800 μm, 2000 μm, 2500 μm, or 3000 μm.

In some instances, the stage or objective is further capable of motion in a plurality of directions. In some cases, the stage is further capable of motion in the x-direction or y direction. In some instances, the stage is further capable of motion in the x-direction. In some cases, the stage is further capable of motion in the y-direction.

In some cases, the stage is selected from: Dover Motion DOF-5 vertical Z-stage, Dover Motion ZE Vertical Stage, Pimars P-561, Pimars P-562, or Pimars P-563.

In some instances, the stage is an ASI Stage XY stage with piezo insert (e.g., PZ-2000FT).

In some instances, the stage or objective further comprises a element or component that reduces noise. In some cases, the stage, substrate, or objective lens, or any combination thereof, may comprise one or more noise reducing feature, e.g., a dampener, gimbal, or ball bearing, or any combination thereof, to reduce noise from the movement of the stage, substrate, or objective lens, or any combination thereof.

The systems of the present disclosure may comprise a control unit comprising hardware and software relevant to the volumetric imaging of a sample (e.g., a sample described herein).

In some cases, the control unit comprises a computer comprising a microprocessor.

In some cases, the control unit comprises an image processing software (e.g., ImageJ or LAS X).

Computer Systems

Figure 9:
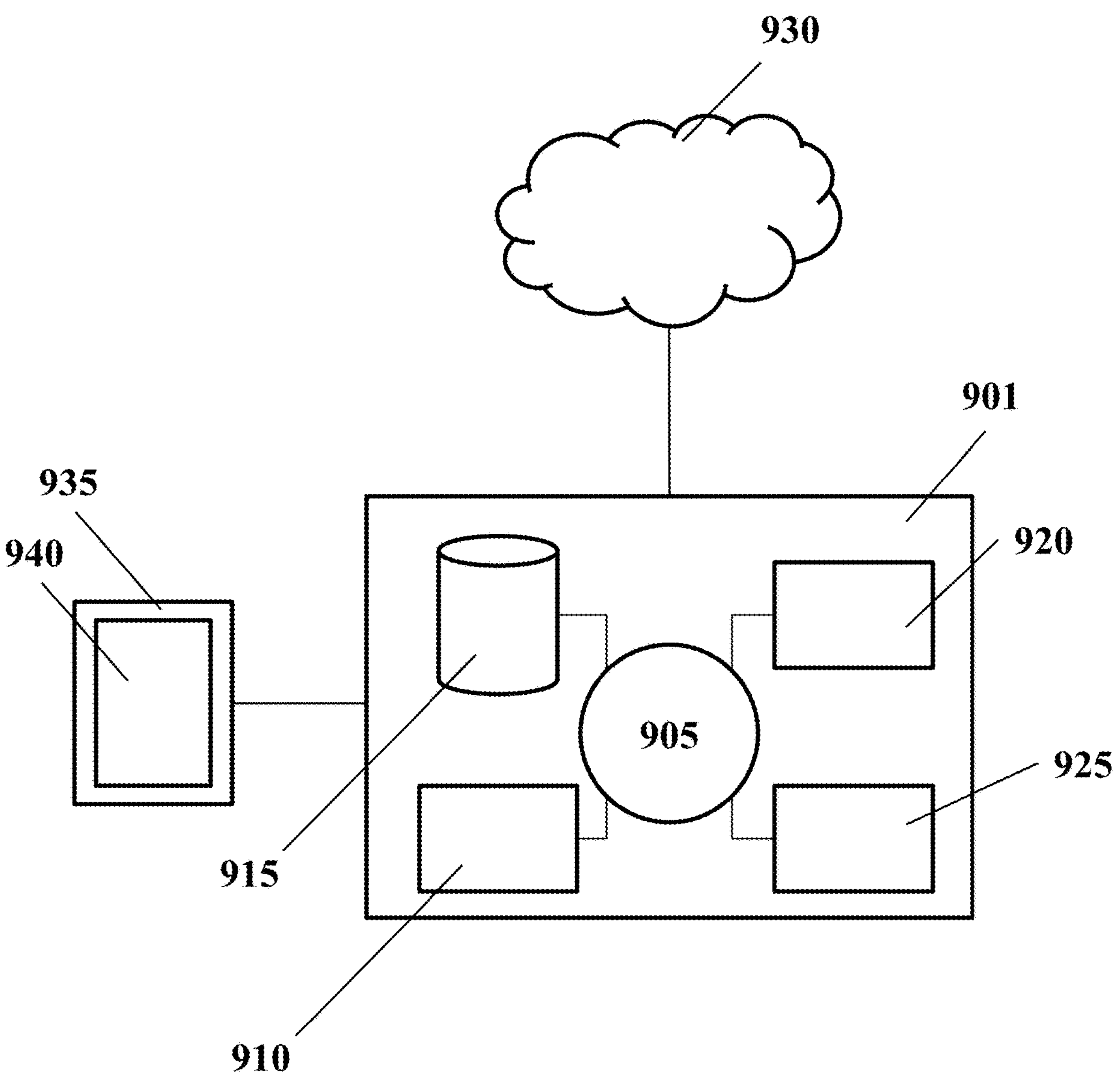
FIG. 9 shows a computer system that is programmed or otherwise configured to implement methods provided herein.

The present disclosure provides computer systems that are programmed to implement methods of the disclosure (e.g., use a plurality of signals to determine a plurality of properties associated with one or more samples). FIG. 9 shows a computer system 901 that may be programmed or otherwise configured to implement the methods of the present disclosure, processes images generated by the present disclosure, etc. The computer system 901 can regulate various aspects of the present disclosure, such as, for example, the imaging of samples to acquire volume video. The computer system 901 can be an electronic device of a user or a computer system that is remotely located with respect to the electronic device. The electronic device can be a mobile electronic device.

The computer system 901 includes a central processing unit (CPU, also "processor" and "computer processor" herein) 905, which can be a single core or multi core processor, or a plurality of processors for parallel processing. The computer system 901 may include memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage, or electronic display adapters, or any combination thereof. The memory 910, storage unit 915, interface 920 and peripheral devices 925 are in communication with the CPU 905 through a communication bus (solid lines), such as a motherboard. The storage unit 915 can be a data storage unit (or data repository) for storing data. The computer system 901 can be operatively coupled to a computer network ("network") 930 with the aid of the communication interface 920. The network 930 can be the Internet, an internet or extranet, or an intranet or extranet that is in communication with the Internet. The network 930, in some cases, is a telecommunication or data network. The network 930 can include one or more computer servers, which can enable distributed computing, such as cloud computing. The network 930, in some cases, with the aid of the computer system 901, can implement a peer-to-peer network, which may enable devices coupled to the computer system 901 to behave as a client or a server.

The CPU 905 can execute a sequence of machine-readable instructions, which can be embodied in a program or software. The instructions may be stored in a memory location, such as the memory 910. The instructions can be directed to the CPU 905, which can subsequently program or otherwise configure the CPU 905 to implement methods of the present disclosure. Examples of operations performed by the CPU 905 can include fetch, decode, execute, and writeback.

The CPU 905 can be part of a circuit, such as an integrated circuit. One or more other components of the system 901 can be included in the circuit. In some cases, the circuit is an application specific integrated circuit (ASIC).

The storage unit 915 can store files, such as drivers, libraries and saved programs. The storage unit 915 can store user data, e.g., user preferences and user programs. The computer system 901, in some cases, can include one or more additional data storage units that are external to the computer system 901, such as located on a remote server that is in communication with the computer system 901 through an intranet or the Internet.

The computer system 901 can communicate with one or more remote computer systems through the network 930. For instance, the computer system 901 can communicate with a remote computer system of a user. Examples of remote computer systems may include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 901 via the network 930.

Methods as described herein can be implemented by way of machine (e.g., computer processor) executable code stored on an electronic storage location of the computer system 901, such as, for example, on the memory 910 or electronic storage unit 915. The machine executable or machine-readable code can be provided in the form of software. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 901, can be embodied in programming. Various aspects of the technology may be thought of as "products" or "articles of manufacture" typically in the form of machine (or processor) executable code or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or one or more portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" generally refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media may include, for example, optical or magnetic disks, such as any of the storage devices in any computer(s) or the like, such as may be used to implement the databases, etc. shown in the drawings. Volatile storage media may include dynamic memory, such as main memory of such a computer platform. Tangible transmission media may include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore may include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 901 can include or be in communication with an electronic display 935 that comprises a user interface (UI) 940 for providing, for example, images acquired by the methods and systems of the present disclosure. Examples of UI's may include, without limitation, a graphical user interface (GUI) and web-based user interface.

Methods and systems of the present disclosure can be implemented by way of one or more algorithms. An algorithm can be implemented by way of software upon execution by the central processing unit 905. The algorithm can, for example, process images to determine an identity of an analyte in a sample.

NUMBERED EMBODIMENTS

The following embodiments recite nonlimiting permutations of a combination of features disclosed herein. Other permutations of a combinations of features are also contemplated. In particular, each of these numbered embodiments is contemplated as depending from or related to every previous or subsequent numbered embodiments, independent of their order listed.

Embodiment 1: a method of volumetric imaging of a sample, the method comprising:

(a) providing a three-dimensional sample disposed on a stage; (b) providing an imaging module, imager, imaging device, or imaging system configured to create an image, the imaging module, imager, imaging device, or imaging system comprising an objective lens configured to transmit photons from one or more object planes within the sample to one or more sensors; and (c) moving the objective lens relative to the sample while simultaneously using the imaging module, imager, imaging device, or imaging system, to acquire a series of images corresponding to a plurality of object planes within the sample.

Embodiment 2: a system for volumetric imaging of a sample, the system comprising: a stage configured to hold a three-dimensional sample; and an imaging module, imager, imaging device, or imaging system configured to create an image, the imaging module, imager, imaging device, or imaging system, comprising an objective lens configured to transmit photons from one or more object planes within the sample to one or more sensors; wherein the imaging module, imager, imaging device, or imaging system, is configured to move the objective lens relative to the sample in a direction substantially toward or away from the sample while simultaneously using the imaging module, imager, imaging device, or imaging system to acquire a series of images corresponding to the one or more object planes within the sample.

Embodiment 3: the method or system of any of the preceding embodiments, wherein the objective lens is moved toward the sample.

Embodiment 4: the method or system of any of the preceding embodiments, wherein the objective lens is moved away from the sample.

Embodiment 5: the method or system of any of the preceding embodiments, wherein the objective lens is moved in a direction substantially parallel to an optical axis of the objective.

Embodiment 6: the method or system of any of the preceding embodiments, wherein the objective lens is moved substantially continuously during a time period at which the imaging module simultaneously acquires the series of images.

Embodiment 7: the method or system of any of the preceding embodiments, wherein the series of images correspond to a plurality of adjacent object planes within the sample.

Embodiment 8: the method or system of any of the preceding embodiments, wherein the series of images comprise a video.

Embodiment 9: the method or system of any of the preceding embodiments, wherein the sensor is a complementary metal-oxide-semiconductor (CMOS) sensor.

Embodiment 10: the method or system of any of the preceding embodiments, wherein the sensor is a rolling shutter sensor.

Embodiment 11: the method or system of any of the preceding embodiments, wherein the sensor is a global shutter sensor.

Embodiment 12: the method or system of any of the preceding embodiments, wherein the sensor comprises an array of pixels.

Embodiment 13: the method or system of any of the preceding embodiments, wherein the array of pixels are organized into multiple groups of pixels, whereby each group of pixels are read in series while the remaining groups of pixels are integrating photons.

Embodiment 14: the method or system of any of the preceding embodiments, wherein the sensor integrates photons with a duty cycle of greater than about 90%.

Embodiment 15: the method or system of any of the preceding embodiments, wherein the imaging module, imager, imaging device, or imaging system is a confocal microscope.

Embodiment 16: the method or system of any of the preceding embodiments, wherein the imaging module, imager, imaging device, or imaging system is a light sheet microscope.

Embodiment 17: the method or system of any of the preceding embodiments, wherein the imaging module, imager, imaging device, or imaging system comprises sensors imaging in multiple passbands.

Embodiment 18: the method or system of any of the preceding embodiments, wherein the objective lens transmits photons to a plurality of sensors.

Embodiment 19: the method or system of any of the preceding embodiments, wherein each sensor of the plurality of sensors integrate photons having a different wavelength.

Embodiment 20: the method or system of any of the preceding embodiments, wherein each sensor of the plurality of sensors is oriented to produce parallel object planes.

Embodiment 21: the method or system of any of the preceding embodiments, wherein the object plane is angled relative to the stage.

Embodiment 22: the method or system of any of the preceding embodiments, wherein the object plane is not orthogonal to the optical axis.

Embodiment 23: the method or system of any of the preceding embodiments, wherein an angle of the object plane relative to the optical axis is less than about 1 milliradian.

Embodiment 24: the method of any of the preceding embodiments, further comprising applying a mathematical transformation to the series of images to correct for an angle relative to the optical axis.

Embodiment 25: the method or system of any of the preceding embodiments, wherein the objective lens is moved, and the sample is stationary.

Embodiment 26: the method or system of any of the preceding embodiments, wherein the sample is moved, and the optical lens is stationary.

Embodiment 27: the method or system of any of the preceding embodiments, wherein a relative distance between the objective lens and the sample is increasing.

Embodiment 28: the method or system of any of the preceding embodiments, wherein a relative distance between the objective lens and the sample is decreasing.

Embodiment 29: the method or system of any of the preceding embodiments, wherein the objective lens is moved relative to the sample until a field of view has been imaged to a chosen depth.

Embodiment 30: the method or system of any of the preceding embodiments, wherein the series of images cover a field of view.

Embodiment 31: the method of any of the preceding embodiments, further comprising repeating (a)-(d) to provide a volumetric image at a plurality of adjacent fields of view.

Embodiment 32: the method or system of any of the preceding embodiments, wherein the volumetric image at the plurality of adjacent fields of view are mathematically joined into a continuous imaged volume.

Embodiment 33: the method or system of any of the preceding embodiments, wherein the plurality of adjacent fields of view are imaged spanning an imaged volume of the sample.

Embodiment 34: the method of any of the preceding embodiments, further comprising moving the objective lens relative to the sample in a direction substantially perpendicular to the optical axis of the objective, such that the imaging module, imager, imaging device, or imaging system is capable of imaging a second field of view of the sample.

Embodiment 35: the method or system of any of the preceding embodiments, wherein a velocity of the objective lens relative to the sample varies by less than about 5% during a period of time when the objective lens is continuously moved relative to the sample.

Embodiment 36: the method or system of any of the preceding embodiments, wherein the objective lens is moved relative to the sample at a velocity such that a second object plane of the adjacent object planes is stacked on a first object plane of the adjacent object planes.

Embodiment 37: the method or system of any of the preceding embodiments, wherein each of the series of images has a depth of focus.

Embodiment 38: the method or system of any of the preceding embodiments, wherein each of the series of images is separated by approximately one depth of focus.

Embodiment 39: the method or system of any of the preceding embodiments, wherein a velocity of the objective lens relative to the sample is coordinated with a frame rate of the sensor such that the series of images are separated by approximately one depth of focus.

Embodiment 40: the method or system of any of the preceding embodiments, wherein the sample is illuminated.

Embodiment 41: the method or system of any of the preceding embodiments, wherein the sample is illuminated with a laser.

Embodiment 42: the method or system of any of the preceding embodiments, wherein the sample is illuminated at one or more portions of the sample corresponding to the object plane.

Embodiment 43: the method or system of any of the preceding embodiments, wherein the imaging module, imager, imaging device, or imaging system comprises a spinning disk.

Embodiment 44: the method or system of any of the preceding embodiments, wherein the spinning disk is configured to enrich the transmitted photons to photons that arise from the object plane within the sample.

Embodiment 45: the method or system of any of the preceding embodiments, wherein the sample is a tissue sample.

Embodiment 46: the method or system of any of the preceding embodiments, wherein the sample is a cleared and hydrogel stabilized tissue sample.

Embodiment 47: the method or system of any of the preceding embodiments, wherein the sample comprises fluorescently labeled loci.

Embodiment 48: the method or system of any of the preceding embodiments, wherein the fluorescently labeled loci are associated with locations of a biomolecule.

Embodiment 49: the method or system of any of the preceding embodiments, wherein the volumetric image of the sample indicates locations at which an RNA is expressed or a protein is produced.

Embodiment 50: the method or system of any of the preceding embodiments, wherein the volumetric image comprises locations at which a fluorescently labeled nucleotide has been incorporated into a growing nucleic acid strand.

Embodiment 51: the method or system of any of the preceding embodiments, wherein the volumetric image comprises locations at which a fluorescently labeled oligonucleotide has been ligated onto a nucleic acid template.

Embodiment 52: the method or system of any of the preceding embodiments, wherein the growing nucleic acid strand is at least partially complimentary to a sequence of interest.

Embodiment 53: the method of any of the preceding embodiments, wherein (b)-(d) are repeated for incorporation of each of type of nucleotide (A, C, T, or G, or any combination thereof), thereby determining a nucleotide sequence of the sequence of interest.

Embodiment 54: the method or system of any of the preceding embodiments, wherein the tissue sample comprises at least 500,000 cells.

Embodiment 55: the method or system of any of the preceding embodiments, wherein at least about 500 sequences of interest are sequenced.

Embodiment 56: the method or system of any of the preceding embodiments, wherein the series of images are acquired with a duty cycle of at least about 90%.

Embodiment 57: the method or system of any of the preceding embodiments, wherein the series of images are acquired at a rate of at least about 100,000,000 voxels/second on each of two or more wavelength channels.

Embodiment 58: the method or system of any of the preceding embodiments, wherein the series of images comprise at least 50 images.

Embodiment 59: the method of any of the preceding embodiments, further comprising performing fluidic operations on the sample.

Embodiment 60: the method of any of the preceding embodiments, wherein the fluidic operations comprise labeling, stripping, aspirating, dispensing, incubating, or any combination thereof.

Embodiment 61: the method or system of any of the preceding embodiments, wherein multiple samples are loaded onto multiple areas of the stage.

Embodiment 62: the method or system of any of the preceding embodiments, wherein the series of images are acquired from a first sample while a second sample is undergoing a fluidic operation or an incubation period.

Embodiment 63: the method or system of any of the preceding embodiments, wherein the series of images comprise signals acquired at fixed locations within the sample.

Embodiment 64: the method of any of the preceding embodiments, further comprising associating the signals and locations with a reference database.

Embodiment 65: the method of any of the preceding embodiments further comprising extracting signals from the series of images within 20 seconds of acquiring the series of images.

Embodiment 66: the method or system of any of the preceding embodiments, wherein the signals are extracted from the series of images without saving the series of images.

EXAMPLES

These examples are provided for illustrative purposes only and not to limit the scope of the claims provided herein.

Example 1—Imaging System

Figure 10:
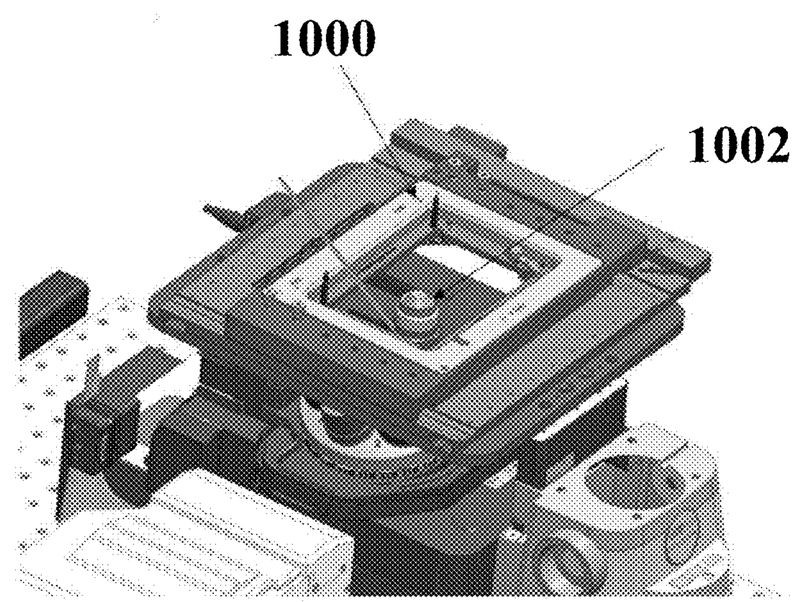
FIG. 10 is a schematic of the sample stage and objective lens, according to some embodiments of the present disclosure.

FIG. 10 is a schematic of the sample stage and objective lens, according to some embodiments of the present disclosure. Included herein is a piezo Z insert 1000 and a 60× WI objective 1002.

Figure 11:
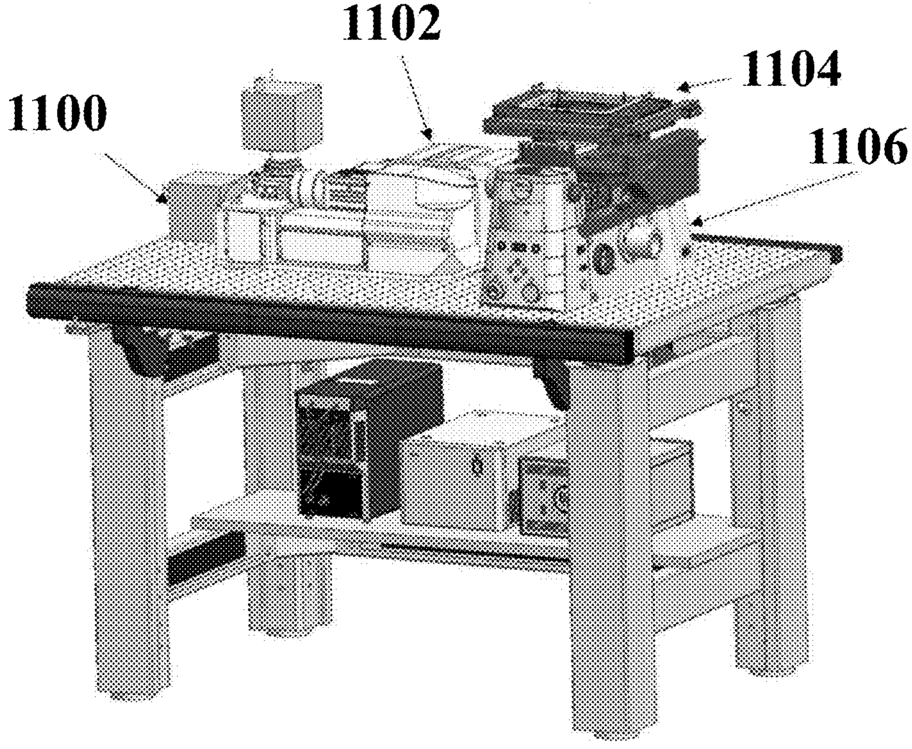
FIG. 11 is a schematic of confocal microscopy system, according to some embodiments of the present disclosure.

FIG. 11 is a schematic of confocal microscopy system, according to some embodiments of the present disclosure. The system can include a Sony IMX571BLR-J camera or kinetix camera 1100, an x-light V3 confocal microscope 1102, an ASI stage with piezo Z insert 1104, and a Nikon Ti2e 1106.

Example 2—Volume Video Exposure Parameters

A system of the present disclosure configured to image a 500 nanometer z portion of a sample with a 20 hertz video can have a focal shift along the z axis of the acquisition at a rate of 10 micrometers per second. This speed of shift can result in the predetermined 500 nanometer z size of the voxel, as a single frame of the video taken of the sample would achieve the 500 nanometer value. Similarly, the above parameters can be used to determine the scanning speed used to achieve a different given z axis resolution.

Using a rolling shutter sensor with this system can provide facile and cost-effective detection for the volume video system by integrating each row of the sensor individually as the acquisition is taken. Such a system can induce artifacts via a tilt in the x-y (e.g., orthogonal to the optical axis) plane. In this example, a 1000 row sensor with 100 nanometer pixels can have a 5 milliradian skew induced by use of a rolling shutter sensor. Such skew can be removed using post processing algorithms, which can produce high quality data out of a simple and cost-effective instrument.

Example 3—Volume Video Acquisition

A system of the present disclosure can be provided having a sensor, a sample stage holding a sample comprising a plurality of cells, and a z-axis scanner operably coupled to a lens in an optical path between the sample and the sensor. The plurality of cells can be illuminated while the z-axis scanner moves a focal plane of the sensor through the plurality of cells to generate a plurality of images or signals of the voxel sampled by the focal plane. The shifting, illuminating, and detecting can be repeated for an additional voxel, thereby sampling additional cells of the plurality of cells. In this way, the sample can be quickly imaged with high resolution. The images or signals can be processed to identify a label associated with a nucleic acid in the sample, which can then be used to determine an identity or property of the nucleic acid or the sample by comparing the label to a reference database and associating the property of the reference database indicated by the label with the sample.

In another example, the sensor can be continuously operated to integrate through a voxel generated by the shifting of the focal plane of the sensor by the z-axis scanner through the sample. The continuous integration can generate a volumetric measurement of the entire voxel of the sample, thereby providing a three-dimensional measurement of, for example, one or more signals or one or more images of the sample.

Example 4—Single Camera Confocal Video Scan

In this example, an intact tissue section is imaged by confocal microscopy with continuous motion in the z-direction. Samples are imaged in the x-y plane while continuously moving in the z-direction. In some cases, the sample may be moved in the x-y plane and the scan is repeated, leading to a complete volumetric image of a sample, or of a sample array.

Images are acquired using a confocal microscope system (e.g., as shown in FIG. 10 and FIG. 11) with a Sony IMX571BLR-J 2×2 binned CMOS sensor operating with a rolling shutter video mode. The sensor in this binned mode has an effective array of 3122×2084 active pixels with a 7.5 μm pixel size. Using a 60× water immersion objective, this yields a 390.25 μm×260.5 μm array size on the sample with a 125 nm pixel size. For a 500 nm z voxel size, this gives 0.0019 radians or 0.11° skew between consecutive image planes as the sample is imaged under continuous z-motion.

The experiment is repeated using different combinations of video rate and z-velocity as shown in Table 1. Each of these combinations leads to successful volumetric image acquisition and reconstruction after appropriate image correction steps (i.e., correcting for a tilt angle).

TABLE 1

Summary of video rates and z-velocity conditions

| Video Rate (Hz) | Z-velocity (μm/s) |
|---|---|
| 1 | 0.5 |
| 5 | 2.5 |
| 10 | 5 |
| 20 | 10 |
| 40 | 20 |
| 80 | 40 |
| 100 | 50 |
| 150 | 75 |
| 200 | 100 |

The experiment is repeated at other combinations of z-voxel size and sensor height to test different volumetric skew angles. A summary of tested conditions is shown in Table 2. The best images are achieved for skew angles less than about 0.1° skew.

TABLE 2

Volumetric skew angles for representative z-voxel size and sensor height

| Volumetric skew angle | | z-voxel size (nm) | | | | | |
|---|---|---|---|---|---|---|---|
| in volume video (deg) | | 100 | 200 | 400 | 1,000 | 2,000 | 4,000 |
| Sensor height on sample (μm) | 100 | 0.0573 | 0.1146 | 0.2292 | 0.5729 | 1.1458 | 2.2906 |
| | 200 | 0.0286 | 0.0573 | 0.1146 | 0.2865 | 0.5729 | 1.1458 |
| | 400 | 0.0143 | 0.0286 | 0.0573 | 0.1432 | 0.2865 | 0.5729 |
| | 1,000 | 0.0057 | 0.0115 | 0.0229 | 0.0573 | 0.1146 | 0.2292 |
| | 2,000 | 0.0029 | 0.0057 | 0.0115 | 0.0286 | 0.0573 | 0.1146 |
| | 4,000 | 0.0014 | 0.0029 | 0.0057 | 0.0143 | 0.0286 | 0.0573 |

Example 5—Single Camera Lightsheet Video Scan

In this example, instead of rejecting out of focal plane light with a confocal filter, one can also limit scattered or fluorescent emission to a plane by lightsheet microscopy (e.g., lightsheet microscopy as described herein). In this system, illumination and detection objectives are physically decoupled, allowing for visualization of a selective plane of a sample (e.g., as shown in FIG. 1A). This system can be scanned in the z-direction as described in Example 1 above to create 3D image stack but with substantially increased z-voxel size (10 μm to 1 mm).

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects described herein, are not limited to the specific depictions, configurations or relative proportions set forth herein which depend upon a variety of conditions and variables. It should be understood that various alternatives to the embodiments described herein may be employed in practicing the invention. It is therefore contemplated that the invention shall also cover any such alternatives, modifications, variations, or equivalents. It is intended that the following claims define the scope of the disclosure and that methods and structures within the scope of these claims and their equivalents be covered thereby.

What is claimed is:

1. A method of volumetric imaging of a sample, the method comprising:

(a) providing:

(i) said sample disposed adjacent to a stage, wherein said sample has a thickness of at least 10 micrometers (μm); and (ii) an imaging module configured to create an image, said imaging module comprising an objective lens configured to transmit photons from one or more object planes within said sample to one or more sensors in optical communication with said objective lens;

(b) moving said objective lens relative to said sample while simultaneously using said imaging module, thereby acquiring a series of images corresponding to a plurality of object planes within said sample, wherein said series of images comprises at least 25 images; and (c) processing said series of images, thereby extracting signals from said series of images within 120 seconds subsequent to said acquiring said series of images.

2. The method of claim 1, wherein said series of images correspond to a plurality of adjacent object planes within said sample.

3. The method of claim 1, wherein said one or more sensors comprises a complementary metal-oxide-semiconductor (CMOS) sensor.

4. The method of claim 1, wherein said one or more sensors comprises an array of pixels.

5. The method of claim 1, wherein said imaging module further comprises a confocal filter.

6. The method of claim 1, wherein said imaging module further comprises a light source, wherein said light source provides light sheet illumination.

7. The method of claim 1, wherein said sample has a thickness of at least 100 μm.

8. The method of claim 1, wherein said series of images comprises at least 100 images.

9. The method of claim 1, wherein (c) is performed within 50 seconds of acquiring said series of images.

10. The method of claim 1, wherein said sample is a tissue sample.

11. The method of claim 10, wherein said tissue sample is a cleared and hydrogel stabilized tissue sample.

12. The method of claim 1, wherein (b) comprises imaging a region within said sample multiple times.

13. The method of claim 1, wherein said signals are fluorescence signals.

14. The method of claim 13, wherein said fluorescence signals provide information related to expression of ribonucleic acid (RNA) in said sample.

15. The method of claim 14, wherein said fluorescence signals provide information related to expression of at least 500 RNA in said sample.

16. The method of claim 1, wherein said series of images comprises a video.

17. The method of claim 1, wherein said one or more sensors comprises a rolling shutter sensor.

18. The method of claim 1, wherein (b) comprises illuminating said sample with a laser.

19. The method of claim 1, wherein (b) comprises acquiring said series of images at a rate of at least about 100,000,000 voxels/second on each of two or more wavelength channels.

20. The method of claim 1, wherein said sample comprises at least 500,000 cells.

* * * * *